United States Patent
Park et al.

(10) Patent No.: US 12,249,681 B2
(45) Date of Patent: Mar. 11, 2025

(54) ELECTRODE ASSEMBLY, BATTERY, AND BATTERY PACK AND VEHICLE INCLUDING THE SAME

(71) Applicant: LG ENERGY SOLUTION, LTD., Seoul (KR)

(72) Inventors: Jong-Sik Park, Daejeon (KR); Jae-Won Lim, Daejeon (KR); Yu-Sung Choe, Daejeon (KR); Hak-Kyun Kim, Daejeon (KR); Je-Jun Lee, Daejeon (KR); Duk-Hyun Ryu, Daejeon (KR); Kwan-Hee Lee, Daejeon (KR); Byoung-Gu Lee, Daejeon (KR); Jae-Eun Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/294,117

(22) PCT Filed: Jul. 19, 2022

(86) PCT No.: PCT/KR2022/010557
§ 371 (c)(1),
(2) Date: Jan. 31, 2024

(87) PCT Pub. No.: WO2023/090573
PCT Pub. Date: May 25, 2023

(65) Prior Publication Data
US 2024/0266583 A1    Aug. 8, 2024

(30) Foreign Application Priority Data
Nov. 19, 2021  (KR) .................. 10-2021-0160823
Jan. 13, 2022  (KR) .................. 10-2022-0005393

(51) Int. Cl.
*H01M 10/04*    (2006.01)
*H01M 50/107*    (2021.01)
(Continued)

(52) U.S. Cl.
CPC ..... *H01M 10/0431* (2013.01); *H01M 50/107* (2021.01); *H01M 50/186* (2021.01);
(Continued)

(58) Field of Classification Search
CPC ........... H01M 10/0431; H01M 50/107; H01M 50/186; H01M 50/567; H01M 50/538
See application file for complete search history.

(56) References Cited

U.S. PATENT DOCUMENTS

| | | |
|---|---|---|
| 6,451,473 B1 | 9/2002 | Saito et al. |
| 6,677,082 B2 | 1/2004 | Thackeray et al. |

(Continued)

FOREIGN PATENT DOCUMENTS

| | | |
|---|---|---|
| CN | 209328958 U | 8/2019 |
| CN | 110911637 A | 3/2020 |

(Continued)

OTHER PUBLICATIONS

JP 4305035 English Translation (Year: 2009).*
(Continued)

*Primary Examiner* — Jimmy Vo
(74) *Attorney, Agent, or Firm* — Birch, Stewart, Kolasch & Birch, LLP

(57) ABSTRACT

An electrode assembly, a battery, and a battery pack and a vehicle including the same are provided. One end of the electrode assembly includes a plurality of segment alignments in which the plurality of segment groups are aligned along a radial direction, and an electrolyte impregnation portion provided between segment alignments adjacent in a circumferential direction, wherein an end of the first active (Continued)

material portion is exposed between winding turns of the separator. The segments included in the segment alignment are bent toward the core to form a bending surface region. An end of the separator is spaced apart from a criterion line extending in a winding axis direction along a location corresponding to the plurality of cut grooves by 30% or less of a minimum height of the segments forming the bending surface region.

15 Claims, 43 Drawing Sheets

(51) Int. Cl.
  *H01M 50/186* (2021.01)
  *H01M 50/538* (2021.01)
  *H01M 50/567* (2021.01)
(52) U.S. Cl.
  CPC ....... *H01M 50/538* (2021.01); *H01M 50/567* (2021.01); *H01M 2220/20* (2013.01)

(56) References Cited

U.S. PATENT DOCUMENTS

| | | | |
|---|---|---|---|
| 6,680,143 B2 | 1/2004 | Thackeray et al. | |
| 9,496,539 B2 | 11/2016 | Tyler et al. | |
| 9,496,557 B2 | 11/2016 | Fuhr et al. | |
| 2005/0181272 A1 | 8/2005 | Kim | |
| 2005/0287428 A1 | 12/2005 | Cheon et al. | |
| 2005/0287432 A1 | 12/2005 | Cheon et al. | |
| 2006/0024572 A1* | 2/2006 | Lee .................. | H01M 10/0431 |
| | | | 429/161 |
| 2008/0182159 A1 | 7/2008 | Mitani et al. | |
| 2009/0104520 A1 | 4/2009 | Marple | |
| 2009/0208830 A1 | 8/2009 | Okabe et al. | |
| 2013/0183556 A1 | 7/2013 | Kim | |
| 2014/0205868 A1 | 7/2014 | Phillips | |
| 2015/0147624 A1 | 5/2015 | Yamafuku et al. | |
| 2019/0379028 A1 | 12/2019 | Lim et al. | |
| 2019/0386272 A1 | 12/2019 | Shin et al. | |
| 2020/0235369 A1 | 7/2020 | Jeong et al. | |
| 2020/0295341 A1 | 9/2020 | Kim et al. | |
| 2021/0210792 A1 | 7/2021 | Mukai et al. | |
| 2021/0344033 A1 | 11/2021 | Park et al. | |
| 2024/0222807 A1 | 7/2024 | Deng et al. | |

FOREIGN PATENT DOCUMENTS

| | | | |
|---|---|---|---|
| CN | 111668534 A | 9/2020 | |
| CN | 113270693 A | 8/2021 | |
| EP | 2 728 647 A1 | 5/2014 | |
| JP | 6-124696 A | 5/1994 | |
| JP | 7-201309 A | 8/1995 | |
| JP | 8-102313 A | 4/1996 | |
| JP | 10-83833 A | 3/1998 | |
| JP | 10-106532 A | 4/1998 | |
| JP | 10-214609 A | 8/1998 | |
| JP | 2955135 B2 | 10/1999 | |
| JP | 11-329398 A | 11/1999 | |
| JP | 3252846 B2 | 2/2002 | |
| JP | 2002-289170 A | 10/2002 | |
| JP | 2004-14173 A | 1/2004 | |
| JP | 2004-71266 A | 3/2004 | |
| JP | 2004-319311 A | 11/2004 | |
| JP | 3632586 B2 | 3/2005 | |
| JP | 3718872 B2 | 11/2005 | |
| JP | 3751782 B2 | 3/2006 | |
| JP | 2006-278016 A | 10/2006 | |
| JP | 2008-243811 A | 10/2008 | |
| JP | 4305035 B2 * | 7/2009 | |
| JP | 4346637 B2 | 10/2009 | |
| JP | 4430587 B2 * | 3/2010 | ........ H01M 10/0431 |
| JP | 2011-216403 A | 10/2011 | |
| JP | 5019557 B2 | 9/2012 | |
| JP | 2012-190739 A | 10/2012 | |
| JP | 5051410 B2 | 10/2012 | |
| JP | 5651536 B2 | 1/2015 | |
| JP | 5877724 B2 | 3/2016 | |
| JP | 6406836 B2 | 10/2018 | |
| JP | WO2019/194182 A1 | 10/2019 | |
| KR | 10-2001-0017098 A | 3/2001 | |
| KR | 10-0490526 B1 | 8/2005 | |
| KR | 10-2005-0121904 A | 12/2005 | |
| KR | 10-2005-0121914 A | 12/2005 | |
| KR | 10-0551885 B1 | 2/2006 | |
| KR | 10-0599710 B1 | 7/2006 | |
| KR | 10-0612236 B1 | 8/2006 | |
| KR | 10-2008-0047165 A | 5/2008 | |
| KR | 10-2010-0096100 A | 9/2010 | |
| KR | 10-2013-0084086 A | 7/2013 | |
| KR | 10-1320581 B1 | 10/2013 | |
| KR | 10-1446151 B1 | 10/2014 | |
| KR | 10-2015-0060511 A | 6/2015 | |
| KR | 10-2016-0009406 A | 1/2016 | |
| KR | 10-2016-0089968 A | 7/2016 | |
| KR | 10-2016-0092748 A | 8/2016 | |
| KR | 10-2016-0131681 A | 11/2016 | |
| KR | 10-1743136 B1 | 6/2017 | |
| KR | 10-1807353 B1 | 12/2017 | |
| KR | 10-2018-0000223 A | 1/2018 | |
| KR | 10-2018-0026910 A | 3/2018 | |
| KR | 10-1839158 B1 | 3/2018 | |
| KR | 10-2018-0106367 A | 10/2018 | |
| KR | 10-2018-0116004 A | 10/2018 | |
| KR | 10-2018-0116156 A | 10/2018 | |
| KR | 10-2019-0030016 A | 3/2019 | |
| KR | 10-2019-0040699 A | 4/2019 | |
| KR | 10-2042999 B1 | 11/2019 | |
| KR | 10-2020-0041625 A | 4/2020 | |
| KR | 10-2021-0006203 A | 1/2021 | |

OTHER PUBLICATIONS

JP 4430587 English Translation (Year: 2010).*
International Search Report (PCT/ISA/210) issued in PCT/KR2022/010557 mailed on Nov. 16, 2022.
Written Opinion (PCT/ISA/237) issued in PCT/KR2022/010557 mailed on Nov. 16, 2022.
Extended European Search Report for European Application No. 22895783.3, dated Nov. 29, 2024.

* cited by examiner

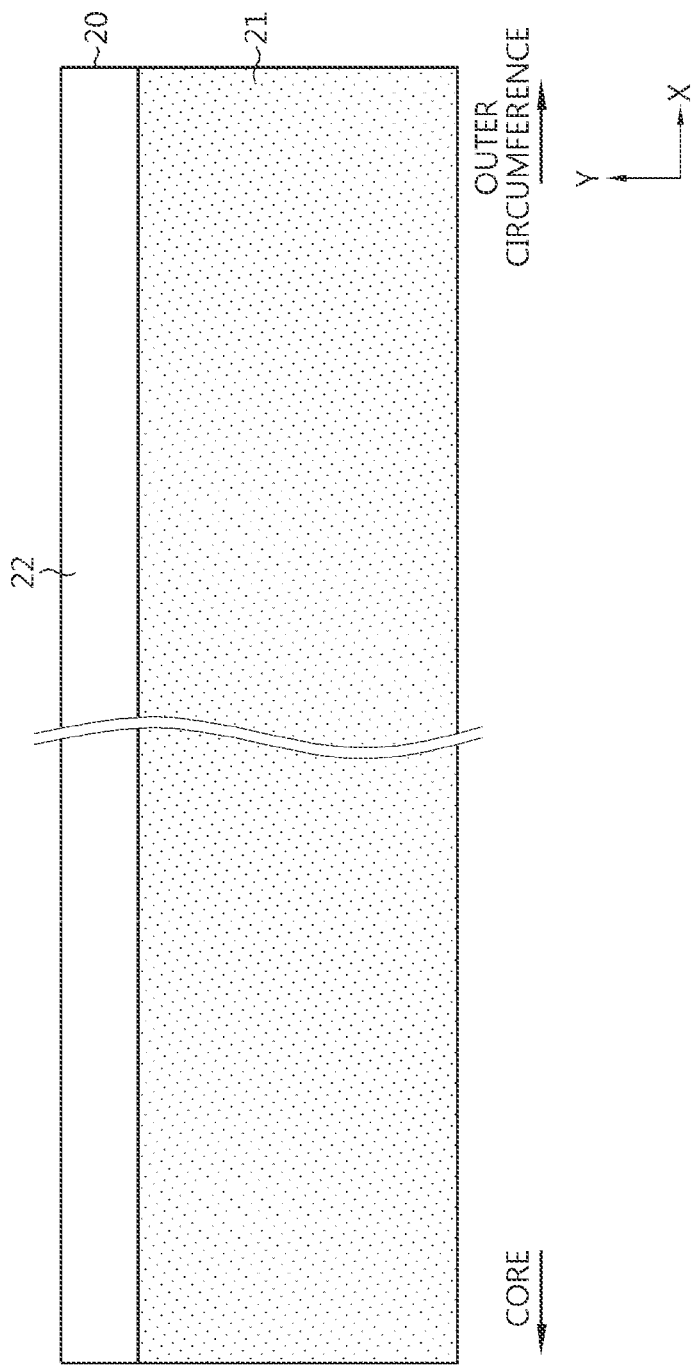
FIG. 1 – CONVENTIONAL ART

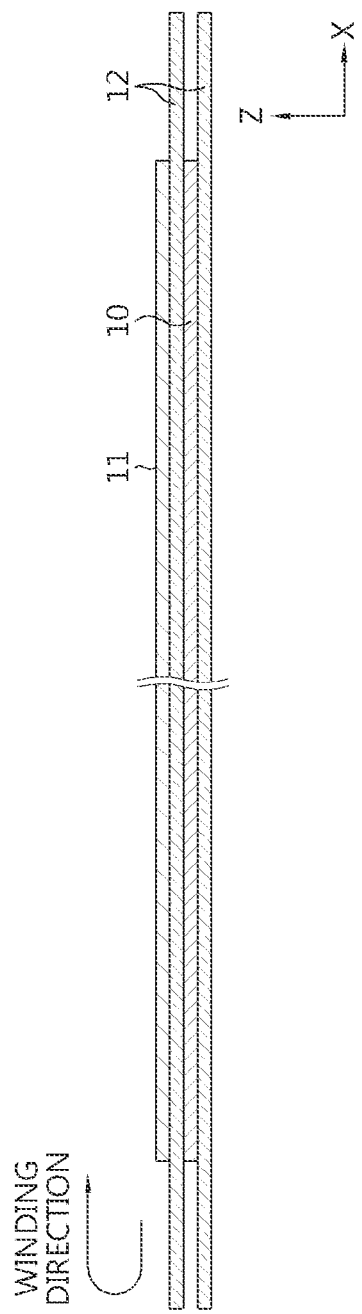
FIG. 2 – CONVENTIONAL ART

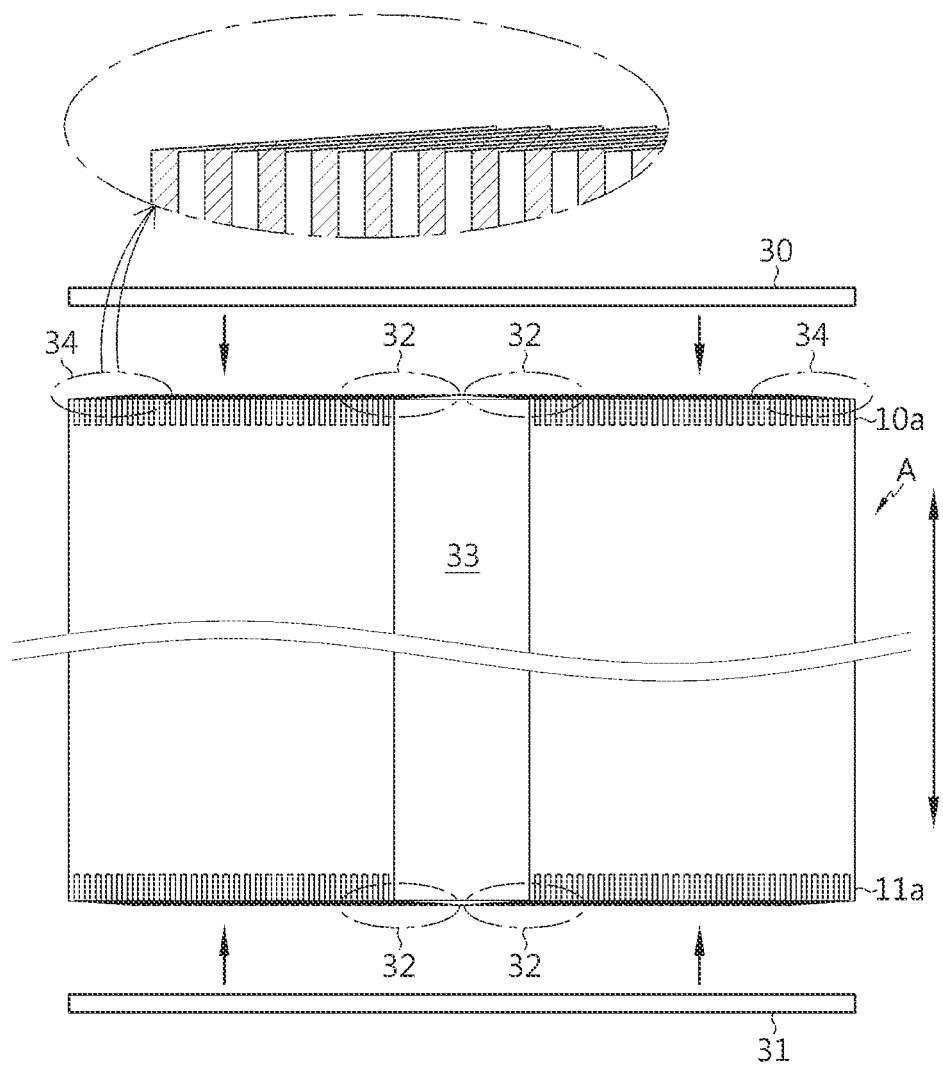
FIG. 3 – CONVENTIONAL ART

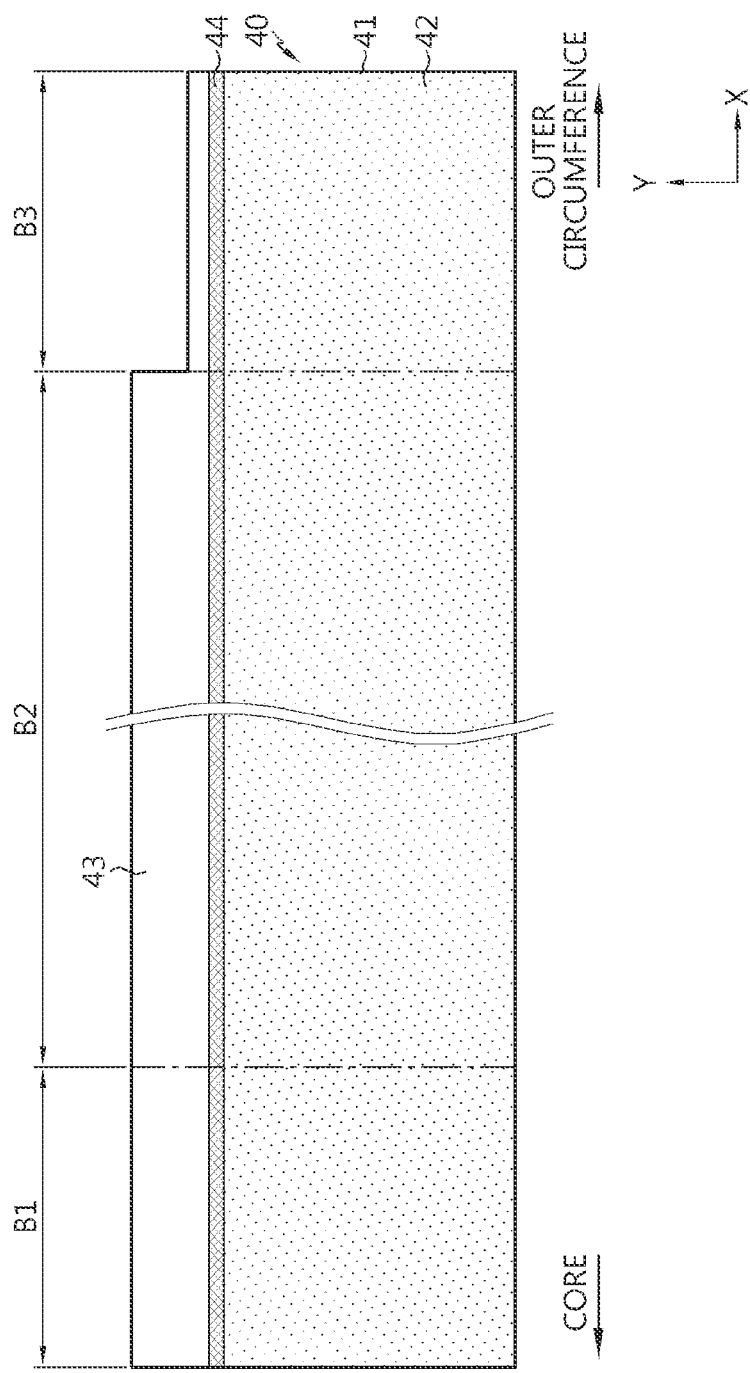

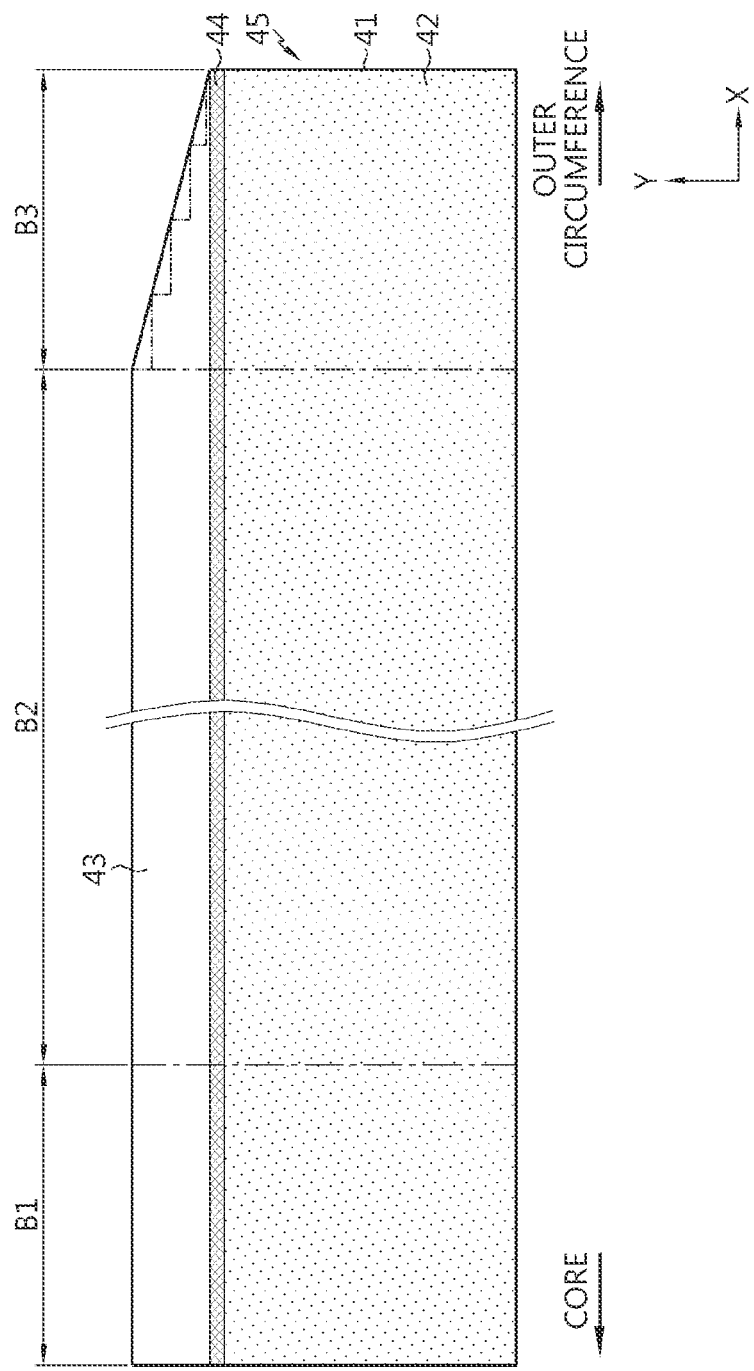

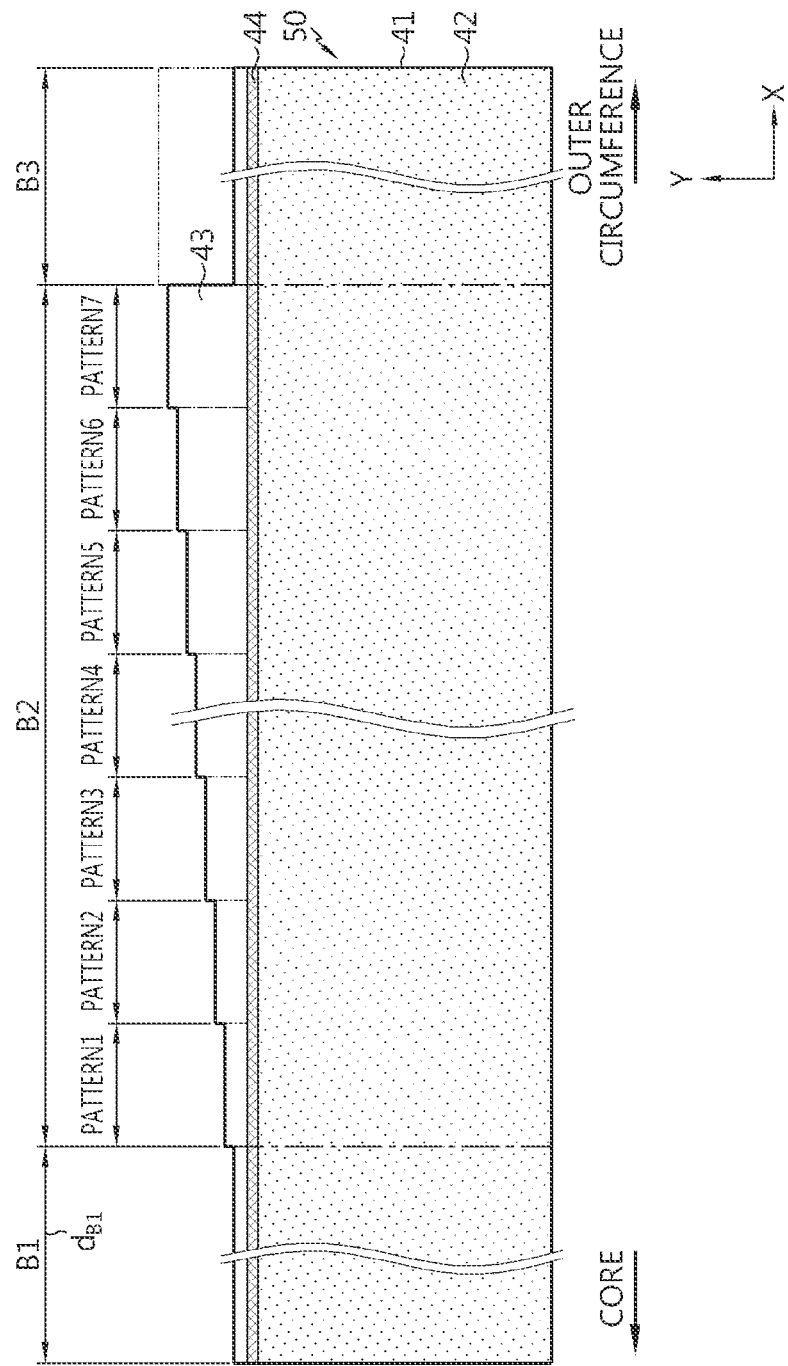

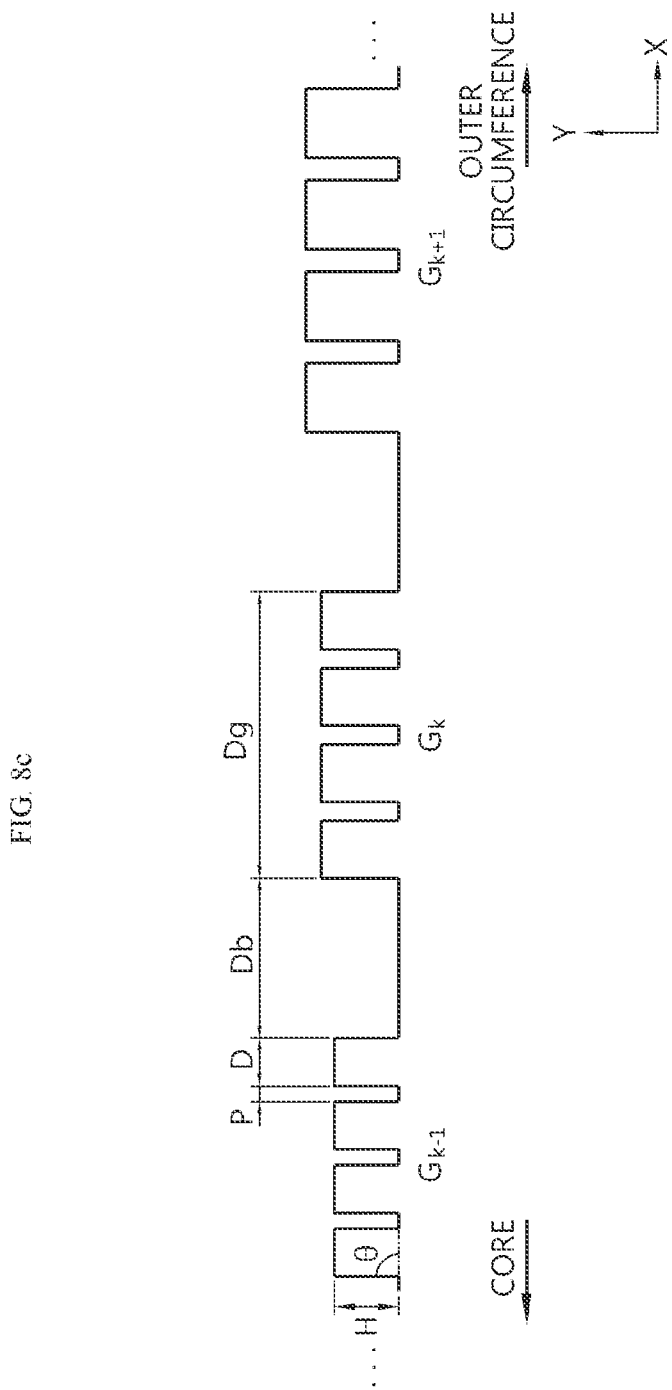

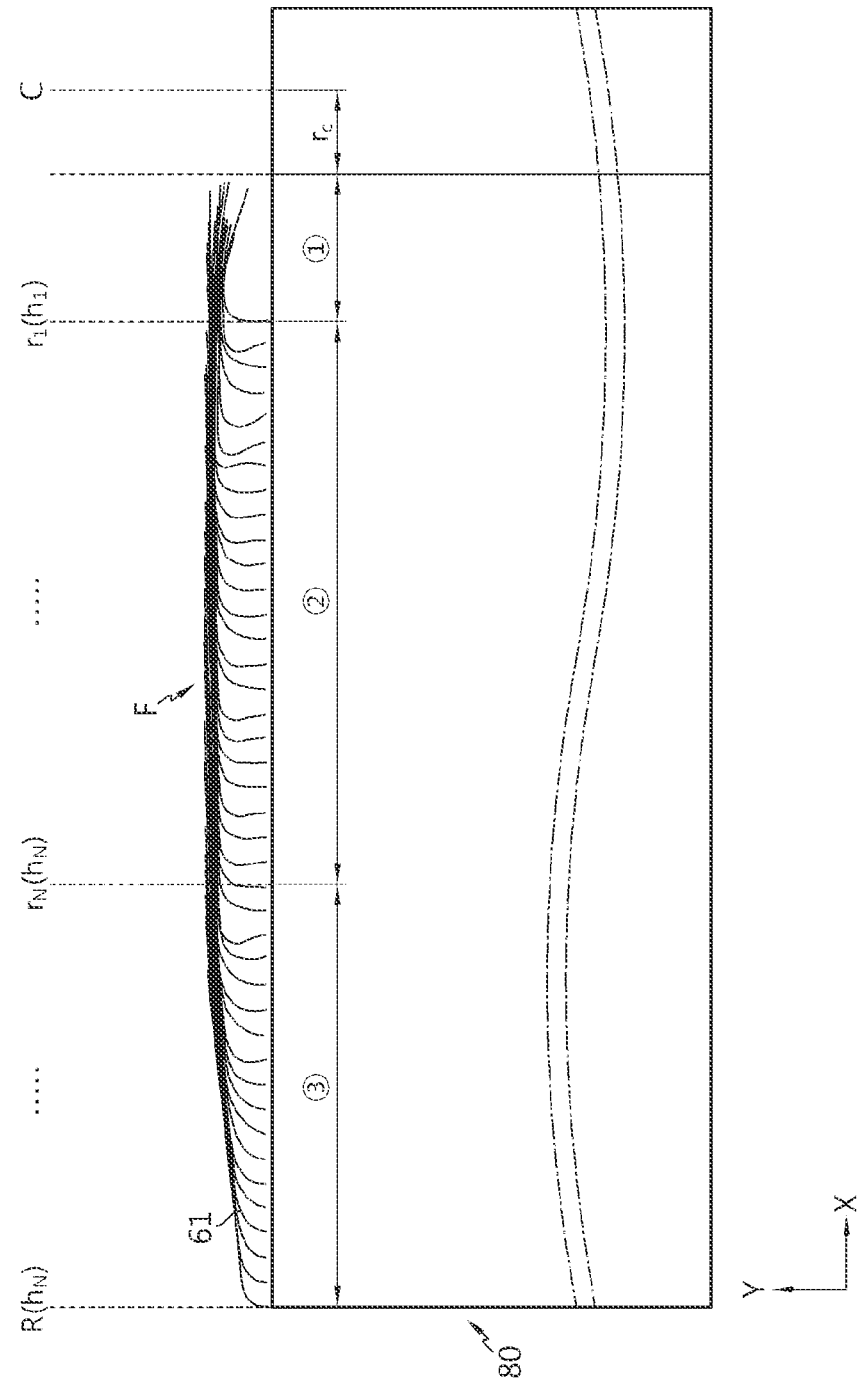

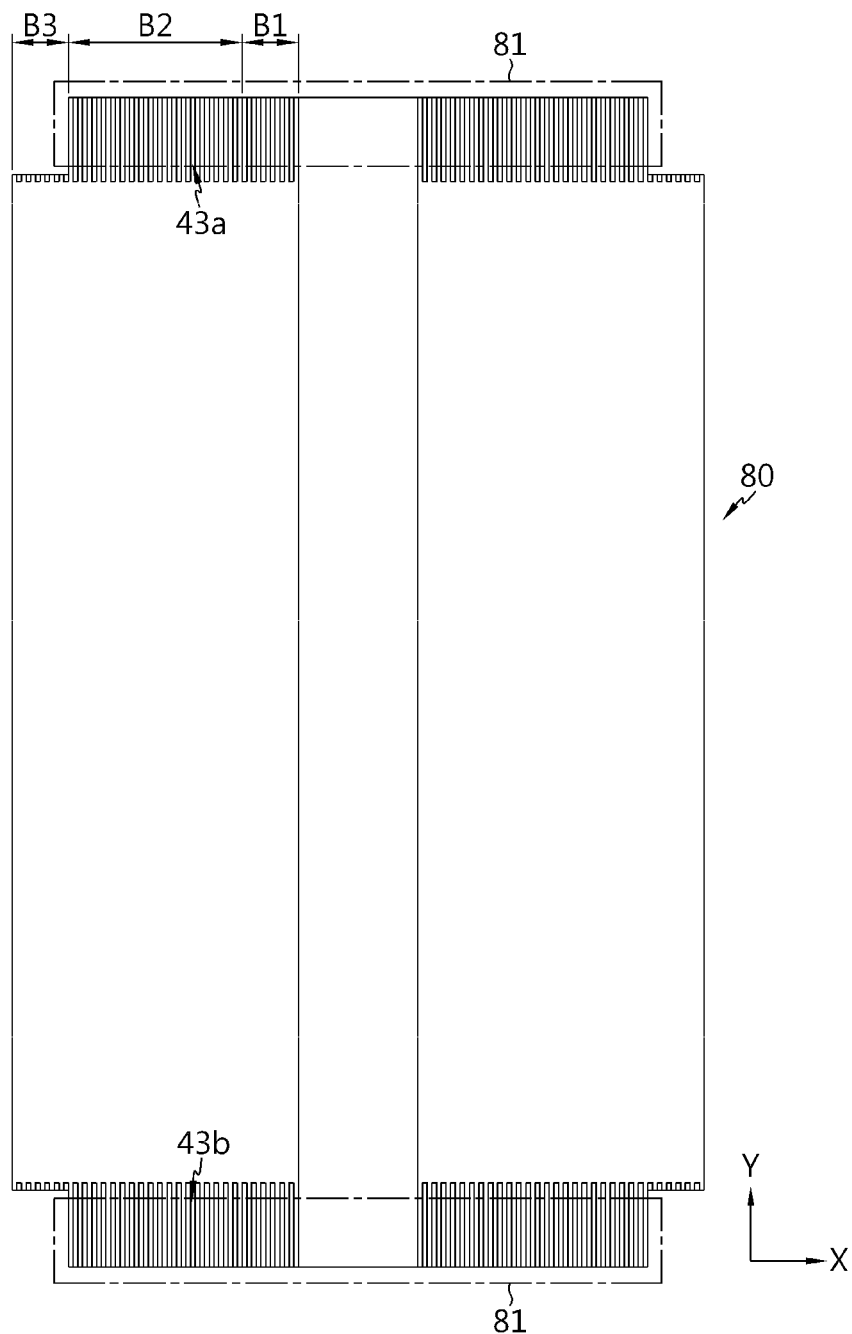

ELECTRODE ASSEMBLY, BATTERY, AND BATTERY PACK AND VEHICLE INCLUDING THE SAME

CROSS-REFERENCE TO RELATED APPLICATIONS

This application is the National Phase of PCT International Application No. PCT/KR2022/010557, filed on Jul. 19, 2022, which claims priority to Korean Patent Application No. 10-2021-0160823, filed in the Republic of Korea on Nov. 19, 2021, and Korean Patent Application No. 10-2022-0005393, filed in the Republic of Korea on Jan. 13, 2022, the disclosures of which are incorporated herein by reference.

TECHNICAL FIELD

The present disclosure relates to an electrode assembly, a battery, and a battery pack and a vehicle including the same.

BACKGROUND ART

Secondary batteries that are easily applicable to various product groups and have electrical characteristics such as high energy density are universally applied not only to portable devices but also to electric vehicles (EVs) or hybrid electric vehicles (HEVs) driven by an electric drive source.

These secondary batteries are attracting attention as a new energy source to improve eco-friendliness and energy efficiency because they have the primary advantage that they can dramatically reduce the use of fossil fuels as well as the secondary advantage that no by-products are generated from the use of energy.

Secondary batteries currently widely used in the art include lithium ion batteries, lithium polymer batteries, nickel cadmium batteries, nickel hydrogen batteries, nickel zinc batteries, and the like. A unit secondary battery, namely a unit battery, has an operating voltage of about 2.5V to 4.5V. Therefore, when a higher output voltage is required, a battery pack may be configured by connecting a plurality of batteries in series. In addition, a plurality of batteries may be connected in parallel to form a battery pack according to the charge/discharge capacity required for the battery pack. Accordingly, the number of batteries included in the battery pack and the form of electrical connection may be variously set according to the required output voltage and/or charge/discharge capacity.

Meanwhile, as a kind of unit secondary battery, there are known cylindrical, rectangular, and pouch-type batteries. In the case of a cylindrical battery, a separator serving as an insulator is interposed between a positive electrode and a negative electrode, and they are wound to form an electrode assembly in the form of a jelly roll, which is inserted into a battery housing to configure a battery. The battery housing is called a battery can in the art. In addition, a strip-shaped electrode tab may be connected to an uncoated portion of each of the positive electrode and the negative electrode, and the electrode tab electrically connects the electrode assembly and an electrode terminal exposed to the outside. For reference, the positive electrode terminal is a cap of a sealing body that seals the opening of the battery housing, and the negative electrode terminal is the battery housing. However, according to the conventional cylindrical battery having such a structure, since current is concentrated in the strip-shaped electrode tab coupled to the uncoated portion of the positive electrode and/or the uncoated portion of the negative electrode, the current collection efficiency is not good due to large resistance and large heat generation.

For small cylindrical batteries with a form factor 1865 (diameter: 18 mm, height: 65 mm) or a form factor 2170 (diameter: 21 mm, height: 70 mm), resistance and heat are not a major issue. However, when the form factor is increased to apply the cylindrical battery to an electric vehicle, the cylindrical battery may ignite while a lot of heat is generated around the electrode tab during the rapid charging process.

In order to solve this problem, there is provided a cylindrical battery (so-called tab-less cylindrical battery) in which the uncoated portion of the positive electrode and the uncoated portion of the negative electrode are designed to be positioned at the top and bottom of the jelly-roll type electrode assembly, respectively, and the current collector is welded to the uncoated portion to improve the current collecting efficiency.

FIGS. 1 to 3 are diagrams showing a process of manufacturing a tab-less cylindrical battery. FIG. 1 shows the structure of an electrode, FIG. 2 shows a process of winding the electrode, and FIG. 3 shows a process of welding a current collector to a bending surface region of an uncoated portion.

Referring to FIGS. 1 to 3, a positive electrode 10 and a negative electrode 11 have a structure in which a current collector sheet 20 is coated with an active material 21, and include an uncoated portion 22 at one long side along the winding direction X. The long side means a relatively long side in a direction parallel to the x-axis direction.

An electrode assembly A is manufactured by sequentially stacking the positive electrode 10 and the negative electrode 11 together with two sheets of separators 12 as shown in FIG. 2 and then winding them in one direction X. At this time, the uncoated portions of the positive electrode 10 and the negative electrode 11 are arranged in opposite directions.

After the winding process, the uncoated portion 10a of the positive electrode 10 and the uncoated portion 11a of the negative electrode 11 are bent toward the core. After that, current collectors 30, 31 are welded and coupled to the uncoated portions 10a, 11a, respectively.

An electrode tab is not separately coupled to the positive electrode uncoated portion 10a and the negative electrode uncoated portion 11a, the current collectors 30, 31 are connected to external electrode terminals, and a current path is formed with a large cross-sectional area along the winding axis direction of electrode assembly A (see arrow), which has an advantage of lowering the resistance of the battery. This is because resistance is inversely proportional to the cross-sectional area of the path through which the current flows.

In the tab-less cylindrical battery, in order to improve the welding characteristics between the uncoated portions 10a, 11a and the current collectors 30, 31, a strong pressure must be applied to the welding regions of the uncoated portions 10a, 11a to bend the uncoated portions 10a, 11a as flat as possible.

However, when the bending welding regions of the uncoated portions 10a, 11a, the shapes of the uncoated portions 10a, 11a may be irregularly distorted and deformed. In this case, the deformed portion may contact an electrode of the opposite polarity to cause an internal short circuit or cause fine cracks in the uncoated portions 10a, 11a. In addition, as the uncoated portion 32 adjacent to the core of the electrode assembly A is bent, all or a significant portion of the cavity 33 in the core of the electrode assembly A is blocked. In this case, it causes a problem in the electrolyte injection process. That is, the cavity 33 in the core of the electrode assembly A is used as a passage through which an electrolyte is injected. However, if the corresponding passage is blocked, electrolyte injection is difficult. In addition, while an electrolyte injector is being inserted into the cavity 33, the electrolyte injector may interfere with the uncoated portion 32 near the core, which may cause the uncoated portion 32 to tear.

In addition, the bent portions of the uncoated portions 10a, 11a to which the current collectors 30, 31 are welded should be overlapped in multiple layers and there should not be any empty spaces (gaps). In this way, sufficient welding strength may be obtained, and even with the latest technology such as laser welding, it is possible to prevent laser from penetrating into the electrode assembly A and melting the separator or the active material.

Meanwhile, the bending surface region formed by bending the uncoated portions 10a, 11a of the electrode assembly A has almost no gap through which electrolyte can pass in the winding axis direction. This is because the gaps between the winding turns that exist immediately after winding mostly disappear in the process of bending the uncoated portions 10a, 11a. Therefore, the structure in which the entire ends of the uncoated portions 10a, 11a are bent may increase the electrolyte impregnation time.

In addition, in the conventional tab-less cylindrical battery, a positive electrode uncoated portion 10a is formed on the upper portion of the electrode assembly A as a whole. Therefore, when the beading portion is formed by press-fitting the outer circumference at the top of the battery housing inwards, the upper edge area 34 of the electrode assembly A is pressed by the battery housing. This pressing may cause partial deformation of the electrode assembly A, and at this time, an internal short circuit may occur as the separator 12 is torn. If a short circuit occurs inside the battery, this may cause heat generation or explosion of the battery.

DISCLOSURE

Technical Problem

The present disclosure is designed to solve the problems of the related art, and therefore the present disclosure is directed to providing an electrode assembly having an uncoated portion structure that is improved to relieve stress applied to uncoated portions when the uncoated portions exposed at both ends of an electrode assembly are bent.

The present disclosure is also directed to providing an electrode assembly in which an electrolyte injection passage is not blocked even if the uncoated portion is bent.

The present disclosure is also directed to providing an electrode assembly having a structure capable of preventing contact between the top edge of the electrode assembly and the inner surface of the battery housing when the top of the battery housing is beaded.

The present disclosure is also directed to providing an electrode assembly with improved properties of the welding region by applying a segment structure to the uncoated portion of the electrode and optimizing the dimension (width, height, and separation pitch) of the segment to sufficiently increase the segment stack number in the area used as the welding target area.

The present disclosure is also directed to providing an electrode assembly with improved energy density and reduced resistance by applying a structure in which a current collector is welded to the bending surface region formed by bending the segments through a broad area.

The present disclosure is also directed to providing an electrode assembly having a structure in which a current collector may be stably welded to the electrode assembly.

The present disclosure is also directed to providing an electrode assembly with improved electrolyte impregnation properties.

The present disclosure is also directed to providing a battery including a terminal and a current collector with an improved design so that electrical wiring may be performed at the upper portion.

The present disclosure is also directed to providing a battery including the electrode assembly having an improved structure, a battery pack including the battery, and a vehicle including the battery pack.

The technical objects to be solved by the present disclosure are not limited to the above, and other objects not mentioned herein will be clearly understood by those skilled in the art from the following disclosure.

Technical Solution

In one aspect of the present disclosure, there is provided an electrode assembly in which a first electrode, a second electrode, and a separator interposed therebetween are wound around a winding axis to define a core and an outer circumference of the electrode assembly, wherein at least one of the first electrode and the second electrode may include an active material portion coated with an active material layer and an uncoated portion not coated with an active material layer along the winding direction.

At least a part of the uncoated portion may be used as an electrode tab by itself.

The uncoated portion may include an insulating layer formed at a base end, which is a boundary region with the active material layer, along the winding direction.

The uncoated portion may include a segment region divided into a plurality of independently bendable segments by a plurality of cut grooves provided along the winding direction.

A gap between the bottom of the cut groove and the insulating layer may vary along the winding direction.

When the segment is bent, the insulating layer may support the base end of the uncoated portion to prevent the base end of the uncoated portion from being deformed. Since the rigidity of the base end is reinforced, when the segment is bent, the segment may be accurately bent based on the lower end of the segment.

At least a part of the insulating layer may be exposed to the outside of the separator. When the segment is bent, it is possible to prevent a short circuit from occurring between adjacent electrodes having different polarities by covering a region of the uncoated portion, which protrudes outward more than the separator, with an insulating layer.

The insulating layer formed on the uncoated portion may be thinner than the active material layer and thus may be spaced apart from the separator. That is, the active material layer may contact the separator, but there may be a gap between the insulating layer on the uncoated portion and the separator. Accordingly, even if the base end of the uncoated portion is slightly deformed by the bending force when the segment is bent, the insulating layer may minimize the effect of the deformation amount on the separator.

In a predetermined region of the electrode, the gap may increase or decrease more than the remaining region.

In a predetermined region of the electrode, the gap may be uniform along one direction parallel to the winding direction or may increase gradually or stepwise along one direction parallel to the winding direction.

The gap may be 0.2 mm to 4 mm.

The segments may have a geometric shape in which the width in the winding direction decreases from the bottom to the top, and the lower internal angle may gradually or stepwise increase from the core toward the outer circumference.

The plurality of segments may include a plurality of segment groups having the same lower internal angle between segments adjacent in the winding direction. If the segments are managed in groups, the segments may be designed and manufactured easily.

The lower internal angle ($\theta$) of each segment belonging to any one segment group may be equal to or greater than the lower internal angle of each segment belonging to a segment group disposed closer to the core. The curvature of a jelly-roll type electrode assembly decreases toward the outer circumference. Therefore, the gap between adjacent segments in the circumferential direction of the electrode assembly may be minimized by increasing the lower internal angle of the segments disposed closer to the outer circumference, which helps to secure the welding strength of the current collector, explained later.

The plurality of segments may include a plurality of segment groups that are identical in terms of a first element selected from the lower internal angle ($\theta$) of the segments, the axial height (H) of the segments, the width (D) of the segments in the winding direction, the shapes of the segments, and the height of the bottom of the cut groove between two segments, and the separation pitch (P) between two segments.

Here, the first element may be different between segments belonging to different segment groups.

When the first element is the lower internal angle of segments, the lower internal angle of segments belonging to any one segment group may be greater than the lower internal angle of segments belonging to a segment group disposed closer to the core.

When the first element is the height of the segment in the axial direction (winding axis of the jelly-roll shape), the height of segments belonging to one segment group may be higher than the height of segments belonging to a segment group disposed closer to the core. Then, when the segments disposed at the outer circumference are bent, the number of overlapping segments with the segments disposed closer to the core may be further increased, and in the radial direction of the electrode assembly, the number of overlapping segments of the bent segments is kept uniform, so it is possible to secure a bending surface region that is suitable for welding the current collector and easy to weld.

When the first element is the width of the segment in the winding direction, the width in the winding direction of segments belonging to any one segment group may be greater than the width in the winding direction of segments belonging to a segment group disposed closer to the core. The radius of curvature of the electrode assembly wound in a jelly-roll form increases toward the outer circumference. Therefore, it is desirable to gradually increase the width in the winding direction so that the segments may be bent smoothly.

The segments belonging to the same segment group may be identical not only in terms of the first element, but also in terms of a second element selected not to overlap with the first element from the lower internal angle of the segment, the axial height of the segment, the width of the segment in the winding direction, the shape of the segment, the height of the bottom of the cut groove between two segments, and the separation pitches between two segments.

For example, the segments belonging to the same segment group may be substantially the same in terms of all of the lower internal angle of the segment, the axial height of the segment, the width of the segment in the winding direction, the shape of the segment, the height of the bottom of the cut groove between the two segments, and the separation pitch between the two segments.

Segments belonging to different segment groups may be different from each other in terms of the second element. For example, segments belonging to different segment groups may be different from each other in terms of the lower internal angle of the segment, the axial height of the segment, and the width of the segment in the winding direction.

The plurality of segment groups may have a group separation interval Db greater than a separation pitch between segments in the same segment group.

The group separation interval Db may provide an electrolyte impregnation portion that is not covered by a segment bent on the surface perpendicular to the axial direction of the electrode assembly. The region corresponding to the electrolyte impregnation portion is not welded to the current collector and may improve the impregnation property of the electrolyte.

The segment groups separated by the group separation interval may be radially arranged based on the center of the electrode assembly to form a plurality of segment alignments. In addition, the electrolyte impregnation portion formed by the region in which the separation portion between the groups is wound may also be disposed radially based on the center of the electrode assembly. Accordingly, it is possible to secure a passage through which the electrolyte may be impregnated while surely securing a welding region with the current collector.

The segments included in the segment alignment may be bent in a radial direction toward the core of the electrode assembly to form a bending surface region in a plurality of separated regions.

The circumferential angle between segment alignments (or bending surface regions) adjacent in the circumferential direction may be substantially 30 degrees, 40 degrees, 45 degrees, 60 degrees, 72 degrees, 90 degrees, 120 degrees, or 180 degrees. The angle is an angle between angle measurement lines adjacent in the circumferential direction, when the angle measurement line is defined as a line connecting a geometric center of each segment alignment (or bending surface region) from the core center of the electrode assembly. The geometric center is a geometric center of a figure approximately formed by the edges of the segment alignment (or bending surface region) when the segment alignment (or bending surface region) is viewed in the axial direction. The geometric center may be the center of gravity of the figure.

The current collector may be welded to the plurality of bending surface regions. The number of welding locations may be 12, 9, 8, 6, 5, 4, 3, or 2 at equal intervals in the circumferential direction.

At least one of the group separation intervals and the width of each segment group in the winding direction may gradually or stepwise increase from the core toward the outer circumference. Accordingly, the bending surface region formed by bending the segments and/or the surface of the electrode assembly in the axial direction not covered by the segments may form a fan shape substantially without a central region.

The uncoated portion may include a first portion adjacent to the core of the electrode assembly, a second portion adjacent to an outer circumference surface of the electrode assembly, and a third portion interposed between the first portion and the second portion.

The third portion may include segments.

The second portion may have no segment structure.

Preferably, at least one of the first portion and the second portion may have a relatively smaller height in the winding axis direction than the third portion.

The first portion and the third portion may be directly connected without a region connecting them or connected through a region connecting them.

The third portion and the second portion may be directly connected without a region connecting them or connected through a region connecting them.

In the winding direction, the first portion region may start from an end near the core.

In the winding direction, the length of the third portion may be longer than the lengths of the first portion and the second portion.

In the winding direction, the second portion may include at least one last turn exposed to the outermost side of the electrode assembly.

The height of the uncoated portion in a predetermined region may mean an average height of the corresponding region or a maximum height within the corresponding region.

The height of the first portion may be constant along the winding direction. That is, the first portion may not include segments.

In at least a partial region of the third portion, the height of the segment may increase from the core toward the outer circumference.

At this time, the height of the segment may increase stepwise.

In addition, as the height increases stepwise, the length (width) in the winding direction of the region corresponding to each height may also increase stepwise.

The second portion may also include the segments.

The segment may be bent in the radial direction of the electrode assembly.

The segment may be bent toward the core in the central axis of the electrode assembly, namely in a centripetal direction.

The first portion does not have a segment, and thus may not be bent.

The last one turn may not include the segment. In addition, the last one turn may have a lower height than the third portion. In forming a jelly-roll type electrode assembly, if there is a segment to be bent in the last one turn, handling of the electrode assembly may be cumbersome because unexpected deformation of the segment must be prevented. If the segments of the last one turn are deleted, this cumbersome work may be reduced.

A hollow extending in the axial direction may be provided at the center of the electrode assembly, and the bent segment may not cover the hollow in a direction toward the core.

The bent third portion may overlap in the axial direction.

The bent third portion and the bent second portion may overlap in the axial direction.

Each of the plurality of segments may have a trapezoidal shape.

In one aspect, in at least a partial region of the third portion, the height in the winding axis direction may increase stepwise from the core toward the outer circumference.

In another aspect, at least a partial region of the third portion may be divided into a plurality of segments.

The uncoated portion may be divided by a cut groove extending from an axial end of the winding axis to an inner side of the axial direction (direction from the edge of the electrode assembly in the axial direction to the center in the axial direction). The shape of the cut groove is determined by the shape of the side of the segments located at both sides of the cut groove. When the uncoated portion is simply cut without removing at least a part of the uncoated portion from the notched portion by notching the uncoated portion, the cutting line may also be regarded as a cut groove.

In another aspect, each of the plurality of segments may have a rectangular, trapezoidal, triangular, parallelogram, semicircular, or semielliptical structure.

In one embodiment, each of the plurality of segments is trapezoidal, and the plurality of segments may be configured such that a lower internal angle of the trapezoid increases individually or in groups from the core toward the outer circumference.

By the segments, the extension length of the uncoated portion in the axial direction may be varied along the winding direction. For convenience of explanation, if the extension length of the uncoated portion in the axial direction (the distance to the front end in the axial direction) at a predetermined position in the winding direction is simply referred to as height, the meaning of the fact that the height of the uncoated portion at the first position in the winding direction is higher than the height of the uncoated portion at the second position in the winding direction may be clearly understood.

In explaining the height of the uncoated portion in the embodiment, the relative values of the height of the uncoated portion measured at different positions in the winding direction is more meaningful rather than the absolute value of the height of the uncoated portion, so in measuring the height of the uncoated portion, the rule for a line (zero point) that is the criterion for height measurement will be omitted.

The height of the uncoated portion may be different from each other in a portion corresponding to the top end of the segment, a portion corresponding to the cut groove prepared to form the segment, and a portion corresponding to the bottom of the cut groove. That is, even if the shape and size of the segments and the shape and size of the cut grooves are the same, the height of the uncoated portion measured in the axial direction may vary depending on the measurement position determined along the winding direction. For example, it will be apparent that, approximately, the height of the uncoated portion at the position in the winding direction corresponding to the top of the segment is higher than the height of the uncoated portion at the position in the winding direction corresponding to the bottom of the cut groove.

In addition, the height of the top end of each segment may be different, the shape of each cut groove may be different, and the height of the bottom of the cut grooves may also be different. That is, since the shape and size of the segments and the shape and size of the cut grooves may vary, the height of the uncoated portion measured in the axial direction may vary depending on the measurement position determined along the winding direction.

Meanwhile, the height of the segment may be defined as a distance (H) in the axial direction from the bottom of the cut groove defining the corresponding segment to the front end of the corresponding segment. If the heights of the bottom of the cut grooves at both sides are different based on the corresponding segment, the height of the corresponding segment may be defined as a distance in the axial direction from the point of average height of the heights of the bottoms of the cut grooves at both sides to the front end of the segment.

Preferably, at least one of the height in the winding axis direction and the width in the winding direction of the plurality of segments may increase stepwise from the core toward the outer circumference individually or in groups.

Preferably, each of the plurality of segments may satisfy at least one condition among a width condition of 1 mm to 11 mm in the winding direction; a height condition of 2 mm to 10 mm in the winding axis direction; and a separation pitch condition of 0.05 mm to 1 mm in the winding direction.

Preferably, a gap may exist between the bottom of the cut groove of the segment and the active material layer, but the gap may be 0.2 mm to 4 mm.

Preferably, the plurality of segments form a plurality of segment groups while going from the core toward the outer circumference, and segments belonging to the same segment group may be identical to each other in terms of at least one of a width in the winding direction, a height in the winding axis direction, and a separation pitch in the winding direction.

Preferably, when the width in the winding direction of the three segment groups consecutively adjacent in the radial direction of the electrode assembly are W1, W2, and W3, respectively, a combination of segment groups where W3/W2 is smaller than W2/W1 may be included.

Preferably, in the segments belonging to the same segment group, at least one of a width in the winding direction, a height in the winding axis direction, and a separation pitch in the winding direction may gradually increase from the core toward the outer circumference.

In one embodiment, at least a part of the plurality of segment groups may be disposed at the same winding turn of the electrode assembly.

In another embodiment, the first portion or the second portion may not have the segment structure of the uncoated portion.

The segment may be bent in a radial direction.

All of the plurality of segments may be bent.

A part of the plurality of segments may not be bent.

Preferably, the plurality of segments may be overlapped in several layers along the winding axis direction while being bent toward the core.

Preferably, a cavity may be provided in the core of the electrode assembly, and the cavity may be opened without being blocked by the plurality of segments bent toward the core.

To this end, the radial length (R) of the first portion and the bending length (H) of the innermost segment of the third portion may satisfy the relational expression H≤R.

In one embodiment, the height of the second portion may decrease stepwise or gradually from the core toward the outer circumference.

In one embodiment, the second portion is divided into a plurality of segments, and the plurality of segments included in the second portion may be greater than the plurality of segments included in the third portion in terms of at least one of a width in the winding direction, a height in the winding axis direction, and a separation pitch in the winding direction.

If an imaginary straight line drawn along the winding direction (circumferential direction) to correspond to the height of the bottom of the cut grooves is called a criterion line DL, the criterion line may be a straight line parallel to the winding direction X of the uncoated portion.

The criterion line may be disposed at a position corresponding to the bottom of the cut groove provided between two adjacent segments to form a segment.

The heights corresponding to the bottoms of the plurality of cut grooves may correspond to each other in the winding axis direction. In this case, a position of the criterion line may be defined as a position corresponding to the bottom of the cut grooves.

The heights corresponding to the bottoms of the plurality of cut grooves may be different from each other.

If most of the bottoms of the cut grooves (e.g., 50% or more) are located at a specific height and only the height of the bottoms of some cut grooves differs from the specific height, the location of the criterion line may be determined to correspond to a height corresponding to the specific height. That is, in this case, the criterion line may be determined based on the height of the bottom of the cut groove that occupies the most length in the winding direction. For example, if about ⅔ of the total length occupied by the bottom of the cut groove in the winding direction has a first height and the height of the bottom of the cut groove corresponding to the remaining ⅓ of the total length occupied by the bottom of the cut groove in the winding direction is different from the first height, the criterion line may be defined as a position corresponding to the first height.

If the height of the bottom of the cut grooves is not concentrated on a specific height (when the proportion of the region of the uncoated portion in which the cut groove with the most frequent height is formed is less than 50% of the total length of the electrode), the criterion line may be set to be located at an average height of the heights of the bottoms of the cut grooves. For example, when the height is measured based on the boundary point between the active material layer and the uncoated portion, if the length occupied by the region of the uncoated portion where the height of the bottom of the cut groove is 2 mm is 30% of the total length of the electrode, the length occupied in the winding direction by the region of the uncoated portion where the height of the bottom of the cut groove is 3 mm is 30% of the total length of the electrode, and the length occupied in the winding direction by the region of the uncoated region where the height of the bottom of the cut groove is 4 mm is 40% of the total length of the electrode, the criterion line may be located at 3.1 mm height, which is 2*0.3+3*0.3+4*0.4.

The position of the end SL of the separator in the axial direction Y may be regulated in relation to the criterion line DL.

A segment having the smallest height among the plurality of segments is referred to as a minimum segment.

In determining the segment with the smallest height, segments that are not bent may be excluded. That is, the minimum segment may refer to a segment having a minimum height among bent segments included in the bending surface region. The bending surface region refers to a region of the end surface of the electrode assembly where segments are bent in the radial direction and overlapped into a plurality of layers along the winding axis direction.

The minimum segment may be determined among segments that are bent.

If the height of the segment is less than 2 mm, there is a possibility that the segment may not be smoothly bent due to interference between the separator and the segment.

Accordingly, the minimum segment may be determined among segments having a height of 2 mm or more.

If the height of the segment is less than 3 mm, during the bending process, the segments may be not desirably bent in an intended direction or forming may be performed in an unintended direction.

Accordingly, the minimum segment may be determined among segments having a height of 3 mm or more.

If the height of the segment is less than 4 mm, the welding between the segments and/or the welding between the current collector and the segments may be performed incompletely.

Accordingly, the minimum segment may be determined among segments having a height of 4 mm or more.

If the height of the segment is 5 mm or more, bending may be performed reliably in the bending process even if manufacturing errors are taken into account.

Accordingly, the minimum segment may be determined among segments having a height of 5 mm or more.

The end SL of the separator in the width direction may be located in the outer direction of the electrode assembly within 30% of the height Ha of the minimum segment based on the criterion line DL, or the end SL of the separator in the width direction may be located in the inner direction of the electrode assembly within 30% of the height of the minimum segment based on the criterion line DL.

That is, the position of the end of the separator in the width direction may exist in the range of DL±0.3 Ha.

The end SL of the separator in the width direction may be located in the outer direction of the electrode assembly within 1.5 mm based on the criterion line DL, or the end SL of the separator in the width direction may be located in the inner direction of the electrode assembly within 1.5 mm based on the criterion line DL.

That is, the position of the end SL of the separator in the width direction may exist in the range of DL±1.5 mm.

The end SL of the separator in the width direction may be located in the outer direction of the electrode assembly within 1.2 mm based on the criterion line DL, or the end SL of the separator in the width direction may be located in the inner direction of the electrode assembly within 1.2 mm based on the criterion line DL.

That is, the position of the end SL of the separator in the width direction may exist in the range of DL±1.2 mm.

The end SL of the separator in the width direction may be located in the outer direction of the electrode assembly within 0.9 mm based on the criterion line DL, or the end SL of the separator in the width direction may be located in the inner direction of the electrode assembly within 0.9 mm based on the criterion line DL.

That is, the position of the end SL of the separator in the width direction may exist in the range of DL±0.9 mm.

The end SL of the separator in the width direction may be located in the outer direction of the electrode assembly within 0.6 mm based on the criterion line DL, or the end SL of the separator in the width direction may be located in the inner direction of the electrode assembly within 0.6 mm based on the criterion line DL.

That is, the position of the end SL of the separator in the width direction may exist in the range of DL±0.6 mm.

The position of the end SL of the separator in the width direction may exist in the range of DL±1.5 mm as well as the range of DL±0.3 Ha.

The position of the end SL of the separator in the width direction may exist in the range of DL±1.2 mm as well as the range of DL±0.3 Ha.

The position of the end SL of the separator in the width direction may exist in the range of DL±0.9 mm as well as the range of DL±0.3 Ha.

The position of the end SL of the separator in the width direction may exist in the range of DL±0.6 mm as well as the range of DL±0.3 Ha.

The separator may include: a porous polymer substrate; and a porous coating layer located on the surface of the porous polymer substrate and containing inorganic particles and a binder polymer.

The porous coating layer may be located on both surfaces of the porous polymer substrate.

The plurality of segments may have a predetermined separation pitch.

The separation pitch may be defined by the distance between the corners of the bottoms of two neighboring segments.

The separation pitch may be 0.5 mm or more. When the separation pitch is smaller than this, stress concentration appears so that cracks may occur at the bottom of the corresponding cut groove during processing, winding, or bending.

The corners of the bottoms of the two segments may be connected straight. That is, the bottom portion of the cut groove may have a flat linear shape extending in the winding direction X.

A round reinforcing portion may be added to the corner.

The radius (r) of the round reinforcing portion may be greater than or equal to 0.02 mm. If the corresponding radius is 0.02 mm or more, the effect of stress distribution may be clearly brought about.

The radius of the round reinforcing portion may be 0.1 mm or less. If the radius exceeds 0.1 mm, the effect of stress distribution no longer increases, and the space around the bottom of the cut groove decreases, which may deteriorate the impregnation property of the electrolyte.

The separation pitch may be less than 1 mm. If the separation pitch exceeds 1 mm, the impregnation property does not increase, but rather, a gap may be created between the bent segments, which may increase the possibility that the current collector is not welded properly.

The separation pitch may be determined in relation to the magnitude of the width of neighboring segments measured in the winding direction.

For example, as the width of the segments in the winding direction increases, the separation pitch between the segments may also tend to increase. Accordingly, the impregnation property of the electrolyte may be uniform.

The width of the segment in the winding direction may show a tendency to gradually increase from the core of the electrode assembly toward the outer circumference.

The width of the segment in the winding direction may increase gradually or stepwise from the core of the electrode assembly toward the outer circumference.

Accordingly, the separation pitch may also increase gradually or stepwise from the core of the electrode assembly toward the outer circumference.

In one aspect of the present disclosure, there may be provided a battery, comprising: an electrode assembly in which a first electrode, a second electrode, and a separator interposed therebetween are wound around a winding axis in a winding direction to define a core and an outer circumference of the electrode assembly; a battery housing configured to accommodate the electrode assembly and electrically connected to one of the first electrode and the second electrode to have a first polarity; a sealing body configured to seal an open end of the battery housing; and a terminal having a surface exposed to the outside and electrically connected to the other of the first electrode and the second electrode to have a second polarity.

Preferably, at least one of the first electrode and the second electrode may include an uncoated portion not coated with an active material layer at a long side end.

Preferably, at least a part of the uncoated portion may be used as an electrode tab by itself, and the uncoated portion may include: a first portion adjacent to the core of the electrode assembly, a second portion adjacent to the outer circumference of the electrode assembly, a third portion interposed between the first portion and the second portion, and at least one of the first portion and the second portion may have a relatively smaller height in the winding axis direction than the third portion.

In one embodiment, the second portion may have a relatively smaller height in the winding axis direction than the third portion, the battery housing may include a beading portion press-fitted inward at an end adjacent to the open end, and the inner circumference of the beading portion facing the upper edge of the electrode assembly and the second portion may be spaced apart by a predetermined interval.

Preferably, the press-fit depth (D1) of the beading portion and the distance (D2) from the inner circumference of the battery housing to a boundary point between the second portion and the third portion may satisfy the relational expression D1≤D2.

In one embodiment, the battery according to the present disclosure may further include a current collector electrically coupled to the third portion; and an insulator configured to cover the current collector and having an edge interposed and fixed between the inner circumference of the beading portion and the current collector.

In another embodiment, outermost diameters of the current collector and the third portion may be smaller than a minimum inner diameter of the inner circumference of the beading portion, and the diameter of the current collector may be greater than or equal to the outermost diameter of the third portion.

In still another embodiment, the current collector may be located higher than the beading portion.

Preferably, at least a partial region of the third portion may be bent from the outer circumference toward the core, the core of the electrode assembly may have a cavity, and the cavity may be open to the outside without being blocked by the bending structure of the third portion.

To this end, the third portion may include a plurality of segments separated along the winding direction of the electrode assembly, the plurality of segments may be bent from the outer circumference toward the core, and the length (R) of the first portion in the radial direction and the bending length (H) of the segment located at the innermost side of the third portion may satisfy the relational expression H≤R.

Preferably, each of the plurality of segments may have a rectangular, trapezoidal, triangular, parallelogram, semicircular or semielliptical structure.

Preferably, each of the plurality of segments may satisfy at least one condition among a width condition of 1 mm to 11 mm in the winding direction; a height condition of 2 mm to 10 mm in the winding axis direction; and a separation pitch condition of 0.05 mm to 1 mm in the winding direction.

Preferably, a gap may exist between the bottom of the cut groove of the segment and the active material layer, but the gap may be 0.2 mm to 4 mm.

Preferably, the plurality of segments form a plurality of groups, and segments belonging to the same segment group may be identical to each other in terms of at least one of a width in the winding direction, a height in the winding axis direction, and a separation pitch in the winding direction, and at least one of the plurality of groups may configure the same winding turn of the electrode assembly.

Preferably, when the width in the winding direction of the three segment groups consecutively adjacent in the radial direction of the electrode assembly are W1, W2, and W3, respectively, a combination of segment groups where W3/W2 is smaller than W2/W1 may be included.

In one embodiment, the sealing body includes a cap configured to seal the open end of the battery housing, and a gasket configured to surround an edge of the cap and crimped to the top end of the battery housing, and the terminal having the second polarity may be the cap.

In another embodiment, the battery according to the present disclosure may further include a current collector electrically connected to an uncoated portion of a second electrode having the first polarity and having an edge at least partially coupled to a sidewall of the battery housing. In this case, the sealing body may include a cap with no polarity, and a gasket configured to surround the edge of the cap and crimped to the top end of the battery housing, and the battery housing may include a rivet terminal installed to be insulated in a perforation hole formed in a center of a closing surface thereof and electrically connected to the first electrode to have the second polarity.

In another aspect of the present disclosure, there is also provided a battery pack, comprising a plurality of batteries described above.

Preferably, the battery may have a ratio of diameter to height greater than 0.4.

Preferably, the battery may have a form factor of 46110, 4875, 48110, 4880 or 4680.

Preferably, the battery may have a resistance of 4 milliohms or below.

In an aspect, in the battery pack, the plurality of batteries may be arranged in a predetermined number of columns, and the electrode terminal of each battery and an outer surface of the bottom of the battery housing may be arranged to face upward.

In another aspect, the battery pack may comprise a plurality of bus bars configured to connect the plurality of batteries in series and parallel.

Preferably, the plurality of bus bars may be disposed at an upper portion of the plurality of batteries, and each bus bar may include a body portion configured to extend between electrode terminals of adjacent batteries; a plurality of first bus bar terminals configured to extend in one side direction of the body portion and electrically coupled to an electrode terminal of a battery located in the one side direction; and a plurality of second bus bar terminals configured to extend in the other side direction of the body portion and electrically coupled to an outer surface of the bottom of the battery housing of a battery located in the other side direction.

In another aspect of the present disclosure, there is also provided a vehicle, comprising the battery pack.

Advantageous Effects

According to one aspect of the present disclosure, the internal resistance of the battery may be reduced and the energy density may be increased by using the uncoated portion itself protruding at the upper portion and the lower portion of the electrode assembly as an electrode tab.

According to another aspect of the present disclosure, by improving the structure of the uncoated portion of the electrode assembly to prevent interference between the electrode assembly and the inner circumference of the battery housing in the process of forming the beading portion of the battery housing, it is possible to prevent a short circuit from occurring inside the cylindrical battery due to partial deformation of the electrode assembly.

According to still another aspect of the present disclosure, the uncoated portion may be prevented from being torn when the uncoated portion is bent by improving the structure of the uncoated portion of the electrode assembly, and the welding strength of the current collector may be improved by sufficiently increasing the number of overlapping layers of the uncoated portion.

According to still another aspect of the present disclosure, by applying a segment structure to the uncoated portion of the electrode and optimizing the dimensions (width, height, separation pitch) of the segment to sufficiently increase the segment stack number in the area used as the welding target area, it is possible to improve the physical properties of the area where the current collector is welded.

According to still another aspect of the present disclosure, an electrode assembly having improved energy density and reduced resistance may be provided by applying a structure in which a current collector is welded to the bending surface region formed by bending the segments through a broad area.

According to still another aspect of the present disclosure, a cylindrical battery having an improved design so that electrical wiring can be performed at the upper portion thereof may be provided.

According to still another aspect of the present disclosure, by improving the structure of the uncoated portion adjacent to the core of the electrode assembly, the cavity in the core of the electrode assembly is prevented from being blocked when the uncoated portion is bent, so that the electrolyte injection process and the process of welding the battery housing (or, terminal) and the current collector may be easily performed.

According to still another aspect of the present disclosure, since the bending surface region formed by bending the segments of the uncoated portion is prepared to correspond to the welding portion with the current collector, it is possible to secure the impregnation of electrolyte while stably welding the current collector.

According to still another aspect of the present disclosure, even if the uncoated portion of the electrode assembly is bent, it is possible to sufficiently secure the impregnation of electrolyte.

According to still another aspect of the present disclosure, it is possible to provide a cylindrical battery having a structure in which the internal resistance is low, an internal short circuit is prevented, and the welding strength between the current collector and the uncoated portion is improved, and a battery pack and a vehicle including the cylindrical battery.

In particular, the present disclosure may provide a cylindrical battery having a ratio of diameter to height of 0.4 or more and a resistance of 4 milliohms or less, and a battery pack and a vehicle including the cylindrical battery.

In addition, the present disclosure may have several other effects, and such effects will be described in each embodiment, or any description that can be easily inferred by a person skilled in the art will be omitted for an effect.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 1 is a plan view showing a structure of an electrode used for manufacturing a conventional tab-less cylindrical battery.

FIG. 2 is a diagram showing an electrode winding process of the conventional tab-less cylindrical battery.

FIG. 3 is a diagram showing a process of welding a current collector to a bending surface region of an uncoated portion in the conventional tab-less cylindrical battery.

FIG. 4 is a plan view showing a structure of an electrode according to the first embodiment of the present disclosure.

FIG. 5 is a plan view showing the structure of an electrode according to the second embodiment of the present disclosure.

FIG. 6 is a plan view showing the structure of an electrode according to the third embodiment of the present disclosure.

FIG. 8c is a plan view showing a modified structure of the electrode according to the fifth embodiment of the present disclosure.

FIG. 10a is a schematic diagram showing a cross section of a bending surface region formed by bending the segment toward the core of the electrode assembly.

FIG. 11 is a cross-sectional view of a jelly-roll type electrode assembly in which the electrode of the first embodiment is applied to a first electrode (positive electrode) and a second electrode (negative electrode), taken along the Y-axis direction (winding axis direction).

BEST MODE

Figure 7A:
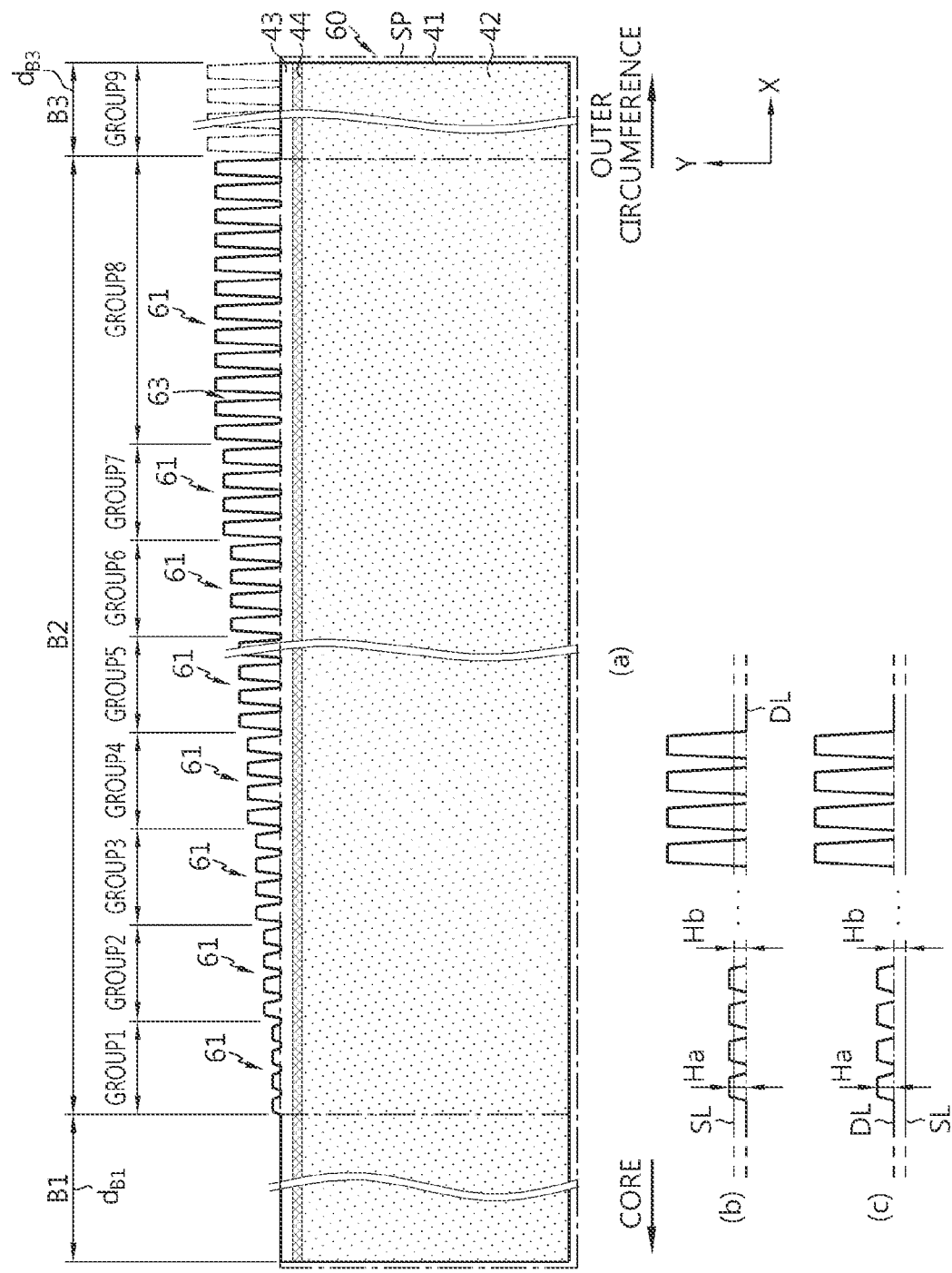
FIG. 7a is a plan view showing the structure of an electrode according to the fourth embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

In addition, in order to help understanding of the present disclosure, the accompanying drawings are not drawn to scale, and the dimensions of some components may be exaggerated. In addition, the same reference numerals may be assigned to the same elements in different embodiments.

When it is explained that two objects are 'identical', this means that these objects are 'substantially identical'. Accordingly, the substantially identical objects may include deviations considered low in the art, for example, deviations within 5%. Also, when it is explained that certain parameters are uniform in a region, this may mean that the parameters are uniform in terms of an average in the corresponding region.

Although the terms first, second or the like are used to describe different elements, these elements are not limited by the terms. These terms are used to distinguish one element from another, and unless stated to the contrary, a first element may be a second element.

Throughout the specification, unless stated otherwise, each element may be singular or plural.

When an element is "above (or under)" or "on (or below)" another element, the element can be on an upper surface (or a lower surface) of the other element, and intervening elements may be present between the element and the other element on (or below) the element.

Additionally, when an element is referred to as being "connected", "coupled" or "linked" to another element, the element can be directly connected or coupled to the other element, but it should be understood that intervening elements may be present between each element, or each element may be "connected", "coupled" or "linked" to each other through another element.

Also, singular expressions used in this specification include plural expressions unless the context clearly indicates otherwise. In this application, terms such as "including" or "comprising" should not be construed as necessarily including all of the various components or steps described in the specification, and it should be construed that some of the components or some of the steps may not be included, or additional components or steps may be further included.

Throughout the specification, "A and/or B" refers to either A or B or both A and B unless expressly stated otherwise, and "C to D" refers to C or greater and D or smaller unless expressly stated otherwise.

For convenience of description, a direction that goes along a lengthwise direction of a winding axis of an electrode assembly wound in a roll shape is herein referred to as an axis direction Y. Additionally, a direction around the winding axis is herein referred to as a circumferential or peripheral direction X. Additionally, a direction that gets closer to or faces away from the winding axis is referred to as a radial direction. Among them, in particular, the direction that gets closer to the winding axis is referred to as a centripetal direction, and the direction that faces away from the winding axis is referred to as a centrifugal direction.

First, an electrode assembly according to an embodiment of the present disclosure will be described. The electrode assembly may be a jelly-roll type electrode assembly in which a first electrode and a second electrode having a sheet shape and a separator interposed therebetween are wound in one direction. However, the present disclosure is not limited by the type of the electrode assembly.

Preferably, at least one of the first electrode and the second electrode includes an uncoated portion not coated with an active material at a long side end in the winding direction. At least a part of the uncoated portion is used as an electrode tab by itself. The uncoated portion includes a core side uncoated portion adjacent to the core of the electrode assembly, an outer circumference side uncoated portion adjacent to the outer circumference surface of the electrode assembly, and an intermediate uncoated portion interposed between the core side uncoated portion and the outer circumference side uncoated portion.

Preferably, at least one of the core side uncoated portion and the outer circumference side uncoated portion has a relatively lower height than the intermediate uncoated portion.

FIG. 4 is a plan view showing a structure of an electrode 40 according to the first embodiment of the present disclosure.

Referring to FIG. 4, the electrode 40 of the first embodiment includes a current collector 41 made of metal foil and an active material layer 42. The metal foil may be a conductive metal such as aluminum or copper, and is appropriately selected according to the polarity of the electrode 40. The active material layer 42 is formed on at least one surface of the current collector 41. The active material layer 42 is formed along the winding direction X. The electrode 40 includes an uncoated portion 43 at the long side end in the winding direction X. The uncoated portion 43 is a partial area of the current collector 41 not coated with the active material. The area of the current collector 41 where the active material layer 42 is formed may be called an active material portion.

In the electrode 40, the width of the active material portion in the short side direction of the current collector 141 may be 50 mm to 120 mm, and the length of the active material portion in the long side direction of the current collector 41 may be 3 m to 5 m. Therefore, the ratio of the short side to the long side of the active material portion may be 1.0% to 4.0%.

Preferably, in the electrode 40, the width of the active material portion in the short side direction of the current collector 141 may be 60 mm to 70 mm, and the length of the active material portion in the long side direction of the current collector 41 may be 3 m to 5 m. Therefore, the ratio of the short side to the long side of the active material portion may be 1.2% to 2.3%.

The ratio of the short side to the long side of the active material portion is significantly smaller than 6% to 11% that is the ratio of the short side to the long side of the active material portion of an electrode used in a cylindrical battery with a form factor of 1865 or 2170.

Preferably, the current collector 41 may have an elongation of 1.5% to 3.0%, and a tensile strength of 25 kgf/mm$^2$ to 35 kgf/mm$^2$. The elongation and tensile strength may be measured according to the measurement method of IPC-TM-650. The electrode 40 is manufactured by forming an active material layer 42 on the current collector 41 and then compressing the same. When compressed, the region of the uncoated portion 43 and the region of the active material layer 42 have different elongations. Therefore, a swell is formed on the electrode 40 after the compression, and as the electrode 40 is longer, the swell is more severe.

Optimization of the elongation and tensile strength of the current collector 41 reduces the camber length after compression to less than 20 mm when the length of the electrode 40 is about 4 m. The camber length is a maximum deflection amount of the electrode 40 in the winding direction X when the swollen electrode 20 is spread out. The maximum deflection amount may be measured at the end of the outer circumference. Since the electrode 40, in which the elongation and tensile strength of the current collector 41 are optimized, has a small camber length, meandering defects do not occur during the notching operation of the uncoated portion 43 or the winding process of the electrode 40.

The current collector 41 is more likely to break as the elongation is smaller. When the elongation of the current collector 41 is less than 1.5%, the rolling process efficiency of the current collector 41 is reduced, and so a disconnection may occur in the current collector 41 when the electrode 40 coated with the active material layer 42 is pressed on the current collector 41. Meanwhile, when the elongation of the current collector 41 exceeds 3.0%, the camber length greatly increases as the elongation of the active material portion of the electrode 40 increases. If the tensile strength of the current collector 41 is less than 25 kgf/mm² or greater than 35 kgf/mm², the electrode process efficiency of the electrode 40 is deteriorated.

The camber phenomenon is particularly problematic for positive electrode current collectors made of aluminum foil. According to the present disclosure, the camber phenomenon may be suppressed by using an aluminum foil with elongation of 1.5% to 3.0% and tensile strength of 25 kgf/mm² to 35 kgf/mm² as a current collector. It is desirable to form an active material layer on the current collector and use it as a positive electrode.

Preferably, an insulating coating layer 44 may be formed at a boundary between the active material layer 42 and the uncoated portion 43. Hereinafter, the insulating coating layer 44 may be simply referred to as an insulating layer 44. The insulating coating layer 44 is formed such that at least a part thereof overlaps with the boundary between the active material layer 42 and the uncoated portion 43. The insulating coating layer 44 prevents a short circuit between two electrodes having different polarities and facing each other with a separator interposed therebetween. The insulating coating layer 44 may cover a boundary between the active material layer 42 and the uncoated portion 43 with a width of 0.3 mm to 5 mm. The width of the insulating coating layer 44 may vary along the winding direction of the electrode 40. The insulating coating layer 44 may include a polymer resin and an inorganic filler such as $Al_2O_3$. Since the portion of the current collector 41 covered by the insulating coating layer 44 is not an area coated with an active material layer, it may be regarded as an uncoated portion.

The uncoated portion 43 includes a core side uncoated portion B1 adjacent to the core of the electrode assembly, an outer circumference side uncoated portion B3 adjacent to the outer circumference of the electrode assembly, and an intermediate uncoated portion B2 interposed between the core side uncoated portion B1 and the outer circumference side uncoated portion B3.

The core side uncoated portion B1, the outer circumference side uncoated portion B3, and the intermediate uncoated portion B3 may be defined as an uncoated portion in an area adjacent to the core, an uncoated portion in an area adjacent to the outer circumference, and an uncoated portion of the remaining area other than the above areas, respectively, when the electrode 40 is wound into a jelly-roll type electrode assembly.

Hereinafter, the core side uncoated portion B1, the outer circumference side uncoated portion B3, and the intermediate uncoated portion B2 are referred to as a first portion, a second portion, and a third portion, respectively.

In one example, the first portion B1 may be an uncoated portion of an electrode region including the innermost winding turn, and the second portion may be an uncoated portion of an electrode region including the outermost winding turn. The winding turn may be counted based on the core-side end of the electrode assembly.

In another example, the boundary of B1/B2 may be appropriately defined as a point at which the height (or, change pattern) of the uncoated portion substantially changes while going from the core of the electrode assembly toward the outer circumference, or a point of a predetermined % based on the radius of the electrode assembly (e.g., 5% point, 10% point, 15% point, or the like of the radius)

The boundary of B2/B3 may be defined as a point at which the height (or, change pattern) of the uncoated portion substantially changes as going from the outer circumference of the electrode assembly toward the core, or a point of a predetermined % based on the radius of the electrode assembly (e.g., 85% point, 90% point, 95% point, or the like of the radius). When the boundary of B1/B2 and the boundary of B2/B3 are specified, the third portion B2 may be automatically specified.

If only the boundary of B1/B2 is specified, the boundary of B2/B3 may be appropriately selected at a point near the outer circumference of the electrode assembly. In one example, the second portion may be defined as an uncoated portion of an area of the electrode constituting the outermost winding turn. Conversely, when only the boundary of B2/B3 is specified, the boundary of B1/B2 may be appropriately selected at a point near the core of the electrode assembly. In one example, the first portion may be defined as an uncoated portion of an area of the electrode constituting the innermost winding turn.

It is not excluded that another structure is interposed between the first portion B1 and the third portion B2. Also, it is not excluded that another structure is interposed between the third portion B2 and the second portion B3.

In the first embodiment, the height of the uncoated portion 43 is not constant and there is a relative difference in the winding direction X. That is, the height (length in the Y-axis direction) of the second portion B3 is 0 or more, but is relatively smaller than those of the first portion B1 and the third portion B2. Here, the height of each portion may be an average height or a maximum height, which is applied below in the same way. In the winding direction, the third portion B2 is longer than the first portion B1 and the second portion B3.

FIG. 5 is a plan view showing the structure of an electrode 45 according to the second embodiment of the present disclosure.

Referring to FIG. 5, the electrode 45 of the second embodiment substantially the same as the first embodiment, except that the height of the second portion B3 gradually decreases toward the outer circumference.

In one modification, the second portion B3 may be deformed into a step shape in which the height decreases stepwise (see dotted line).

FIG. 6 is a plan view showing the structure of an electrode 50 according to the third embodiment of the present disclosure.

Referring to FIG. 6, in the electrode 50 of the third embodiment, the heights of the first portion B1 and the second portion B3 are 0 or more, but are relatively smaller than the third portion B2. Also, the heights of the first portion B1 and the second portion B3 may be the same or different.

Preferably, the height of the third portion B2 may have a step shape gradually increasing from the core toward the outer circumference.

Patterns 1 to 7 classify the third portion B2 based on the location where the height of the uncoated portion 43 changes. Preferably, the number of patterns and the height (length in the Y-axis direction) and width (length in the X-axis direction) of each pattern may be adjusted to distribute the stress as much as possible during bending of the uncoated portion 43. The stress distribution is to prevent the uncoated portion 43 from being torn when the uncoated portion 43 is bent toward the core of the electrode assembly.

The width ($d_{B1}$) of the first portion B1 is designed by applying the condition that the core of the electrode assembly is not covered when the patterns of the third portion B2 are bent toward the core. The core means a cavity existing at the winding center of the electrode assembly.

In one example, the width ($d_{B1}$) of the first portion B1 may increase in proportion to the bending length of Pattern 1. The bending length corresponds to the height of the pattern based on the bending point of the pattern.

Preferably, the width ($d_{B1}$) of the first portion B1 may be set such that the radial direction width of the winding turns formed by the first portion B1 is equal to or greater than the bending length of Pattern 1. In a modification, the width ($d_{B1}$) of the first portion B1 may be set such that the value obtained by subtracting the radial width of the winding turns formed by the first portion B1 from the bending length of Pattern 1 is less than 0 or 10% or less of the radius of the core.

In a specific example, when the electrode 60 is used to manufacture an electrode assembly of a cylindrical battery having a form factor of 4680, the width ($d_{B1}$) of the first portion B1 may be set as 180 mm to 350 mm depending on the diameter of the core of the electrode assembly and the bending length of Pattern 1.

In one embodiment, the width of each pattern may be designed to constitute one or more winding turns of the electrode assembly.

In one modification, the height of the third portion B2 may have a step shape in which the height increases and then decreases from the core toward the outer circumference.

In another modification, the second portion B3 may be deformed to have the same structure as the second embodiment.

In still another modification, the pattern structure applied to the third portion B2 may be extended to the second portion B3 (see dotted line).

The third portion B2 may be folded in a radial direction of the electrode assembly based on an imaginary line connecting the front ends of the first portion B1 and the second portion B3 in the winding direction.

FIG. 7a is a plan view showing the structure of an electrode 60 according to the fourth embodiment of the present disclosure.

Referring to FIG. 7a, in the electrode 60 of the fourth embodiment, the first portion B1 and the second portion B3 have heights of 0 or more in the winding axis Y direction, but are relatively smaller than the third portion B2. In addition, the heights of the first portion B1 and the second portion B3 in the winding axis Y direction may be the same or different.

Preferably, at least a partial region of the third portion B2 may include a plurality of segments 61. The heights of the plurality of segments 61 may increase stepwise from the core toward the outer circumference. The plurality of segments 61 have a geometric shape in which the width decreases from the bottom to the top. Preferably, the geometric figure is a trapezoid. The corners or vertices of the trapezoid may be rounded or chamfered rather than sharpened. As will be described later, the shape of the geometric figure may be modified in various ways.

The segment 61 may be formed by laser notching. The segment 61 may be formed by a known metal foil cutting process such as ultrasonic cutting or punching.

The third portion B2 may be bent in a radial direction of the electrode assembly based on an imaginary line connecting the front ends of the first portion B1 and the second portion B3 in the winding direction. At this time, the segment 61 may be bent based on the bottom of the cut groove. The height of the bottom of the cut groove between the segments may correspond to the height of the first portion B1 and/or the second portion B3.

In the fourth embodiment, in order to prevent the active material layer 42 and/or the insulating coating layer 44 from being damaged during bending of the uncoated portion 43, it is preferable to provide a predetermined gap between the bottom (a portion indicated by G in FIG. 7b) of the cut groove between the segments 61 and the active material layer 42. This is because stress is concentrated near the bottom of the cut groove 63 when the uncoated portion 43 is bent.

The gap may be varied along the winding direction of the electrode 60. The gap is 0.2 mm to 4 mm, preferably 1.5 mm to 2.5 mm.

When the electrode 60 is a negative electrode, the gap is more preferably 1.0 mm or more, and when electrode 60 is a positive electrode, the gap is more preferably 2.0 mm or more.

If the gap is adjusted within the corresponding numerical range, it is possible to prevent the active material layer 42 and/or the insulating coating layer 44 from being damaged near the bottom of the cut groove 63 by the stress generated during bending of the uncoated portion 43.

Preferably, when the electrode 40 is wound into an electrode assembly, at least a part of the insulating coating layer 44 may be exposed to the outside of the separator. In this case, when the segment 61 is bent, the insulating coating layer 44 may support the bending point.

The gap may prevent the active material layer 42 and/or the insulating coating layer 44 from being damaged due to tolerance during notching or cutting of the segment 61. In one direction parallel to the winding direction, the gap may be substantially the same or may vary. In the latter case, the gaps of the plurality of segments may be varied individually, in a group unit, or in two or more group units, along one direction parallel to the winding direction.

The lower end of the segment 61 formed by the cut groove 63 may be a region where bending is induced in a bending process of the segment 61. That is, in the bending process, the bending resistance ability is almost constant from the lower end of the uncoated portion 43 to the vicinity of the bottom of the cut groove 63, then rapidly decreases near the bottom of the cut groove 63, and then is almost constant until reaching the top of the segment 61.

The lower end of the cut groove 63 and the insulating coating layer 44 may be spaced apart by 0.2 mm to 2.0 mm. If the separation distance is less than 0.2 mm, the above-described damage prevention effect may not be sufficiently exhibited, and if the separation distance is greater than 2.0 mm, the bending support effect of the insulating coating layer 44 may be reduced without increasing the damage prevention effect.

In one direction parallel to the winding direction, the separation distance between the lower end of the cut groove 63 and the insulating coating layer 44 may be substantially the same or variable. In the latter case, the separation distances of the plurality of segments may be varied individually, in a group unit, or in two or more group units, along one direction parallel to the winding direction.

When the electrode 60 is wound, the end of the insulating coating layer 44 in the winding axis Y direction may be located in the range of −2 mm to 2 mm along the winding axis direction based on the end of the separator. The insulating coating layer 44 may prevent a short circuit between two electrodes having different polarities and facing each other with a separator interposed therebetween, and may support a bending point when the segment 61 is bent. In order to improve the short circuit prevention effect between the two electrodes, the insulating coating layer 44 may be exposed to the outside of the separator. In addition, in order to further maximize the effect of preventing a short circuit between the two electrodes, the width of the insulating coating layer 44 may be increased so that the end of the insulating coating layer 44 in the winding axis Y direction is located above the lower end of the cut groove 63. In one embodiment, the end of the insulating coating layer 44 in the winding axis direction may be located within a range of −2 mm to +2 mm based on the lower end of the cut groove 63. The thickness of the insulating coating layer 44 may be smaller than the thickness of the active material layer 42. Accordingly, when the electrode 60 is stacked with the separator, the insulating coating layer 44 may come into contact with the separator weaker than the active material layer 42 or form a gap from the separator, compared to the degree to which the active material layer 42 of the electrode 60 adheres to the separator.

The insulating coating layer 44 provides a supporting force so that the base end of the uncoated portion is not deformed during the bending process of the segment 61. However, even if the supporting force does not overcome the bending force and causes slight deformation, since there is a slight gap between the insulating coating layer 44 and the separator, the deformation of the insulating coating layer 44 may not immediately and directly affect the separator.

The plurality of segments 61 may form a plurality of segment groups from the core toward the outer circumference. In the segment group, segments adjacent in the winding direction may be identical in terms of at least one of the lower internal angles of the segments, the axial heights of the segments, the widths of the segments in the winding direction, the shapes of the segments, the heights of the bottom of the cut groove between the two segments, and the separation pitch between the two segments.

FIG. 7a exemplarily shows an embodiment in which the width, height, and separation pitch of the segments belonging to the same segment group are substantially the same.

Among segments belonging to different segment groups, at least one factor, which is the same within the same group, may be different.

In another aspect, the separation pitches of the plurality of segments may gradually or stepwise increase from the core toward the outer circumference in a group unit or in two or more group units, or vice versa.

In still another aspect, the separation pitches of the plurality of segments may gradually or stepwise increase and then gradually or stepwise decrease from the core toward the outer circumference is in a group unit or in two or more group units, or vice versa.

In still another aspect, in the plurality of segments, the gap between the lower end of the cut groove 63 and the insulating coating layer 44 or the active material layer 42 may gradually or gradually increase from the core toward the outer circumference, or vice versa.

In still another aspect, in the plurality of segments, the gap between the lower end of the cut groove 63 and the insulating coating layer 44 or the active material layer 42 may gradually or gradually increase or gradually or gradually decrease from the core toward the outer circumference, or vice versa.

In the embodiment of FIG. 7a, the heights of the segments are different in different segment groups. In the electrode assembly, the separator SP may face the active material layer 42 and/or the insulating coating layer 44 of the electrode 60. Preferably, the position of the end of the separator SP may be adjusted to improve the impregnability of the electrolyte.

In the electrode assembly, when a line extending parallel to the winding direction X based on the point with the smallest height among the first portion B1, the second portion B3 and the third portion B2 is defined as a criterion line DL and a segment with a smallest height among the plurality of segments is called a minimum segment, the end SL of the separator SP in the width direction may be located in the outer direction of the electrode assembly within 30% of the height Ha of the minimum segment based on the criterion line DL. Here, the outer direction of the electrode assembly refers to a direction oriented from the active material layer 42 of the electrode 60 toward the uncoated portion 43. In FIG. 7a, Hb is a distance between the end SL of the separator SP and the criterion line DL.

Alternatively, the end SL of the separator SP in the width direction may be located in the inner direction of the electrode assembly within 30% of the height Ha of the minimum segment based on the criterion line DL. Here, the inner direction of the electrode assembly refers to a direction oriented from the uncoated portion 43 of the electrode 60 toward the active material layer 42.

Preferably, the height Ha of the minimum segment may substantially correspond to a minimum value among height values of the segments bent in the radial direction of the electrode assembly.

The criterion line DL, which is a line extending parallel to the winding direction X from the point with the smallest height among the first portion B1, the second portion B3 and the third portion B2, corresponds to the bottom of the cut groove 63 between adjacent segments, and the bottom of the cut groove may be referred to as a notching groove.

According to one embodiment of the present disclosure, by controlling the end of the separator SP in the width direction to be located close to the criterion line DL, the electrolyte flows into the electrode assembly along the notching groove (empty space), so the impregnation rate increases. Specifically, when the electrolyte is injected into the battery housing where the electrode assembly is inserted, the electrolyte moves to the notching groove between the segments of the uncoated portion of the electrode. The electrolyte also impregnates into the notching groove between the segments, namely the end of the separator located close to the criterion line, and finally impregnates into the active material layer of the electrode. As a result, the uniformity of electrolyte impregnation within the electrode assembly is increased.

As the end SL of the separator SP in the width direction extends in the outer direction of the electrode assembly, the welding characteristics are negatively affected, and as the end SL of the separator SP in the width direction is located toward the inner side of the electrode assembly, the risk of short circuit of the positive electrode and the negative electrode increases, which may be a problem.

Therefore, in the present disclosure, the end SL of the separator SP in the width direction is controlled to be located in the outer direction of the electrode assembly within 30% of the height of the minimum segment based on the criterion line DL, or the end SL of the separator SP in the width direction is controlled to be located in the inner direction of the electrode assembly within 30% of the height of the minimum segment based on the criterion line DL.

According to one embodiment of the present disclosure, the end SL of the separator SP in the width direction may be located in the outer direction of the electrode assembly within 1.5 mm based on the criterion line DL, or the end SL of the separator SP in the width direction may be located in the inner direction of the electrode assembly within 1.5 mm based on the criterion line DL.

Figure 7B:
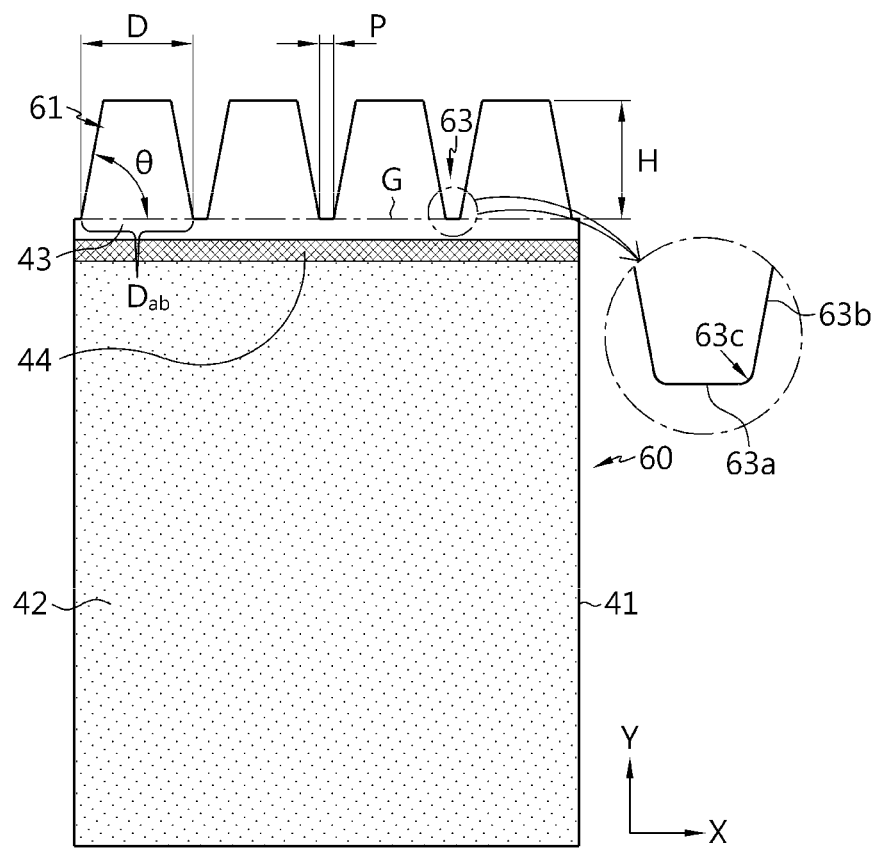
FIG. 7b is a diagram showing the definitions of width, height and separation pitch of a segment according to an embodiment of the present disclosure.

FIG. 7b is a diagram showing the definitions of width D, height H and separation pitch P of a segment 61 according to an embodiment of the present disclosure.

Referring to FIG. 7b, the width (D), height (H), and separation pitch (P) of the segment 61 are designed to prevent the uncoated portion 43 near the bending point from being torn during bending of the uncoated portion 43 and to prevent abnormal deformation of the uncoated portion 43 while sufficiently increasing the number of overlapping layers of the uncoated portion 43 to secure sufficient welding strength.

The segment 61 is bent at the line G passing through the bottom of the cut groove 63 or at the top thereof. The cut groove 63 enables smooth and easy bending of the segment 61 in the radial direction of the electrode assembly.

The width (D) of the segment 61 is defined as the length between two points where two straight lines extending from both sides 63b of the segment 61 meet a straight line extending from the bottom 63a of the cut groove 63. The height (H) of the segment 61 is defined as the shortest distance between the uppermost edge of the segment 61 and a straight line extending from the bottom 63a of the cut groove 63. The separation pitch (P) of the segment 61 is defined as the length between two points where a straight line extending from the bottom 63a of the cut groove 63 meets straight lines extending from both sides 63b connected to the bottom 63a. When the side 63b and/or the bottom 63a is curved, the straight line may be replaced with a tangent extending from the side 63b and/or the bottom 63a at an intersection point where the side 63b and the bottom 63a meet.

Preferably, the width (D) of the segment 61 is 1 mm or more. If D is less than 1 mm, when the segment 61 is bent toward the core, an area or an empty space (gap) where the segments 61 do not overlap enough to sufficiently secure sufficient welding strength may occur.

Preferably, the width (D) of the segments 61 may be adjusted adaptively depending on the radius of the winding turn where the segments 61 are located so that segments 61 overlap well in the radial direction when the segments 61 are bent toward the core of the electrode assembly.

Figure 7C:
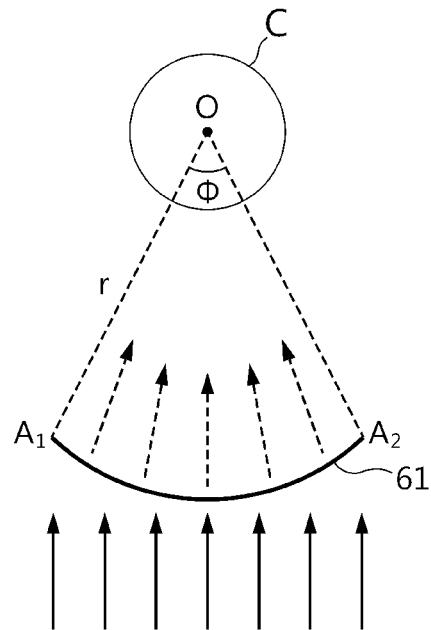
FIG. 7c is a diagram showing an arc formed by a lower end of the segment, where the width of the segment is defined, with respect to the center of the core of the electrode assembly, when the electrode is wound according to an embodiment of the present disclosure.

FIG. 7c is a diagram showing an arc $(A_1A_2)$ formed by a lower end (line $D_{ab}$ in FIG. 7b) of the segment 61, where the width D of the segment 61 is defined, with respect to the center O of the core of the electrode assembly, when the electrode 60 is wound according to an embodiment of the present disclosure.

Referring to FIG. 7c, the arc $(A_1A_2)$ has a length corresponding to the width (D) of the segment 61 and has a circumferential angle (Φ) based on the center of the core of the electrode assembly. The circumferential angle (Φ) may be defined as the angle between two line segments connecting both ends of the arc $(A_1A_2)$ and the center O of the core on a plane perpendicular to the winding axis passing through the arc $(A_1A_2)$.

When the length of the arc $(A_1A_2)$ of the segment 61 is the same, the circumferential angle (Φ) decreases as the radius (r) of the winding turn where the segment 61 is located increases. Conversely, when the circumferential angle (Φ) of the segment 61 is the same, the length of the arc $(A_1A_2)$ increases proportionally as the radius (r) of the winding turn where the segment 61 is located increases.

The circumferential angle (Φ) affects the bending quality of the segment 61. In the drawing, a solid arrow indicates a direction of force applied to bend the segment 61, and a dotted arrow indicates a direction in which the segment 61 is bent. The bending direction is a direction toward the center O of the core.

The circumferential angle (Φ) of the segment 61 may be 45 degrees or less, preferably 30 degrees or less, depending on the radius (r) of the winding turn where the segment 61 is located in order to improve bending uniformity and prevent cracking.

In one aspect, the circumferential angle (Φ) of the segment 61 may gradually or stepwise increase or decrease along the radial direction of the electrode assembly within the above numerical range. In another aspect, the circumferential angle (Φ) of the segment 61 may gradually or stepwise increase or gradually or stepwise decrease along the radial direction of the electrode assembly within the above numerical range, or vice versa. In another aspect, circumferential angle (Φ) of the segment 61 may be substantially the same along the radial direction of the electrode assembly within the above numerical range.

According to experiments, when the circumferential angle (Φ) of the segment 61 exceeds 45 degrees, the bending shape of the segment 61 is not uniform. The difference between the force applied to the middle part of the segment 61 and the force applied to the side part increases, so the compression of the segment 61 is not uniform in the circumferential direction. In addition, if the pressing force is increased for uniformity of bending, cracks may occur in the uncoated portion 43 near the cut groove 63.

In one embodiment, the circumferential angles (Φ) of the segments 61 included in the electrode 60 are substantially the same, and the widths of the segments 61 may proportionally increase as the radius (r) of the winding turn in which the segment 61 is located increases. The term 'substantially the same' means completely identical or with a variance of less than 5%.

For example, when the radius of the electrode assembly is 22 mm, the radius of the core is 4 mm, the segments 61 are disposed starting from the winding turn located at the point where the radius is 7 mm, if the circumferential angles (Φ) of the segments 61 are uniform as 28.6 degrees, the widths (D) of the segments 61 may proportionally increase according to the radius (r) of the winding turn where the segments 61 are located, as shown in Table 1 below. That is, the widths of the segments 61 may increase at substantially the same rate by 0.5 mm whenever the radius (r) of the winding turn increases by 1 mm.

TABLE 1

| winding turn radius (mm) | 7.0 | 8.0 | 9.0 | 10.0 | 11.0 | 12.0 | 13.0 | 14.0 | 15.0 | 16.0 | 17.0 | 18.0 | 19.0 | 20.0 | 21.0 | 22.0 |
|---|---|---|---|---|---|---|---|---|---|---|---|---|---|---|---|---|
| segment width (D, mm) | 3.5 | 4.0 | 4.5 | 5.0 | 5.5 | 6.0 | 6.5 | 7.0 | 7.5 | 8.0 | 8.5 | 9.0 | 9.5 | 10.0 | 10.5 | 11.0 |
| circumferential angle (degree) | 28.6 | 28.6 | 28.6 | 28.6 | 28.6 | 28.6 | 28.6 | 28.6 | 28.6 | 28.6 | 28.6 | 28.6 | 28.6 | 28.6 | 28.6 | 28.6 |

Preferably, the width D(r) of the segment 61 located in a winding turn having a radius of r based on the core center O of the electrode assembly may be determined within a range satisfying Formula 1 below.

$$1 \leq D(r) \leq (2*\pi*r/360°)*45° \qquad \text{<Formula 1>}$$

Preferably, the widths D(r) of the plurality of segments 61 in the winding direction may gradually or stepwise increase as the radius r of the winding turn where the segment 61 is located increases based on the core center of the electrode assembly, or vice versa.

In another aspect, the widths D(r) of the plurality of segments 61 in the winding direction may gradually or stepwise increase in the range of 1 mm to 11 mm as the radius r of the winding turn where the segment 61 is located increases based on the core center of the electrode assembly, or vice versa.

In still another aspect, the widths D(r) of the plurality of segments 61 in the winding direction may gradually or stepwise increase and then gradually or stepwise decrease as the radius r of the winding turn where the segment 61 is located increases based on the core center of the electrode assembly, or vice versa.

In still another aspect, the widths D(r) of the plurality of segments 61 in the winding direction may gradually or stepwise increase and then gradually or stepwise decrease in the range of 1 mm to 11 mm as the radius r of the winding turn where the segment 61 is located increases based on the core center of the electrode assembly, or vice versa.

In still another aspect, the rate at which the widths D(r) of the segments 61 change as the radius r of the winding turn where the segment 61 is located increases may be the same or different.

In still another aspect, the rate at which the widths D(r) of the segments 61 change in the range of 1 mm to 11 mm as the radius r of the winding turn where the segment 61 is located increases may be the same or different.

Referring to FIG. 7b again, the height (H) of the segment 61 may be 2 mm or more. If D2 is less than 2 mm, when the segment 61 is bent toward the core, an area or an empty space (gap) where the segments 61 do not overlap enough to sufficiently secure sufficient welding strength may occur.

The height (H) of the segment 61 may be determined by applying the condition that the segment 61 does not block the core when being bent toward the core. Preferably, the height (H) of segment 61 may be adjusted so that 90% or more of the diameter of the core may be opened to the outside.

Preferably, the heights (H) of the segments 61 may increase from the core toward the outer circumference depending on the radius of the winding turn and the radius of the core where the segments 61 are located.

In one embodiment, when the heights (H) of the segments 61 increase stepwise over N steps from $h_1$ to $h_N$ as the radius of the winding turn increases, assuming that the $k^{th}$ height of the segment 61 (k is a natural number from 1 to N) is $h_k$, the starting radius of the winding turn including the segment 61 having the height $h_k$ is $r_k$ and the radius of the core is $r_c$, the heights $h_1$ to $h_N$ of the segments 61 may be determined to satisfy Formula 2 below.

$$2 \text{ mm} \leq h_k \leq r_k - \alpha*r_c \text{ (preferably, } \alpha \text{ is 0.90 to 1)} \qquad \text{<Formula 2>}$$

If the heights ($h_k$) of the segments 61 meet Formula 2, even if the segments 61 are bent toward the core, 90% or more of the diameter of the core may be open to the outside.

In one example, the radius of the entire winding turns of the electrode 60 is 22 mm, the heights of the segments 61 start from 3 mm, and the heights of segments 61 are increased sequentially to 3 mm, 4 mm, 5 mm and 6 mm whenever the radius of the winding turn including the segment 61 increases by 1 mm, and the heights may be maintained substantially identically at 6 mm in the remaining winding turns. That is, among the radii of the entire winding turns, the radial width of the height variable region of the segment 61 is 3 mm, and the remaining radial region corresponds to the height uniform region.

In this case, when α is 1 and the equal sign condition is applied in the right inequality, the starting radius $r_1$, $r_2$, $r_3$, $r_4$ of the winding turns including the segments 61 having heights of 3 mm, 4 mm, 5 mm, and 6 mm depending on the radius ($r_c$) of the core of the electrode assembly may be as shown in Table 2 below.

TABLE 2

| Item | | Segment height ((mm)) | | | |
|---|---|---|---|---|---|
| | | 3 ($h_1$) | 4 ($h_2$) | 5 ($h_3$) | 6 ($h_4$) |
| Core radius | 2 | 5 ($r_1$) | 6 ($r_2$) | 7 ($r_3$) | 8 ($r_4$) |
| ($r_c$) | 2.5 | 5.5 ($r_1$) | 6.5 ($r_2$) | 7.5 ($r_3$) | 8.5 ($r_4$) |
| (mm) | 3 | 6 ($r_1$) | 7 ($r_2$) | 8 ($r_3$) | 9 ($r_4$) |
| | 3.5 | 6.5 ($r_1$) | 7.5 ($r_2$) | 8.5 ($r_3$) | 9.5 ($r_4$) |
| | 4 | 7 ($r_1$) | 8 ($r_2$) | 9 ($r_3$) | 10 ($r_4$) |

When the segments 61 are arranged at the radius locations shown in Table 2, the core is not blocked by the segments 61 even if the segments 61 are bent toward the core. Meanwhile, $r_1$, $r_2$, $r_3$, $r_4$ shown in Table 1 may be shifted toward the core according to the value of α. In one example, when α is 0.90, $r_1$, $r_2$, $r_3$, $r_4$ may be shifted toward the core by 10% of the core radius. In this case, when the segment 61 is bent toward the core, 10% of the core radius is blocked by the segment 61. $r_1$, $r_2$, $r_3$, $r_4$ shown in Table 1 are limit values of the location where the segment 61 starts. Therefore, the location of the segment 61 may be shifted toward the outer circumference by a predetermined distance rather than the radius shown in Table 2.

Figure 7D:
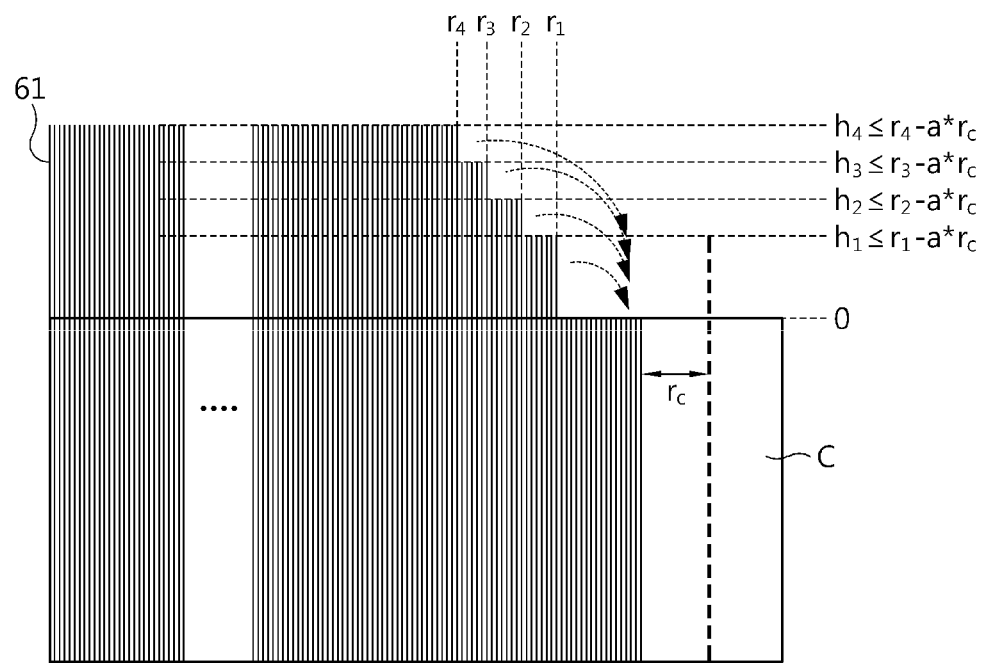
FIG. 7d is a diagram schematically showing the relationship between heights $h_1$, $h_2$, $h_3$, $h_4$ of segments, core radius $r_c$, and radii $r_1$, $r_2$, $r_3$, $r_4$ of winding turns where segments begin to appear, according to an embodiment of the present disclosure.

FIG. 7d is a diagram schematically showing the relationship of the heights $h_1$, $h_2$, $h_3$, $h_4$ of the segments 61, the core radius ($r_c$), and the radii $r_1$, $r_2$, $r_3$, $r_4$ of the winding turns where the segments 61 begins to appear.

Referring to Table 2 and FIG. 7d together, for example, when the radius ($r_c$) of the core C is 3 m, the starting radii $r_1$, $r_2$, $r_3$ and $r_4$ of the winding turns including the segments 61 having heights of 3 mm ($h_1$), 4 mm ($h_2$), 5 mm ($h_3$) and 6 mm ($h_4$) may be 6 mm, 7 mm, 8 mm, and 9 mm, respectively, and the heights of the segments 61 may be maintained at 6 mm from the radius 9 mm to the last winding turn. Also, the segment 61 may not be included in the winding turn having a radius smaller than 6 mm ($r_1$). In this example, since the segment 61 having a height of 3 mm ($h_1$) closest to the core C is located from the winding turn having a radius of 6 mm, even if the segments 61 are bent toward the core C, the segments 61 cover only the radial region of 3 mm to 6 mm and substantially does not block the core C. According to the α value of Formula 2, the location of the segment 61 may be shifted toward the core C within 10% of the core radius ($r_c$).

In another embodiment, the height of the segment 61 may increase at the same or different rate as the starting radius r of the winding turn where the segment 61 is located increases based on the core center of the electrode assembly.

Preferably, the height (H) of the segment 61 satisfies Formula 2, and at the same time the maximum height of the segment 61 may be limited.

Figure 7E:
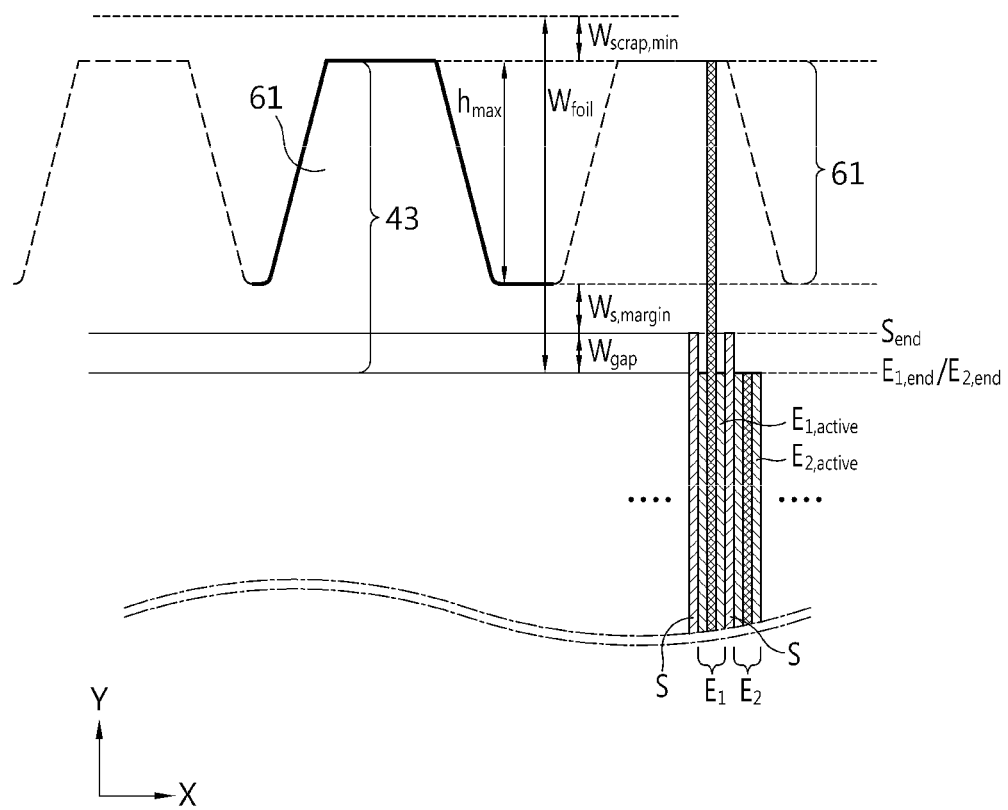
FIG. 7e is a conceptual diagram for determining a maximum value ($h_{max}$) for the height (H) of the segment in a segment height variable region.

FIG. 7e is a conceptual diagram for determining a maximum value ($h_{max}$) for the height (H) of the segment 61 in a segment height variable region of the segment 61.

Referring to FIG. 7e, in the winding structure of the electrode assembly, the electrode ($E_1$) including the segment 61 faces the electrode ($E_2$) of opposite polarity with the separator S interposed therebetween in the radial direction. Both surfaces of the electrode ($E_1$) are coated with an active material layer ($E_{1,active}$), and both surfaces of the electrode ($E_2$) are also coated with an active material layer ($E_{2,active}$). For electrical insulation, the end ($S_{end}$) of the separator S may further extend outward from the end ($E_{2,end}$) of the electrode ($E_2$) to a length corresponding to the insulation gap ($W_{gap}$). Also, the end of the electrode ($E_1$) does not further extend outward beyond the end of the electrode ($E_2$) for electrical insulation. Therefore, a region corresponding to the insulation gap ($W_{gap}$) should be secured at the lower end of the uncoated portion 43. Also, when the electrodes ($E_1$, $E_2$) and the separator S are wound, the end ($S_{end}$) of the separator S causes meandering. Therefore, in order for the segment 61 to be exposed to the outside of the separator S, the region ($W_{margin,min}$) corresponding to a minimum meandering margin of the separator S must be allocated to the uncoated portion 43. In addition, in order to cut the segment 61, a minimum cutting scrap margin ($W_{scrap,min}$) should be allocated to the end of the current collector foil. Therefore, the maximum height ($h_{max}$) of the segment 61 in the height variable region of the segment 61 may be determined by Formula 3 below. In Formula 3, $W_{foil}$ corresponds to the width of the current collector foil before the current collector foil is cut.

$$h_{max} = W_{foil} - W_{scrap,min} - W_{margin,min} - W_{gap} \quad \text{<Formula 3>}$$

Preferably, the insulation gap $W_{gap}$ may be 0.2 mm to 6 mm when the first electrode is a positive electrode. In addition, the insulation gap $W_{gap}$ may be 0.1 mm to 2 mm when the first electrode is a negative electrode.

Preferably, the minimum cutting scrap margin $W_{scrap,min}$ may be 1.5 mm to 8 mm. The minimum cutting scrap margin ($W_{scrap,min}$) may not be allocated depending on the process of forming the segment 61. For example, the cut groove 63 may be formed such that the upper edge of the segment 61 and the upper edge of the current collector foil coincide with each other. In this case, in Formula 3, $W_{scrap,min}$ may be 0.

Preferably, the minimum meander margin $W_{margin,min}$ of the separator may be 0 mm to 1 mm.

In one example, the minimum cutting scrap margin ($W_{scrap,min}$) may be 1.5 mm, and the minimum meandering margin ($W_{margin,min}$) of the separator S may be 0.5 mm. Under these conditions, when the width ($W_{foil}$) of the current collector foil before forming the segment 61 is 8 mm to 12 mm and the insulation gap ($W_{gap}$) is 0.6 mm, 0.8 mm, and 1.0 mm, the maximum height ($h_{max}$) of the segment 61 may be calculated using Formula 3 as in Table 3 below.

TABLE 3

| Item | Gap of Separator ↔ Negative electrode (mm) | | |
|---|---|---|---|
|  | 0.6 | 0.8 | 1 |
| Width of current collector foil (mm) 8 | 5.4 | 5.2 | 5 |
| 9 | 6.4 | 6.2 | 6 |
| 10 | 7.4 | 7.2 | 7 |
| 11 | 8.4 | 8.2 | 8 |
| 12 | 9.4 | 9.2 | 9 |

Considering Table 3, the maximum height ($h_{max}$) of the segment 61 in the height variable region of the segment 61 may be set to 10 mm. Therefore, in the height variable region of the segment 61, the height of the segment 61 satisfies Formula 2 and may increase stepwise or gradually along the radial direction of the electrode assembly in the range of 2 mm to 10 mm. The design condition in which the height of the segment 61 exceeds 10 mm may cause swells in the uncoated portion to deteriorate the flatness of the uncoated portion.

Referring to FIG. 7b again, the separation pitch (P) of the segment 61 may be adjusted in the range of 0.05 mm to 1 mm. If the separation pitch (P) is less than 0.05 mm, cracks may occur in the uncoated portion 43 near the lower end of the cut groove 63 due to stress when the electrode 60 travels in the winding process or the like. Meanwhile, if the separation pitch (P) exceeds 1 mm, an area or an empty space (gap) where the segments 61 do not overlap each other enough to sufficiently secure the welding strength when the segment 61 is bent may occur.

Meanwhile, when the current collector 41 of the electrode 60 is made of aluminum, it is more preferable to set the separation pitch (P) as 0.5 mm or more. When the separation pitch (P) is 0.5 mm or more, even if the electrode 60 travels at a speed of 100 mm/sec or more under a tension of 300 gf or more in the winding process or the like, cracks may be prevented from occurring at the bottom of the cut groove 63.

According to the experimental results, when the current collector 41 of the electrode 60 is an aluminum foil with a thickness of 15 um and the separation pitch (P) is 0.5 mm or more, no cracks are generated at the bottom of the cut groove 63 when the electrode 60 travels under the above travel conditions.

As shown in FIG. 7b, a cut groove 63 is interposed between two segments 61 adjacent in the winding direction X. The cut groove 63 corresponds to a space created by removing the uncoated portion 43. Preferably, edges at both ends of the lower portion of the cut groove 63 has a round shape. That is, the cut groove 63 includes a substantially flat bottom portion 63a and a round portion 63c. The round portion 63c connects the bottom portion 63a and the side 63b of the segment 61. In a modified example, the bottom portion 63a of the cut groove 63 may be replaced with an arc shape. In this case, the sides 63b of the segments 61 may be smoothly connected by the arc shape of the bottom portion 63a.

The curvature radius of the round portion 63c may be greater than 0 and less than or equal to 0.5 mm, preferably greater than 0 and less than or equal to 0.1 mm, more preferably 0.01 mm to 0.05 mm. When the curvature radius of the round portion 63c meets the above numerical range, it is possible to prevent cracks from occurring in the lower portion of the cut groove 63 while the electrode 60 is traveling in the winding process or the like. If the radius of curvature of the round portion 63c exceeds the upper limit of the above numerical range, the space at the bottom of the cut groove 63 decreases, which may negatively affect the impregnation of electrolytes.

The lower internal angles (θ) of the plurality of segments 61 may increase from the core toward the outer circumference. In one example, the lower internal angles (θ) of the plurality of segments 61 may gradually or stepwise increase from the core toward the outer circumference. The lower internal angle (θ) is an angle between a straight line extending from the bottom 63a of the cut groove 63 and a straight line extending from the side portion 53b of the segment 61. When the segment 61 is symmetrical in the left and right direction, the lower internal angles (θ) of the left and right sides are substantially the same.

If the radius of the electrode assembly increases, the radius of curvature increases. If the lower internal angle (θ) of the segment 61 increases as the radius of the electrode assembly increases, the stress generated in the radial direction and the circumferential direction when the segment 61 is bent may be relieved. In addition, if the lower internal angle (θ) increases, when the segment 61 is bent, the area overlapping with the segment 61 at the inner side and the number of overlapping layers also increase, so that welding strength may be uniformly secured in the radial direction and the circumferential direction and the bending surface region may be formed flat.

Preferably, the lower internal angle (θ) may be determined by the radius of the winding turn where the segment 61 is located and the width (D) of the segment 61.

Figure 7F:
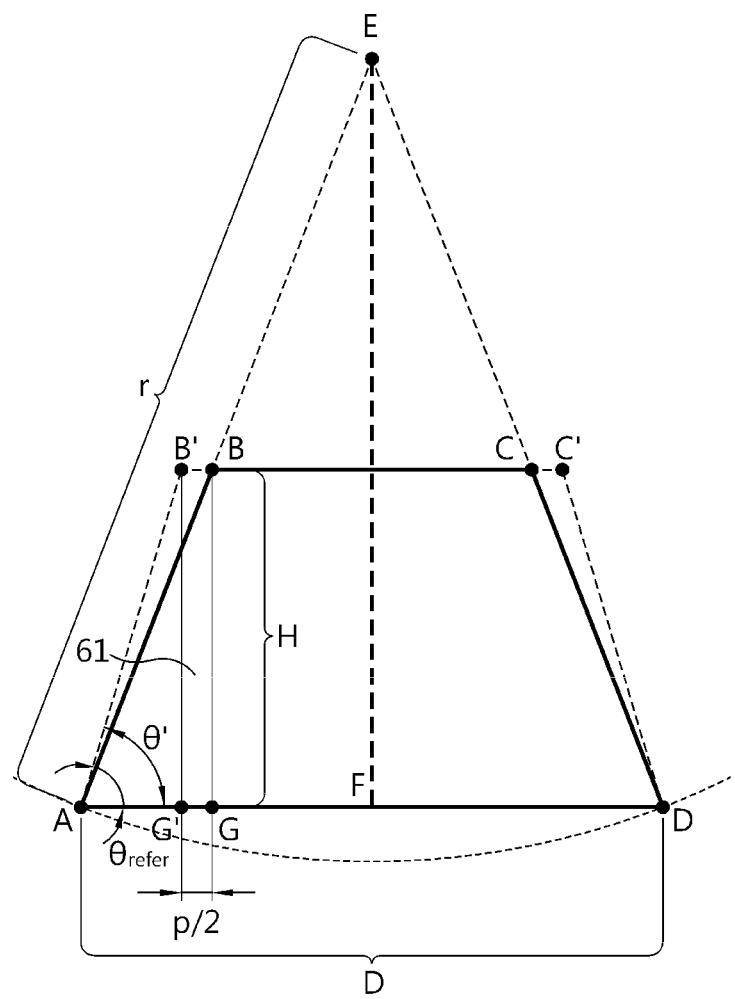
FIG. 7f is a schematic diagram for explaining the formula that determines a lower internal angle (θ) of the segment.

FIG. 7f is a schematic diagram for explaining the formula that determines a lower internal angle (θ) of the segment 61.

Referring to FIG. 7f, the sides of the segment 61 ideally coincide with the line segment AE and the line segment DE connecting the core center (E) to both end points A and D of the line segment AD corresponding to the width (D) of the segment 61.

When the side of the segment 61 extends in the most ideal direction, assuming that the line segment EF is approximately equal to the line segment AE and the line segment DE, the lower internal angle ($\theta_{refer}$) of the segment 61 may be determined approximately from the width (D) of the segment 61 and the radius (r) of the winding turn where the segment 61 is located using Formula 4 below.

$$\theta_{refer} = \cos^{-1}\left(\frac{0.5 * D}{r}\right) \quad \text{<Formula 4>}$$

The angle of Formula 4 is an ideal criterion angle for the lower internal angle ($\theta_{refer}$) of the segment 61. Meanwhile, a separation pitch (P) exists between adjacent segments 61 located in the same winding turn. The length of the separation pitch (P) is expressed as p. Since the separation pitch (P) exists between adjacent segments 61, a tolerance of 50% of the separation pitch (p) may be endowed for the lower internal angle (θ). That is, the width of the upper side BC of the segment 61 may be increased by a maximum of p/2 to the upper side B'C'. The lower internal angle (θ') with the tolerance reflected may be expressed as in Formula 5 below. The lower internal angle ($\theta_{refer}$) is the ideal criterion angle ∠BAG, and the lower internal angle (θ') is the angle ∠B'AG' that reflects the tolerance according to the separation pitch (p). In Formula 5, H is the height of the segment 61, and p corresponds to the separation pitch.

$$\theta' = \tan^{-1}\left(\frac{2 * H * \tan\theta_{refer}}{2 * H - p * \tan\theta_{refer}}\right) \quad \text{<Formula 5>}$$

Preferably, the lower internal angle (θ) of the segment 61 located at each winding turn of the electrode assembly may satisfy Formula 6 below. Then, when the segments 61 are bent toward the core center of the electrode assembly, the segments 61 adjacent in the circumferential direction do not interfere with each other and may be smoothly bent.

$$\cos^{-1}\left(\frac{0.5 * D}{r}\right) \leq \theta \leq \tan^{-1}\left(\frac{2 * H * \tan\theta_{refer}}{2 * H - p * \tan\theta_{refer}}\right) \quad \text{<Formula 6>}$$

In one example, when the electrode 60 forms a winding structure with a diameter of 22 mm and a core radius of 4 mm, the lower internal angle of the segment 61 may gradually or stepwise increase in the range of 60 degree to 85 degree in the height variable region.

In another example, the lower internal angles (θ) of the plurality of segments 61 may gradually or stepwise increase while going from the core toward the outer circumference in a group unit or in two or more group units.

Meanwhile, the left lower internal angle and the right lower internal angle of the segment 61 may not be the same. Nonetheless, the lower internal angle (θ) of any one side may be designed to satisfy Formula 6 described above.

Referring to FIG. 7a again, the width ($d_{B1}$) of the first portion B1 is designed so that the core of the electrode assembly is open to the outside by 90% or more based on its diameter when the segment 61 of the third portion B2 is bent toward the core. The width ($d_{B1}$) of the first portion B1 may increase in proportion to the bending length of the segment 61 of Group 1. The bending length corresponds to a length from the bending point to the upper end side of the segment 61. Preferably, when the electrode 60 is used to manufacture an electrode assembly of a cylindrical battery having a form factor of 4680, the width ($d_{B1}$) of the first portion B1 may be set to 180 mm to 350 mm depending on the diameter of the core of the electrode assembly and the height of the segment 61 included in Group 1.

The bending point of the segment 61 may be set at a line passing through the lower end of the cut groove 63 or a point spaced upward from the line by a predetermined distance. When the segment 61 is bent toward the core at a point spaced from the lower end of the cut groove 63 by a certain distance, the segments are overlapped better in the radial direction. When the segments 61 are bent, a segment at an outer side presses a segment at an inner side based on the center of the core. At this time, if the bending point is spaced apart from the lower end of the cut groove 63 by a predetermined distance, the segment at the inner side is pressed in the winding axis direction by the segment at the outer side, and the segments are overlapped better. The separation distance of the bending point may be preferably 1 mm or less. Since the minimum height of the segment is 2 mm, the ratio of the separation distance of the bending point to the minimum height may be 50% or less.

In one embodiment, the width of each segment group may be designed to constitute the same winding turn of the electrode assembly. Here, the winding turn may be counted based on the end of the first portion B1 when the electrode 60 is in a wound state.

In another modification, the width of each segment group may be designed to constitute at least one winding turn of the electrode assembly.

In still another modification, the width and/or height and/or separation pitch of the segments 61 belonging to the same segment group may be increased or decreased gradually and/or stepwise and/or irregularly within the group or between the adjacent groups.

Groups 1 to 8 are only examples of segment groups included in the third portion B2. The number of groups, the number of segments 61 included in each group, and the width of the group may be preferably adjusted so that the segments 61 are overlapped into multiple layers so as to disperse stress as much as possible during the bending process of the uncoated portion 43 and sufficiently secure the welding strength with the current collector.

In another modification, the height of the second portion B3 may decrease gradually or stepwise, similar to the first embodiment and the second embodiment.

In still another modification, the segment structure of the third portion B2 may extend to the second portion B3 (see dotted line). In this case, the second portion B3 may also include a plurality of segments, like the third portion B2. Preferably, the segment structure of the second portion B3 may be substantially the same as that of the outermost segment group of the third portion B2. In this case, the segments included in the second portion B3 and the third portion B2 may have substantially the same width, height, and separation pitch. In a modified example, the segments of the second portion B3 may have a width and/or height and/or separation pitch greater than that of the third portion B2. Optionally, the last 1 winding turn of the second portion B3 may have a shape from which the segment is removed.

In the third portion B2, the region (Groups 1 to 7) in which the heights of the segments 61 increase stepwise based on the winding direction of the electrode 60 may be defined as a segment height variable region, and the last segment group (group 8) may be defined as a height uniform region where the heights of the segments are maintained uniformly.

That is, in the third portion B2, when the heights of the segments 61 increase stepwise from $h_1$ to $h_N$, the region in which the segments 61 with the heights of $h_1$ to $h_{N-1}$ (N is a height index, a natural number greater than or equal to 2) corresponds to the height variable region, and the region in which the segments 61 with the height of $h_N$ are placed corresponds to the height uniform region. The ratio of the height variable region and the height uniform region to the length of the electrode 60 in the winding direction will be described later with reference to specific embodiments.

When the electrode 60 is used to manufacture an electrode assembly of a cylindrical battery having a form factor of 4680, the width ($d_{B1}$) of the first portion B1 may be 180 mm to 350 mm. The width of Group 1 may be 35% to 40% of the width of the first portion B1. The width of Group 2 may be 130% to 150% of the width of Group 1. The width of Group 3 may be 120% to 135% of the width of Group 2. The width of group 4 may be 85% to 90% of the width of group 3. The width of Group 5 may be 120% to 130% of the width of Group 4. The width of Group 6 may be 100% to 120% of the width of Group 5. The width of Group 7 may be 90% to 120% of the width of Group 6. The width of Group 8 may be 115% to 130% of the width of Group 7. The width ($d_{B3}$) of the second portion B3 may be 180 mm to 350 mm, similar to the width of the first portion B1.

In the embodiment, the widths of Groups 1 to 8 do not show a constant increase or decrease pattern. This is because the segment width gradually increases from Group 1 to Group 8, but the number of segments included in the group is limited to an integer number and the thickness of the electrode has a slight deviation in the winding direction. Accordingly, the number of segments may be reduced in a specific segment group. Therefore, the widths of the groups may show an irregular change pattern as in the above example from the core to the outer circumference. Of course, it is also possible to design Groups 1 to 8 so that the widths show a constant increase pattern by reducing the width of the segment.

That is, assuming that the width in the winding direction for each of the three segment groups consecutively adjacent to each other in the circumferential direction of the electrode assembly is W1, W2, and W3, respectively, it is possible for the electrode assembly to include a combination of segment groups in which W3/W2 is smaller than W2/W1.

In the specific example, Groups 4 to 6 corresponds to the above case. The width ratio of Group 5 to Group 4 is 120% to 130%, and the width ratio of Group 6 to Group 5 is 100% to 120%, which is smaller than 120% to 130%.

Figure 7G:
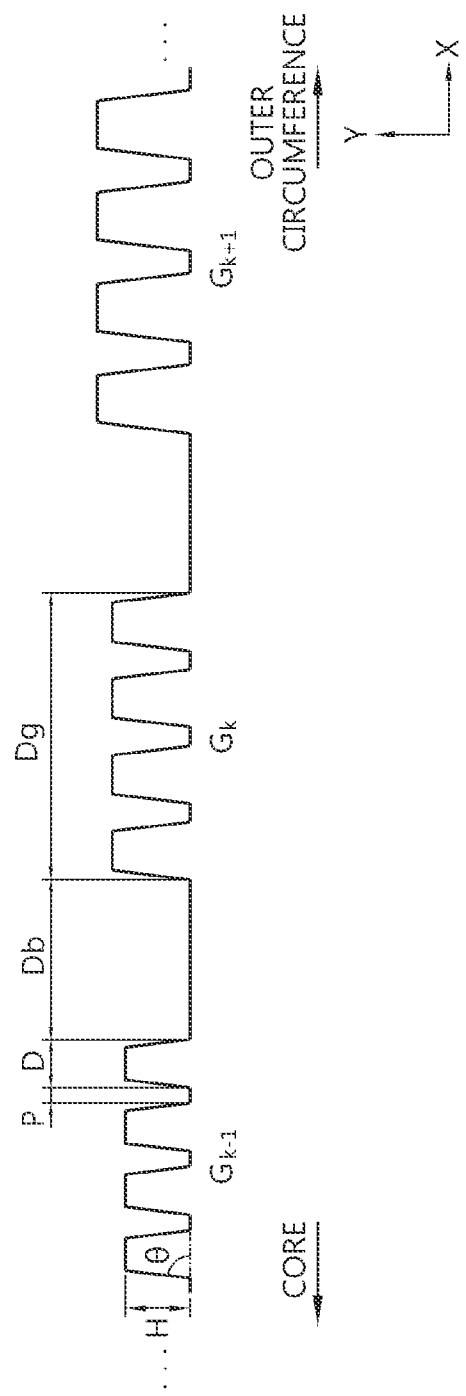
FIG. 7g is a plan view showing a modified structure of the electrode according to the fourth embodiment of the present disclosure.

According to still another modification, when the uncoated portion 43 of the electrode 60 has a plurality of segment groups, the segment groups ($G_{k-1}$, $G_k$, $G_{k+1}$) may be spaced apart from each other in the winding direction X with a group separation interval Db as shown in FIG. 7g. The height of the uncoated portion corresponding to the group separation interval Db may be substantially the same as that of the first portion B1 or the second portion B3.

In one aspect, from the core toward the outer circumference, the widths (D) in the winding direction of the segments 61 belonging to each segment group may increase stepwise for each group, the heights (H) of the segments 61 may also increase stepwise for each group, and the lower internal angle ($\theta$) may also increase stepwise for each group.

In another aspect, from the core toward the outer circumference, the widths Dg in the winding direction of the segment groups may gradually or stepwise increase. The width Dg in the winding direction may increase for every segment group or for every two or more segment groups.

In still another aspect, the interval Db between the segment groups may gradually or stepwise increase from the core toward the outer circumference. The group separation interval Db may increase for every segment group or for every two or more segment groups.

Figure 7H:
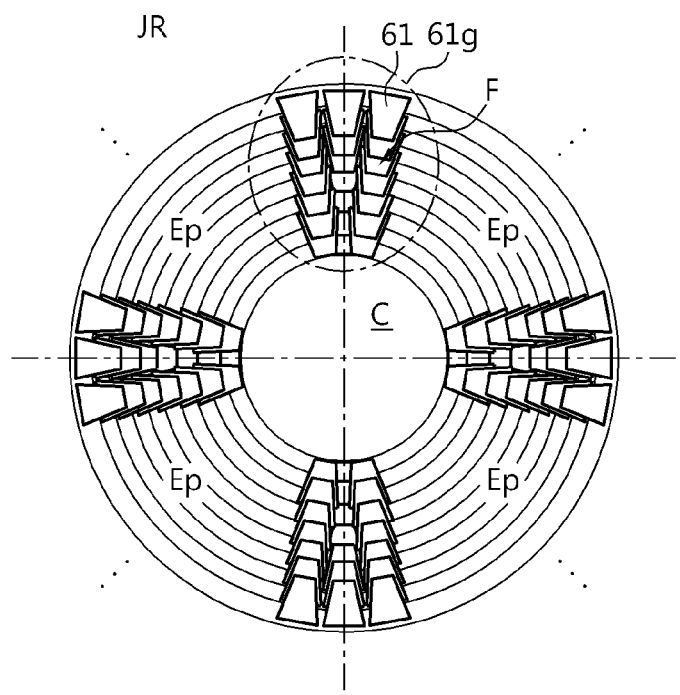
FIGS. 7h and 7i are top plan views showing examples in which a plurality of segment alignments (bending surface region) and a plurality of electrolyte impregnation portions are radially formed at one end of the electrode assembly when the electrode according to a modification of the present disclosure is wound into the electrode assembly.
Figure 7I:
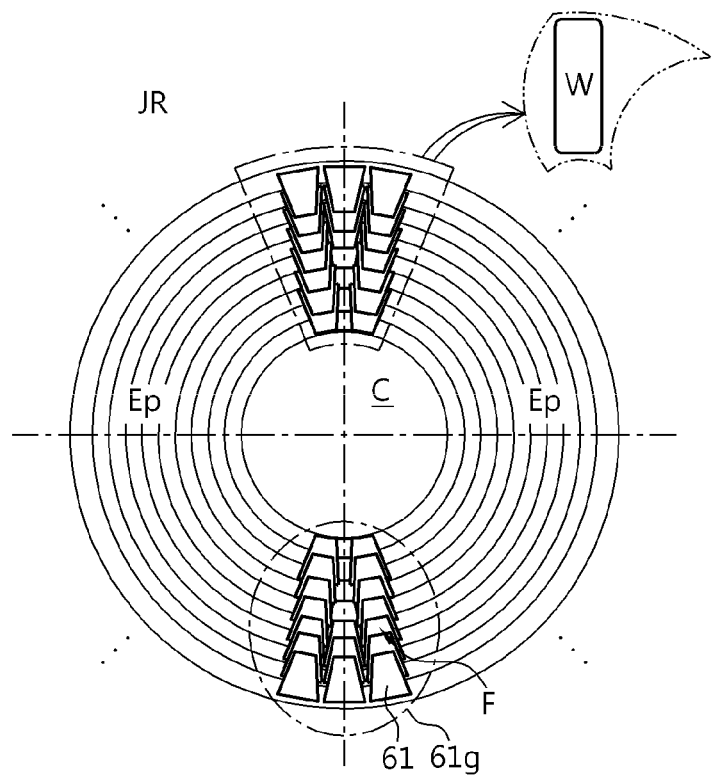

When the width Dg in the winding direction and the group separation interval Db of the segment group are adjusted, as shown in FIGS. 7h and 7i, the segments 61 are radially arranged in some areas to form one or more segment alignments 61g. The segment alignment 61g is a collection of segment groups ($G_{k-1}$, $G_k$, $G_{k+1}$) aligned along the radial direction of the electrode assembly JR.

Figure 7J:
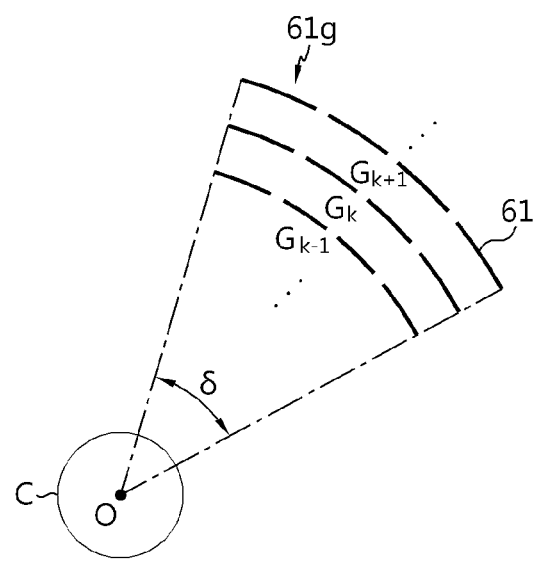
FIG. 7j is a diagram showing a structure in which segment groups included in the segment alignment formed in a fan shape are arranged in different winding turns according to an embodiment of the present disclosure.

As shown in FIG. 7j, if both ends of the segment groups ($G_{k-1}$, $G_k$, $G_{k+1}$) included in the segment alignment 61g and the center O of the core C are connected with lines, a fan shape is formed for each segment group.

Preferably, the fan shapes of the segment groups ($G_{k-1}$, $G_k$, $G_{k+1}$) included in the segment alignment 61g may be substantially the same in terms of the size and range of the circumferential angle ($\delta$). If the electrode has a thickness tolerance, the circumferential angles ($\delta$) of the segment groups ($G_{k-1}$, $G_k$, $G_{k+1}$) included in the segment alignment 61g may have substantially the same size, and the ranges of the circumferential angles ($\delta$) may be different.

The circumferential angle ($\delta$) may be 20 degrees or greater, optionally 25 degrees or greater, optionally 30 degrees or greater, optionally 35 degrees or greater, or optionally 40 degrees or greater.

When the segments 61 included in the segment alignment 61g are bent toward the core C, a bending surface region F is formed on a plane substantially perpendicular to the winding axis, as shown in FIGS. 7h and 7i. In addition, an electrolyte impregnation portion Ep is formed between the bending surface regions F adjacent in the circumferential direction.

Since the bending structure of the segments 61 does not exist in the electrolyte impregnation portion Ep, the end of the separator and the active material layer of the electrode are exposed to the outside when viewed in the winding axis direction (i.e., the direction in which the electrolyte is injected). Therefore, when the electrolyte is injected along the winding axis direction of the electrode assembly JR, the electrolyte penetrates quickly into the electrode assembly JR while directly contacting the separator and the end of the active material layer, so the electrolyte impregnation rate may be improved.

In addition, as described above with reference to FIG. 7a, in order to further improve the electrolyte impregnation rate, the end SL of the separator SP in the winding axis direction is preferably spaced apart from the criterion line DL by a distance corresponding to 30% or less of the minimum segment height Ha. In this case, since the electrolyte is also impregnated through the bottom of the cut groove 63, the electrolyte impregnation rate may be further improved and the uniformity of the electrolyte impregnation may also be improved.

FIG. 7h illustrates a structure in which the bending surface regions F are disposed at intervals of 90 degrees, and FIG. 7i illustrates a structure in which the bending surface regions F are disposed at intervals of 180 degrees. Here, the arrangement angle of the bending surface regions F may be defined as an angle between straight lines passing through the geometric center of a figure that approximately corresponds to the edge shape of the bending surface region F. That is, when a line connecting the core center of the electrode assembly and the geometric center of the figure that approximately corresponds to the bending surface region F is defined as an angle measurement line, the angle measured using the angle measurement lines of the bending surface regions F adjacent in the circumferential direction may be regarded as an arrangement angle of the bending surface region F. In one example, the geometric center of the figure corresponding to the edge of the bending surface region F may be the center of gravity.

The segment groups constituting the bending surface region F may be radially arranged from the core center of the electrode assembly JR. In addition, the uncoated portion of the winding turn portion constituting the electrolyte impregnation portion Ep may also be disposed radially from the core center of the electrode assembly JR. The circumferential length of the segment groups included in the bending surface region F may gradually increase from the core toward the outer circumference. In addition, the circumferential length of the uncoated portion of the winding turn portion constituting the electrolyte impregnation portion Ep also increases from the core toward the outer circumference. The figure formed by the edges of the bending surface region F has a shape similar to a fan shape with a central portion deleted.

The electrode assembly JR shown in FIG. 7h is suitable for welding a current collector in which four welding regions are radially designed at 90 degree intervals, and the electrode assembly JR shown in FIG. 7i is suitable for welding a current collector in which two welding regions are radially designed at 180 degree intervals.

The above embodiment illustrates a structure in which four bending surface regions (welding regions) F exist at intervals of 90 degrees or two bending surface regions F exist at intervals of 180 degrees, but the present disclosure is not necessarily limited thereto. For example, various radial arrangements, for example 12 bending surface regions at 30 degree intervals, 8 bending surface regions at 45 degree intervals, 6 bending surface regions at 60 degree intervals, 5 bending surface regions at 72 degree intervals, and 3 bending surface regions at 120 degree intervals, may be used.

In another modification, the bending surface regions F may not be radially arranged and but be formed in various shapes at locations corresponding to the regions where the current collector is to be welded. The bending surface regions F may have a geometric shape such as a square, a rectangle, a parallelogram, or a trapezoid. Various shapes of the bending surface region F may be determined by adjusting the width Dg of the segment group in the winding direction and the separation distance Db between the segment groups.

Meanwhile, when designing the segment groups to be spaced apart along the winding direction X so that the bending surface region F is not formed in some areas, position deviation of the segment groups may occur from the core toward the outer circumference due to the thickness deviation of the electrode. The position deviation of the segment groups is gradually accumulated toward the outer circumference turn.

According to an embodiment of the present disclosure, in order to secure an area where the current collector can be welded even if position deviation of the segment groups is accumulated as being closer to the outer circumference turn, the width of the segment group may gradually or stepwise increase from the core toward the outer circumference, and as a result, a fan-shaped bending surface region F is formed.

Therefore, even if the shape of the bending surface region F is deformed due to the accumulation of position errors of the segment groups toward the outer circumference (refer to FIG. 7i, as the electrode assembly is wound clockwise, the shape of the bending surface region F is also deformed clockwise), as can be seen in the deformed region indicated by the arrow in FIG. 7i, it is still possible to sufficiently secure a predetermined welding region W.

The circumferential angle (see δ in FIG. 7j) of the fan shape in which the bending surface region F is formed may be determined according to the amount of accumulated error. In an embodiment, a fan shape with a circumferential angle of about 30 degrees is exemplified. As the circumferential angle of the fan shape increases, the amount of allowable cumulative error may increase. However, as a benefit in return, the area of the electrolyte impregnation portion Ep where the bending surface region F is not formed is reduced.

Meanwhile, if the area corresponding to the width of the segment group is composed of one segment, as the circumferential angle of the fan shape corresponding to the bending surface region F is larger, when the segments are bent, the segments may not be bent smoothly as deformation occurs in the circumferential direction. Therefore, in the present disclosure, when the bending surface region F is designed as a fan shape, the uncoated portion in the area of the winding turn corresponding to the fan shape is formed as a segment group, and the segments belonging to the corresponding group are bent, so that the uncoated portion may be smoothly bent.

According to the embodiment, when the circumferential angle of the area of the winding turn located inside the fan shape corresponding to the bending surface region F exceeds 30 degrees, the uncoated portion in the area of the winding turn is divided into at least two segments, so that the circumferential angle in the area of the winding turn corresponding to each segment becomes less than 30 degrees.

In the present disclosure, the shape of the segment 61 may be variously modified.

Figure 8A:
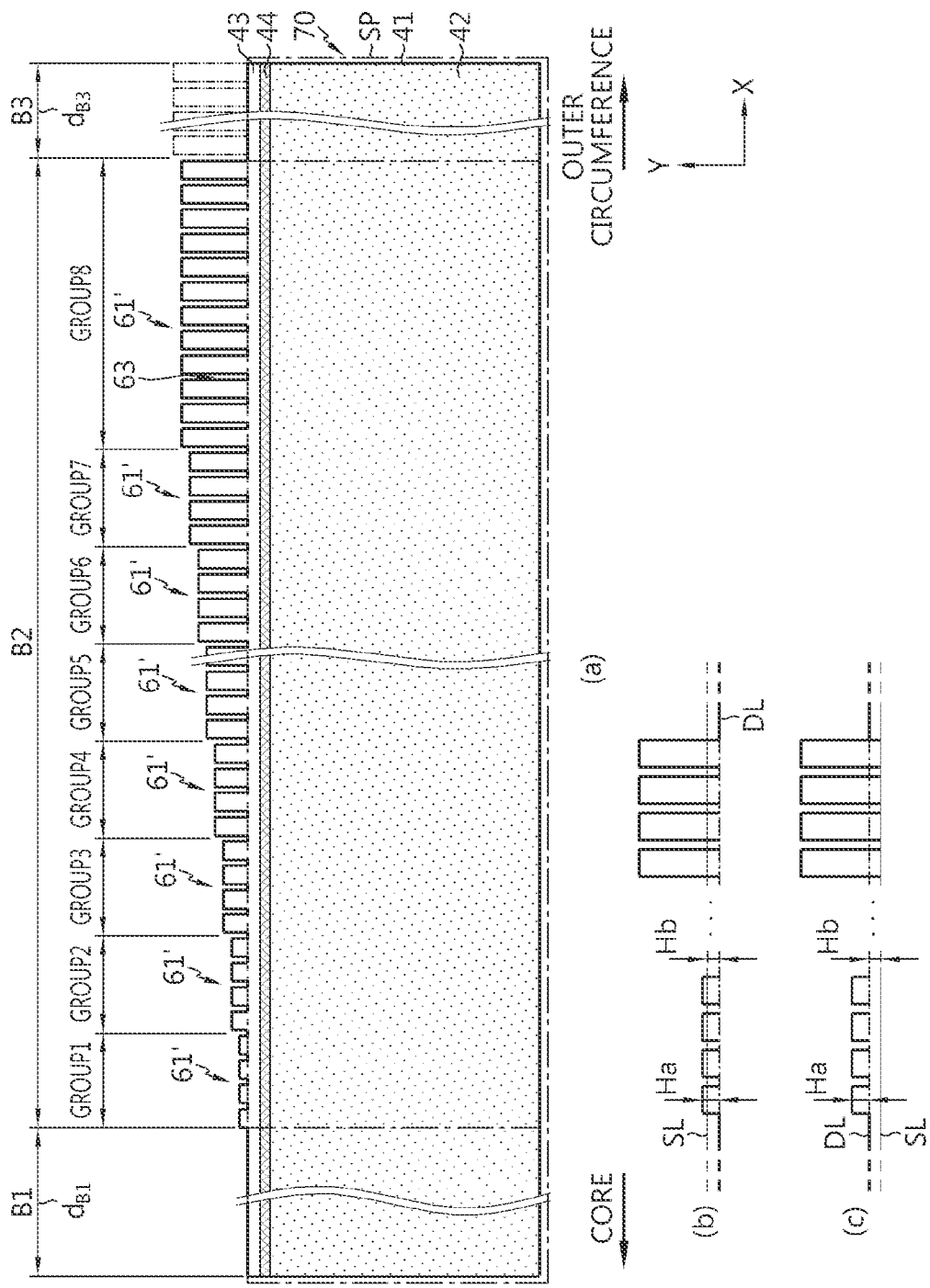
FIG. 8a is a plan view showing the structure of an electrode according to the fifth embodiment of the present disclosure.

FIG. 8a is a plan view showing the structure of an electrode 70 according to the fifth embodiment of the present disclosure.

Referring to FIG. 8a, the electrode 70 of the fifth embodiment, is substantially the same as the former embodiment, except that the shape of the segment 61' is different. Therefore, the configuration of the fourth embodiment can be equally applied to the fifth embodiment, unless otherwise described.

The segment 61' has a geometric figure with substantially equal upper and lower widths. Preferably, the segment 61' may have a rectangular shape.

The corners or vertices of the rectangle may be rounded or chamfered rather than sharpened.

Figure 8B:
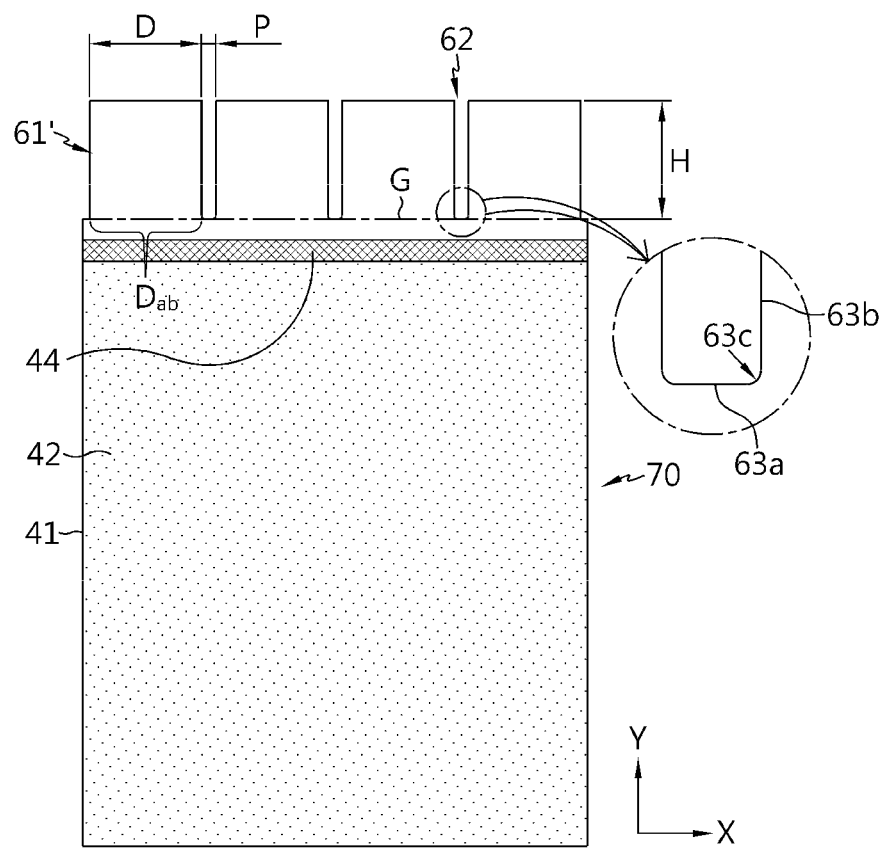
FIG. 8b is a diagram showing definitions of width, height, and separation pitch of a segment according to another embodiment of the present disclosure.

FIG. 8b is a diagram showing definitions of width, height, and separation pitch of the segment 61'.

Referring to FIG. 8b, the width (D), height (H), and separation pitch (P) of the segment 61' may be set to prevent the uncoated portion 43 from being torn during bending of the uncoated portion 43 and to prevent abnormal deformation of the uncoated portion 43 while sufficiently increasing the number of overlapping layers of the uncoated portion 43 in order to improve welding strength with the current collector. The abnormal deformation means that the uncoated portion below the bending point does not maintain a straight state and is deformed irregularly while falling down.

The width (D) of the segment 61' is defined as a length between two points where two straight lines extending from both sides of the segment 61' meet a straight line extending from the bottom 63a of the cut groove 63. The height (H) of the segment 61' is defined as a shortest distance between the uppermost edge of the segment 61' and the straight line extending from the bottom 63a of the cut groove 63. The separation pitch (P) of the segment 61' is defined as a length between two points where the straight line extending from the bottom 63a of the cut groove 63 meet straight lines extending from two sides 63b connected to the bottom 63a. When the side 63b and/or the bottom 63a is curved, the straight line may be replaced with a tangent extending from the side 63b and/or the bottom 63a at an intersection where the side 63b and the bottom 63a meet.

Preferably, the conditions for the width (D), height (H), and separation pitch (P) of the segment 61' are substantially the same as those of the fourth embodiment described above, and thus will not be described again. However, since the segment 61' has a rectangular shape, the lower internal angle of the segment 61' may be constant as 90 degrees.

In addition, the electrode 70 according to the fifth embodiment may also have a plurality of segment groups ($G_{k-1}$, $G_k$, $G_{k+1}$) arranged in the winding direction X with a separation interval Dg, as shown in FIG. 8c. In this case, the embodiments described with reference to FIGS. 7h, 7i, and 7j may be substantially equally applied to the electrode assembly manufactured by winding the electrode 70 shown in FIG. 8c. That is, the embodiment described with reference to FIGS. 7h, 7i, and 7j may be applied substantially identically, except that the shape of the segments included in the segment group is changed from trapezoidal to rectangular.

As in the fourth embodiment and the fifth embodiment, when the third portion B2 and the second portion B3 include a plurality of segments 61, 61', the shape of each segment 61, 61' may be modified in various ways.

Preferably, the segment may be deformed into various shapes while satisfying at least one of the following conditions.

Condition 1: the width of the lower portion is greater than the width of the upper portion Condition 2: the width of the lower portion is the same as the width of the upper portion Condition 3: the width is kept uniform from the upper portion to the lower portion Condition 4: the width decreases from the upper portion to the lower portion Condition 5: the width decreases and then increases from the lower portion to the upper portion Condition 6: the width increases and then decreases from the lower portion to the upper portion Condition 7: the width increases from the lower portion to the upper portion and then is kept uniform Condition 8: the width decreases from the lower portion to the upper portion and then is kept uniform Condition 9: the interior angle of one side and the interior angle of the other side of the lower portion are equal Here, the interior angle may be defined as an angle formed by the side portion of the segment based on the width direction of the lower portion of the segment. If the side portion is a curve, the interior angle is defined as the angle between the tangent drawn at the lowest end of the curve and the width direction of the lower portion of the segment.

Figure 9:
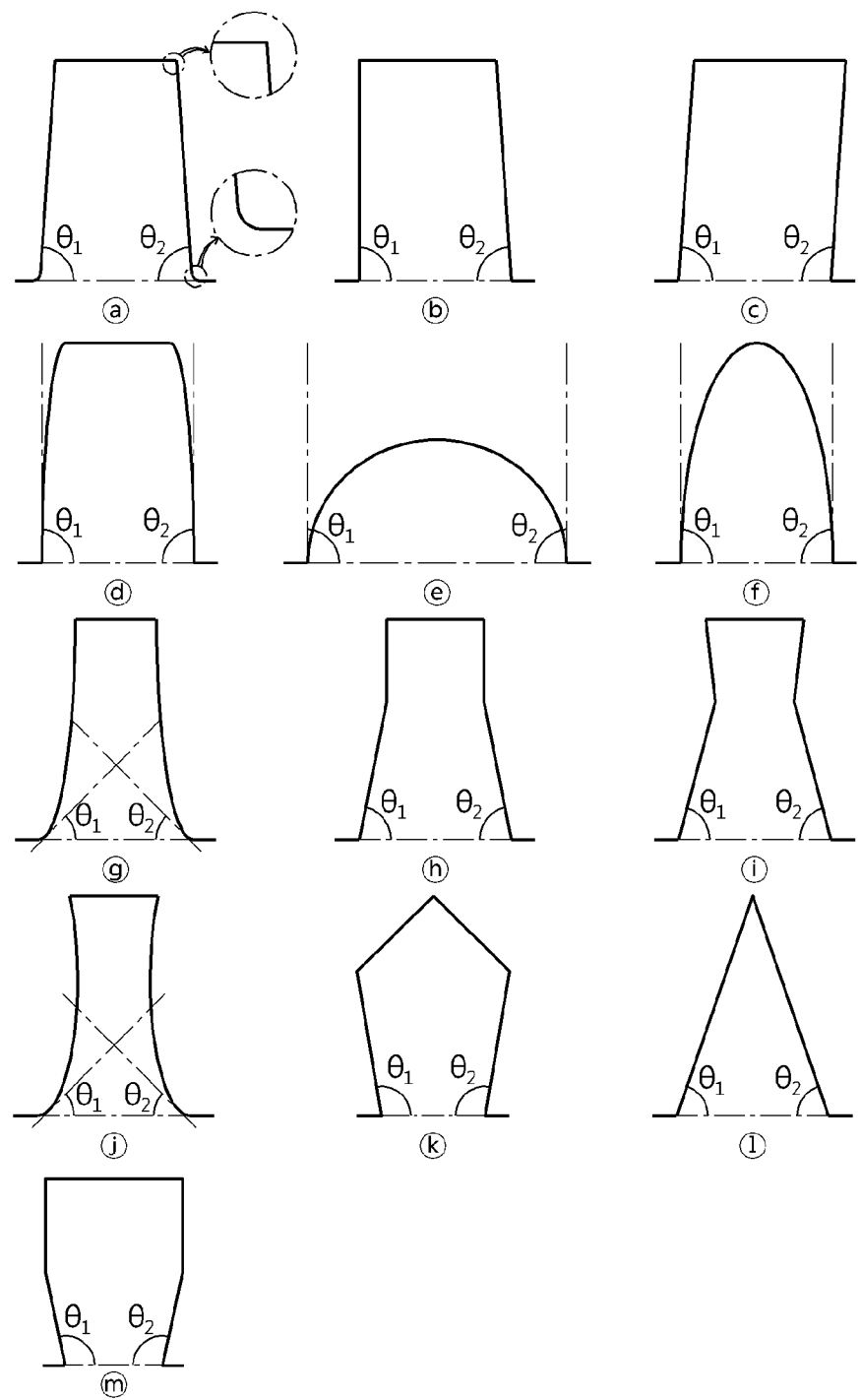
FIG. 9 is a diagram showing a segment structure according to various modifications of the present disclosure.

Condition 10: the interior angle of one side of the lower portion and the interior angle of the other side are different Condition 11: the interior angle of one side of the lower portion and the interior angle of the other side of the lower portion have an acute angle, a right angle, or an obtuse angle, respectively Condition 12: symmetrical in the left and right direction based on the winding axis direction Condition 13: asymmetrical in the left and right direction based on the winding axis direction Condition 14: the side portion is straight Condition 15: the side portion is curved Condition 16: the side portion is convex outward Condition 17: the side portion is convex inward Condition 18: the corner of the upper portion and/or the lower portion has a structure where straight lines meet Condition 19: the corner of the upper portion and/or the lower portion has a structure where a straight line and a curve meet Condition 20: the corner of the upper portion and/or the lower portion has a structure where curves meet Condition 21: the corner of the upper portion and/or the lower portion has a round structure FIG. 9 is a diagram exemplarily showing the shapes of segments according to various modifications of the present disclosure.

As shown in the drawing, the segment may have various geometric shapes in which a dotted line connecting the bottom portions of both cut grooves is as a base. The geometric shape has a structure in which at least one straight line, at least one curved line, or a combination thereof are connected. In one example, the segment may have a polygonal shape, a round shape, or various combinations thereof.

Specifically, the segment may have a left-right symmetrical trapezoidal shape (ⓐ); a left-right asymmetric trapezoidal shape (ⓑ); a parallelogram shape (ⓒ); a triangular shape (ⓛ); a pentagonal shape (ⓚ); an arc shape (ⓔ); or an elliptical shape (ⓕ).

Since the shape of the segment is not limited to those shown in FIG. 9, it may be transformed into other polygonal shapes, other round shapes, or combinations thereof to satisfy at least one of the conditions 1 to 21 described above.

In the polygonal shapes ⓐ, ⓑ, ⓒ, ⓚ and ⓛ of the segment, the corners of the upper portion and/or the lower portion may have a shape where straight lines meet or a round shape (see the enlarged view of the corners of the upper portion and/or the lower portion of the shape ⓐ).

In the polygonal shapes ⓐ, ⓑ, ⓒ, ⓚ, and ⓛ of the segment and the curved shapes ⓔ and ⓕ of the segment, the interior angle ($\theta_1$) at one side and the interior angle ($\theta_2$) at the other side of the lower portion may be the same or different, and the interior angle ($\theta_1$) at one side and the interior angle ($\theta_2$) at the other side of the lower portion may be an acute angle, a right angle, or an obtuse angle, respectively. The interior angle is an angle at which the base and the side of a geometric figure meet. When the side is curved, the straight line may be replaced by a tangent line extending from the point where the base meets the side.

The shape of the side portion of the segment having a polygonal shape may be modified in various ways.

In one example, the side portion of the segment shape ⓐ may be transformed into an outwardly convex curve, such as the shape ⓓ, or may be transformed into an inwardly curved segment, such as the shape ⓖ or ⓙ.

In another example, the side portion of the segment shape a may be transformed into a bent straight line curved indented into the segment, such as the shape ⓗ or ⓘ. Although not shown, the side portion of the segment shape a may be transformed into a straight line convexly bent to the outside.

In the segment shapes ⓓ, ⓖ, ⓙ, ⓗ, and ⓘ in which the side portion is modified in various ways, the interior angle ($\theta_1$) at one side and the interior angle ($\theta_2$) at the other side of the lower portion may be the same or different, and the interior angle ($\theta_1$) at one side and the interior angle ($\theta_2$) at the other side of the lower portion may be any one of an acute angle, a right angle, and an obtuse angle, respectively.

The width of the segment may have various change pattern from the bottom to the top.

In one example, the width of the segment may be kept uniform from the bottom to the top (shape ⓒ). In another example, the width of the segment may gradually decrease from the bottom to the top (shapes ⓐ, ⓑ, ⓓ, ⓔ, ⓕ, and ⓖ). In still another example, the width of the segment may gradually decrease and then increase from the bottom to the top (shapes ⓘ and ⓙ). In still another example, the width of the segment may gradually increase and then decrease from the bottom to the top (shape ⓚ). In still another example, the width of segment may gradually decrease from the bottom to the top and then be kept uniform (shape ⓗ). Although not shown, the width of the segment may gradually increase from the bottom to the top and then be kept uniform.

Meanwhile, among the shapes of the segment illustrated in FIG. 9, the polygonal shape with a flat top may be rotated by 180 degrees. In one example, when the segment shape ⓐ, ⓑ, ⓓ or ⓖ rotates by 180 degrees, the width of the segment may gradually increase from the bottom to the top. In another example, when the segment shape h is rotated by 180 degrees, the width of the segment may be kept uniform from the bottom to the top and then gradually increase.

In the embodiments (modifications) described above, according to another aspect of the present disclosure, it is possible to differently change the shape of the segment 61, 61' according to the area of the third portion B2. In one example, for a region in which stress is concentrated, a round shape (e.g., semicircle, semi-ellipse, etc.) that is advantageous for stress distribution may be applied, and for a region in which stress is relatively low, a polygonal shape (e.g., square, trapezoid, parallelogram, etc.) having a wide area as much as possible may be applied.

In another aspect, the plurality of segments may have different shapes individually, in a group unit, or in two or more group units along one direction parallel to the winding direction of the electrode assembly.

In the embodiments (modifications), the segment structure of the third portion B2 may also be applied to the first portion B1. However, when the segment structure is applied to the first portion B1, a reverse forming phenomenon in which the end of the first portion B1 is curved toward the outer circumference when the segment 61, 61' of the third portion B2 is bent according to the radius of curvature of the core may occur. Therefore, even if there is no segment structure in the first portion B1, or even if the segment structure is applied, it is desirable to adjust the width and/or height and/or separation pitch of the segment 61, 61' as small as possible to a level where reverse forming does not occur in consideration of the radius of curvature of the core.

The height of the segments where reverse forming can occur may be less than about 3 mm. Also, if the height of the segment is less than 2 mm, interference may occur between the segment and the separator, and thus bending may not be performed easily. In addition, if the height of the segment is less than 4 mm, the segment welding process may not be smooth. Preferably, the minimum height ($H_{min}$) of the segment designed for bending may be 5 mm.

Referring to FIGS. 8a and 9a, based on the criterion line DL, if the end SL of the separator in the width direction exists within the range of ±30% of the height Ha of the minimum segment among the segments having a height equal to or greater than the minimum bendable height ($H_{min}$, e.g., 2 mm or 3 mm or 4 mm or 5 mm) in the uncoated portion, the impregnation property may be greatly increased. That is, in determining the minimum segment that defines the position of the end SL of the separator in the width direction, segments that may cause reverse forming or segments that do not bend may be excluded.

From another point of view, based on the criterion line DL, if the end SL of the separator in the width direction exists within the range of ±30% of a larger height {max(Ha, $H_{min}$)} of the height Ha of the minimum segment existing in the uncoated portion and the minimum bendable height ($H_{min}$), the impregnation property may be greatly increased.

From another point of view, based on the criterion line DL, if the end SL of the separator in the width direction exists within the range of ±30% of the minimum bendable height ($H_{min}$), the impregnation property of the electrolyte may be greatly increased. This may be the range of the criterion line DL±1.5 mm or the criterion line DL±1.2 mm or the criterion line DL±0.9 mm or the criterion line DL±0.6 mm.

According to still another aspect of the present disclosure, after the electrode 60, 70 is wound into the electrode assembly, the segments exposed on the upper portion and the lower portion of the electrode assembly may be overlapped into several layers along the radial direction of the electrode assembly to form the bending surface regions.

It should be noted in advance that the description as below about the bending surface region may be applied in substantially the same way to the bending surface region formed by bending the segments of the segment alignment.

Figure 10B:
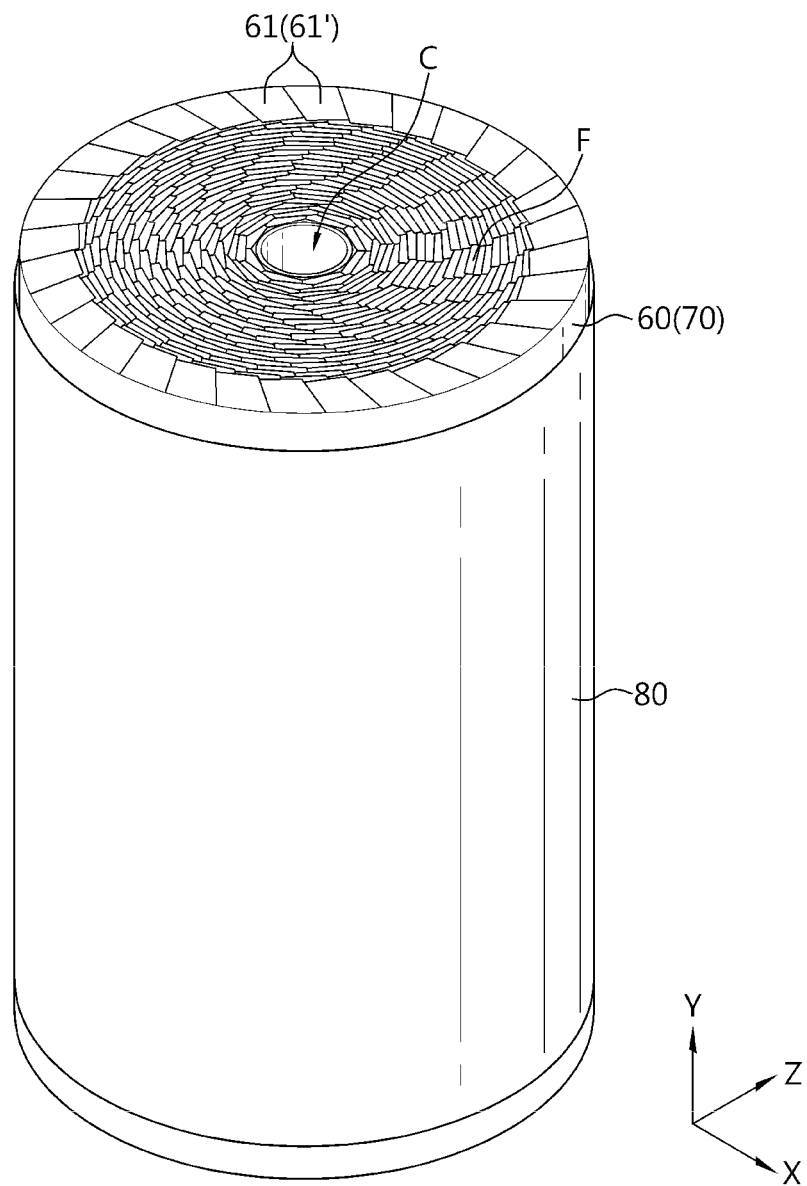
FIG. 10b is a top perspective view schematically showing an electrode assembly in which the bending surface region is formed.

FIG. 10a is a schematic diagram showing a cross section of the bending surface region F formed by bending the segments 61 toward the core C of the electrode assembly 80. In FIG. 10a, the cross section of the bending surface region F is shown only at the left side based on the winding axis of the electrode assembly 80. The bending surface region F may be formed at both the upper portion and the lower portion of the electrode assembly 80. FIG. 10b is a top perspective view schematically showing the electrode assembly 80 in which the bending surface region F is formed.

Referring to FIGS. 10a and 10b, the bending surface region F has a structure in which the segments 61 are overlapped into a plurality of layers in the winding axis direction. The overlapping direction is the winding axis direction Y. The region ① is a segment skip region (first portion B1) with no segment, and the regions ② and ③ are regions where winding turns containing the segments 61 are located. The region ② is a height variable region in which the heights of the segments 61 vary, and the region ③ is a height uniform region in which the heights of the segments are maintained uniformly until the outer circumference of the electrode assembly. As will be described later, the lengths of the region ② and the region ③ in the radial direction may be variable. Meanwhile, the uncoated portion (second portion B3) included in at least one winding turn including an outermost winding turn may not include a segment structure. In this case, the second portion B3 may be excluded in the region ③.

In the region ②, the heights of the segments 61 may be changed stepwise from the minimum height $h_1$ (=$h_{min}$) to the maximum height $h_N$(=$h_{max}$) in the radius $r_1$ to $r_N$ region of the electrode assembly 80. The height variable regions where the heights of the segments 61 vary are $r_1$ to $r_N$. From the radius $r_N$ to the radius R of the electrode assembly 80, the heights of the segments 61 are maintained uniformly at $h_N$. Uniform heights means that the deviation of heights is within 5%.

At any radius location in the region ② and the region ③, the stack number of the segments 61 varies depending on the radius location. In addition, the stack number of the segments 61 may vary depending on the width of the region ②, the minimum height ($h_1$) and maximum height ($h_{N-1}$) of the segments in the height variable region of the segments 61, and the height change amount (Δh) of the segments 61. The stack number of the segments 61 is the number of segments that meet an imaginary line when the imaginary line is drawn in the winding axis direction from an arbitrary radius location of the electrode assembly 80.

Preferably, the stack number of the segments 61 at each location of the bending surface region F may be optimized according to the required welding strength of the current collector by adjusting the height, width and separation pitch of the segments 61 according to the radius of the winding turn containing the segment 61.

First, in the height variable region (②) of the segments 61, when the minimum height ($h_1$) of the segments is the same, it will be described through specific embodiments how the stack number of the segments 61 varies along the radial direction of the bending surface region F according to the change in the maximum height ($h_{N-1}$) of the segments 61.

The electrode assemblies of the embodiments 1-1 to 1-7 are prepared. The electrode assemblies of the embodiments have a radius of 22 mm and a core diameter of 4 mm. The positive electrode and the negative electrode included in the electrode assembly have the electrode structure shown in FIG. 7a. That is, the segment has a trapezoidal shape. The second portion B3 of the positive electrode and the negative electrode does not contain a segment. The length of the second portion B3 is 3% to 4% of the total length of the electrode. The positive electrode, the negative electrode, and the separator are wound by the method described in FIG. 2. The winding turns are between 48 turns and 56 turns, but the winding turns of the embodiments are 51 turns. The thickness of the positive electrode, the negative electrode and the separator are 149 um, 193 um and 13 um, respectively. The thickness of the positive electrode and the negative electrode is the thickness including the thickness of the active material layer. The thicknesses of the positive electrode current collector and the negative electrode current collector are 15 um and 10 um, respectively. The lengths of the positive and negative electrodes in the winding direction are 3948 mm and 4045 mm, respectively.

In each embodiment, the minimum height of the segments 61 is set to 3 mm so that the height variable region (②) of the segments 61 starts with a radius of 5 mm. In addition, in each embodiment, the heights of the segments 61 are increased by 1 mm per 1 mm increase in radius, and the maximum height of the segments 61 is changed variously from 4 mm to 10 mm.

Specifically, in the embodiment 1-1, the height variable region (②) of the segments 61 is 5 mm to 6 mm, and the heights of the segments 61 are variable from the radius 3 mm to 4 mm. In the embodiment 1-2, the height variable region (②) of the segments 61 is 5 mm to 7 mm, and the heights of the segments 61 are variable from 3 mm to 5 mm. In the embodiment 1-3, the height variable region (②) of the segments 61 is 5 mm to 8 mm, and the heights of the segments 61 are variable from 3 mm to 6 mm. In the embodiment 1-4, the height variable region (②) of the segments 61 is 5 mm to 9 mm, and the heights of the segments 61 are variable from 3 mm to 7 mm. In the embodiment 1-5, the height variable region (②) of the segments 61 is 5 mm to 10 mm, and the heights of the segments 61 are variable from 3 mm to 8 mm. In the embodiment 1-6, the height variable region (②) of the segments 61 is 5 mm to 11 mm, and the heights of the segments 61 are variable from 3 mm to 9 mm. In the embodiment 1-7, the height variable region (②) of the segments 61 is 5 mm to 12 mm, and the heights of the segments 61 are variable from 3 mm to 10 mm. In the embodiment 1-1 to 1-7, the heights of the segments 61 are uniform from the radius corresponding to the upper limit of the height variable region (②) to the outer circumference. In one example, in the embodiment 1-7, the heights of the segments 61 are uniform at 10 mm from radius 12 mm to 22 mm. Meanwhile, in the electrode assembly of the comparative example, the heights of the segments 61 are maintained at a single height of 3 mm from the radius of 5 mm to the radius of 22 mm.

Figure 10C:
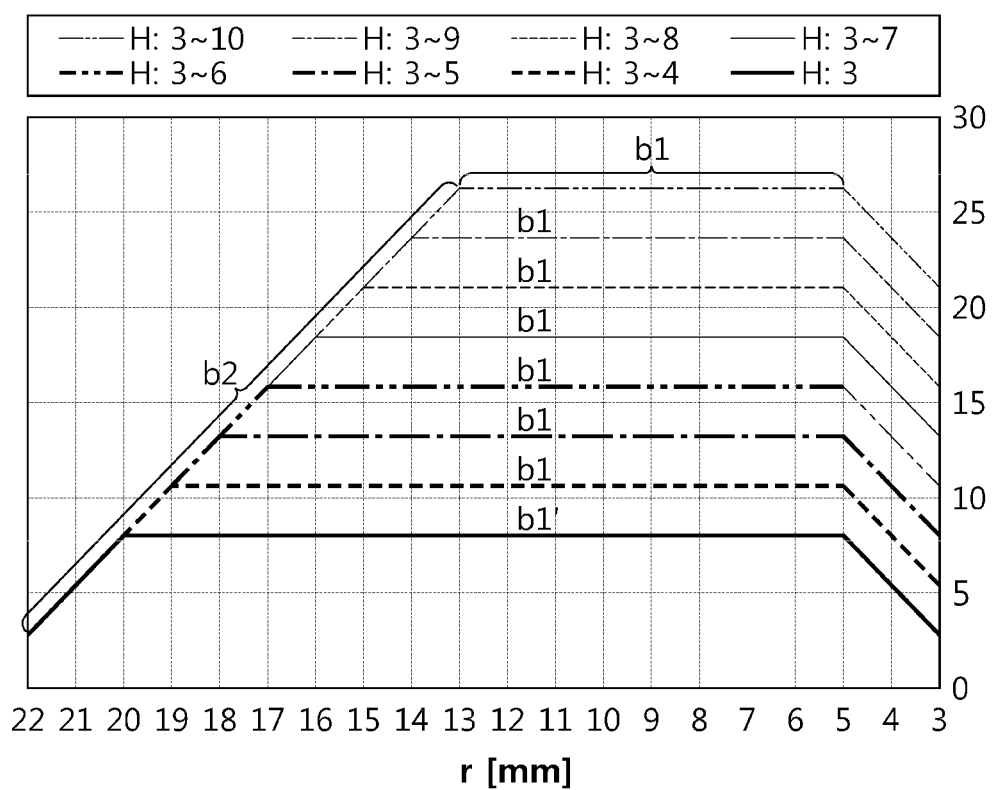
FIG. 10c is graphs showing the results of counting the stack number of segments along a radial direction in the bending surface region of a positive electrode formed at the upper portion of the electrode assemblies according to the embodiments 1-1 to 1-7 and the comparative example.

FIG. 10c is graphs showing the results of counting the stack number of segments along the radial direction in the bending surface region F of the positive electrode formed at the upper portion of the electrode assemblies according to the embodiments 1-1 to 1-7 and the comparative example. The bending surface region of the negative electrode also shows substantially the same results. The horizontal axis of the graph is the radius based on the center of the core, and the vertical axis of the graph is the stack number of segments counted at each radius point, which is also applied in the same way to FIGS. 10d and 10e, explained later.

Referring to FIG. 10c, the stack number uniform region b1 of the segments is commonly shown in the embodiments 1-1 to 1-7 and the comparative example 1. The stack number uniform region b1 is a radial region of a flattened area in each graph. The length of the stack number uniform region b1 increases as the maximum height of the segments decreases, and the stack number uniform region b1' of the comparative example is longest. Meanwhile, the stack number of segments increases as the maximum height ($h_N$) of the segments increases. That is, when the maximum height ($h_N$) of the segments increases so that the width of the height variable region (②) of the segments increases, the stack number of segments increases while the width of the stack number uniform region b1 decreases. At the outer side of the stack number uniform region b1, the stack number decrease region b2 appears, in which the stack number of segments decreases as the radius increases. The stack number decrease region b2 is a radial region in which the stack number of segments decreases as the radius of the electrode assembly increases. The stack number uniform region b1 and the stack number decrease region b2 are adjacent in the radial direction and complementary to each other. That is, when the length of one region increases, the length of the other region decreases. In addition, in the stack number decrease region b2, the stack number decreases in proportion to the distance away from the stack number uniform region b1.

From the point of view of the stack number of the segments, in the embodiments 1-1 to 1-7, the stack number of the segments is 10 or more in the uniform region b1. An area where the stack number of segments is 10 or more may be set as a desirable welding target area. The welding target area is a region to which at least a part of the current collector can be welded.

In the embodiments 1-1 to 1-7, the stack number uniform region b1 starts from the radius point where the height variable region (②) of the segments starts. That is, the height variable region (②) starts with the radius of 5 mm and extends toward the outer circumference.

In the embodiments 1-1 to 1-7 and the comparative example 1, for the positive electrode, Table 4 below shows the results of calculating a ratio of the length of the segment skip region (c, ① in FIG. 10a) to the radius (b−a) of the electrode assembly excluding the core, a ratio (e/f) of the length of the stack number uniform region b1 to the length (f) from the radius point (5 mm) where the stack number uniform region starts to the outermost point (22 mm) of the electrode assembly, a ratio (d/f) of the length of the height variable region (d) of the segment to the length (f) from the radius point (5 mm) where the stack number uniform region starts to the outermost point (22 mm) of the electrode assembly, a ratio (h) of the length of the electrode area corresponding to the segment skip region (first portion B1) to the entire length of the electrode, a ratio (i) of the length of the electrode area corresponding to the height variable region to the entire length of the electrode, and a ratio (i) of the length of the electrode area corresponding to the height uniform region to the entire length of the electrode, and the like.

Except that the negative electrode shows a difference of 0.1& to 1.2% for the parameter h, the other parameters are substantially the same as the positive electrode. The sum of the proportions h, i and j is slightly different from 100%. The reason is that there is a region with no segment in the second portion B3 corresponding to the outer circumference uncoated portion of the electrode. For example, in the embodiment 1-1, a segment does not exist in the second portion B3 corresponding to approximately 4% of the entire length of the electrode. In Table 4, a to f are parameters based on the length in the radial direction, and h, i, and j are parameters based on the length in the longitudinal direction of the electrode before the electrode is wound into an electrode assembly. Also, the parameters corresponding to the ratio (0%) are values rounded at one decimal place. These points are substantially the same in Tables 5 and 6, explained later.

TABLE 4

| Ref. | a. core radius (mm) | b. radius of winding structure (mm) | c. segment skip region (mm) | d. height variable region (mm) | e. stack number uniform region (mm) | f. segment region (mm) | g. stack number | c/(b−a) (%) | d/f (%) | e/f (%) | h. ratio of segment skip region | i. ratio of height variable region | j. ratio of height uniform region |
|---|---|---|---|---|---|---|---|---|---|---|---|---|---|
| embodiment 1-1 | 2 | 22 | 3 | 1 | 14 | 17 | 11 | 15% | 6% | 82% | 6% | 3% | 87% |
| embodiment 1-2 | 2 | 22 | 3 | 2 | 13 | 17 | 13 | 15% | 12% | 76% | 6% | 7% | 83% |
| embodiment 1-3 | 2 | 22 | 3 | 3 | 12 | 17 | 16 | 15% | 18% | 71% | 6% | 11% | 80% |
| embodiment 1-4 | 2 | 22 | 3 | 4 | 11 | 17 | 18 | 15% | 24% | 65% | 6% | 15% | 75% |
| embodiment 1-5 | 2 | 22 | 3 | 5 | 10 | 17 | 21 | 15% | 29% | 59% | 6% | 21% | 69% |
| embodiment 1-6 | 2 | 22 | 3 | 6 | 9 | 17 | 24 | 15% | 35% | 53% | 6% | 25% | 65% |
| embodiment 1-7 | 2 | 22 | 3 | 7 | 8 | 17 | 26 | 15% | 41% | 47% | 6% | 32% | 59% |
| comparative example 1 | 2 | 22 | 3 | 0 | 15 | 17 | 8 | 15% | 0% | 88% | 6% | — | — |

Seeing the embodiments 1-1 to 1-7 of Table 4, the stack number of segments is 11 to 27, and the ratio (d/f) of the height variable region (d) to the radial region f containing segments is 6% to 41%. In addition, the ratio (e/f) of the stack number uniform region (e) to the radial region f containing segments is 47% to 82%. In addition, the ratio (c/(b−a)) of the segment skip region (c, ① in FIG. 10a) to the radius (b−a) of the electrode assembly excluding the core is 15%. In addition, the ratio of the length of the electrode area corresponding to the segment skip region (first portion B1) to the entire length of the electrode is 6%, the ratio of the length of the electrode area corresponding to the height variable region to the entire length of the electrode to is 3% to 32%, and the ratio of the length of the electrode area corresponding to the height uniform region to the entire length of the electrode is 59% to 87%.

The stack number (g) of the stack number uniform region is 10 or more in all of the embodiments 1-1 to 1-7. The stack number uniform region (e) decreases as the height variable region (d) of the segments increases, but the stack number (g) of the segments increases in the stack number uniform region (e). Preferably, the stack number uniform region (e) in which the stack number (g) of segments is 10 or more may be set as a welding target area.

In the cylindrical batteries with form factors of 1865 and 2170, the radius of the electrode assembly is approximately 9 mm to 10 mm. Therefore, for a conventional cylindrical battery, as in the embodiments 1-1 to 1-7, the length of the segment region (f) in the radial direction cannot be secured at the level of 17 mm, and the length of the stack number uniform region (e) cannot be secured at the level of 8 mm to 14 mm. This is because, in a conventional cylindrical battery, when the radius of the core is designed to be 2 mm, which is the same as in the embodiments 1-1 to 1-7, the radial region in which segments can be disposed is substantially only 7 mm to 8 mm. In addition, in the conventional cylindrical battery, the length of the electrode in the winding direction is about 600 mm to 980 mm. This short length of the electrode is only about 15% to 24% of the length of the electrode (positive electrode 3948 mm, negative electrode 4045 mm) used in the embodiments 1-1 to 1-7. Therefore, the numerical ranges for the parameters h, i, and j cannot be easily derived from design specifications of the conventional cylindrical battery.

Next, when the maximum height ($h_N$) of the segments is the same in the height variable region (②in FIG. 10a) of the segments, it will be explained through specific embodiments how the stack number of the segments varies along the radial direction of the bending surface region F according to the change in the minimum height ($h_1$) of the segments.

The electrode assemblies of the embodiments 2-1 to 2-5 have a radius of 22 mm and a diameter of core C of 4 mm. In the height variable region (② in FIG. 10a) of the segments 61, the minimum height ($h_1$) is the same as 4 mm, and the maximum height ($h_{-N}$) varies from 6 mm to 10 mm in increments of 1 mm. Therefore, in the electrode assemblies of the embodiments 2-1 to 2-5, the height variable region (② in FIG. 10a) of the segments has a width of 2 mm, 3 mm, 4 mm, 5 mm, and 6 mm, respectively, and the segment skip region (① in FIG. 10a) is a radial region with a radius of 2 mm to 6 mm.

The electrode assemblies of the embodiments 3-1 to 3-4 have a radius of 22 mm and a diameter of the core C of 4 mm. In the height variable region (② in FIG. 10a) of the segments 61, the minimum height ($h_1$) is the same as 5 mm, and the maximum height ($h_N$) varies from 7 mm to 10 mm in increments of 1 mm. Therefore, in the electrode assemblies of the embodiments 3-1 to 3-4, the height variable region (② in FIG. 10a) of the segments has a width of 2 mm, 3 mm, 4 mm, and 5 mm, respectively, and the segment skip region (① in FIG. 10a) is a radial region with a radius of 2 mm to 7 mm.

The electrode assemblies of the embodiments 4-1 to 4-3 have a radius of 22 mm and a diameter of the core C of 4 mm. In the height variable region (② in FIG. 10a) of the segments 61, the minimum height ($h_1$) is the same as 6 mm, and the maximum height ($h_N$) varies from 8 mm to 10 mm in increments of 1 mm. Therefore, in the electrode assemblies of the embodiments 4-1 to 4-3, the width of the height variable region (② in FIG. 10a) of the segments is 2 mm, 3 mm, and 4 mm, respectively, and the segment skip region (① in FIG. 10a) is a radial region with a radius of 2 mm to 8 mm.

The electrode assemblies of the embodiments 5-1 to 5-2 have a radius of 22 mm and a diameter of core C of 4 mm. In the height variable region (② in FIG. 10a) of the segments 61, the minimum height ($h_1$) is the same as 7 mm, and the maximum height ($h_N$) varies from 9 mm to 10 mm in 1 mm increments. Therefore, in the electrode assemblies of the embodiments 5-1 to 5-2, the width of the height variable region (② in FIG. 10a) of the segments is 2 mm and 3 mm, respectively, and the segment skip region (① in FIG. 10a) is a radial region with a radius of 2 mm to 9 mm.

Figure 10D:
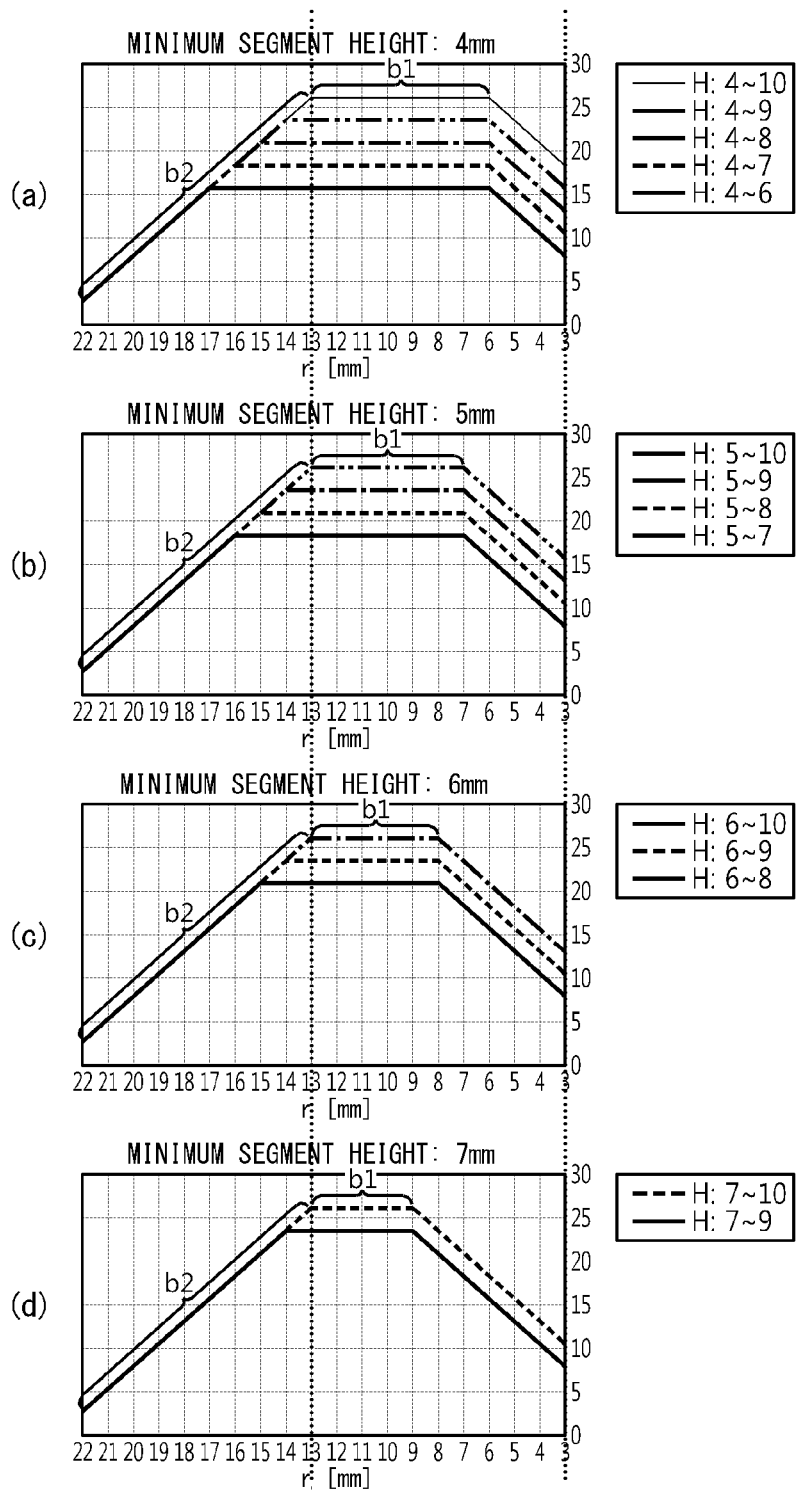
FIG. 10d is graphs showing the results of counting the stack number of segments along the radial direction in the bending surface region of the positive electrode formed at the upper portion of the electrode assemblies according to the embodiments 2-1 to 2-5, the embodiments 3-1 to 3-4, the embodiments 4-1 to 4-3, and the embodiments 5-1 to 5-2.

FIG. 10d is graphs showing the results of counting the stack number of segments along the radial direction in the bending surface region F of the positive electrode formed at the upper portion of the electrode assemblies according to the embodiments 2-1 to 2-5, the embodiments 3-1 to 3-4, the embodiments 4-1 to 4-3, and the embodiments 5-1 to 5-2. The bending surface region of the negative electrode also shows substantially the same results.

In FIG. 10d, the graph (a) is shows the result of counting the stack number of segments along the radial direction in the bending surface region F for the embodiment 2-1 to 2-5, the graph (b) is for the embodiment 3-1 to 3-4, the graph (c) is for the embodiment 4-1 to 4-3, and the graph (d) is for the embodiments 5-1 to 5-2.

Referring to FIG. 10d, the stack number uniform region b1 of the segments appears in common in all embodiments. The stack number uniform region b1 is a radial region of the flat area in the graph. The length of the stack number uniform region b1 increases as the maximum height ($h_N$) of the segments decreases when the minimum height ($h_1$) of the segments is the same. Also, the length of the stack number uniform region b1 increases as the minimum height ($h_1$) of the segments decreases when the maximum height ($h_N$) of the segments is the same. Meanwhile, in the stack number uniform region b1, the stack number of segments increases as the maximum height ($h_N$) of the segments increases. Even in the embodiments, the stack number decrease region b2 appears near the stack number uniform region b1.

In all of the embodiments, the stack number of segments in the stack number uniform region b1 is 10 or more. Preferably, an area where the stack number of segments is 10 or more may be set as a desirable welding target area.

In the embodiments, the stack number uniform region b1 starts from the radius point where the height variable region (② in FIG. 10a) of the segments starts. In the embodiments 2-1 to 2-5, the height variable region (② in FIG. 10a) of the segments starts from 6 mm and extends toward the outer circumference. In the embodiments 3-1 to 3-4, the height variable region (② in FIG. 10a) of the segments starts from 7 mm and extends toward the outer circumference. In the embodiments 4-3 to 4-3, the height variable region (② in FIG. 10a) of FIG. 10a) of the segments starts from 8 mm and extends toward the outer circumference. In the embodiments 5-1 to 5-2, the height variable region (② in FIG. 10a) of the segments starts from 9 mm and extends toward the outer circumference.

Table 5 below shows the results of calculating various parameters for the embodiments 2-1 to 2-5, the embodiments 3-1 to 3-4, the embodiments 4-1 to 4-3, and the embodiments 5-1 to 5-2, including a ratio (e/f) of the length of the stack number uniform region to the length from the radius point (6 mm, 7 mm, 8 mm, 9 mm) where the stack number uniform region starts to the outermost point (22 mm) of the electrode assembly, a ratio (d/f) of the length of the height variable region (②) of the segments to the length from the radius point (6 mm, 7 mm, 8 mm, 9 mm) where the stack number uniform region starts to the outermost point (22 mm) of the electrode assembly, and the like.

region (②) of the segments is 13% to 38%, and the ratio (e/f) of the stack number uniform region is 31% to 69%. In addition, the ratio (c/(b−a)) of the segment skip region (①) to the radius (b−a) of the electrode assembly excluding the core is 20% to 35%. In addition, the ratio of the length of the electrode area corresponding to the segment skip region (①) to the entire length of the electrode is 10% to 20%, the ratio of the length of the electrode area corresponding to the height variable region (②) to the entire length of the electrode is 6% to 25%, and the ratio of the length of the

TABLE 5

| Ref. | a. core radius (mm) | b. radius of winding structure (mm) | c. segment skip region (mm) | d. height variable region (mm) | e. stack number uniform region (mm) | f. segment region (mm) | g. stack number | c/(b−a) (%) | d/f (%) | e/f (%) | h. ratio of segment skip region | i. ratio of height variable region | j. ratio of height uniform region |
|---|---|---|---|---|---|---|---|---|---|---|---|---|---|
| embodiment 2-1 | 2 | 22 | 4 | 2 | 7 | 16 | 16 | 20% | 13% | 44% | 10% | 6% | 81% |
| embodiment 2-2 | 2 | 22 | 4 | 3 | 8 | 16 | 18 | 20% | 19% | 50% | 10% | 11% | 77% |
| embodiment 2-3 | 2 | 22 | 4 | 4 | 9 | 16 | 21 | 20% | 25% | 56% | 10% | 16% | 72% |
| embodiment 2-4 | 2 | 22 | 4 | 5 | 10 | 16 | 24 | 20% | 31% | 63% | 10% | 20% | 68% |
| embodiment 2-5 | 2 | 22 | 4 | 6 | 11 | 16 | 26 | 20% | 38% | 69% | 10% | 25% | 65% |
| embodiment 3-1 | 2 | 22 | 5 | 2 | 6 | 15 | 18 | 25% | 13% | 40% | 13% | 7% | 77% |
| embodiment 3-2 | 2 | 22 | 5 | 3 | 7 | 15 | 21 | 25% | 20% | 47% | 13% | 12% | 72% |
| embodiment 3-3 | 2 | 22 | 5 | 4 | 8 | 15 | 24 | 25% | 27% | 53% | 13% | 16% | 68% |
| embodiment 3-4 | 2 | 22 | 5 | 5 | 9 | 15 | 26 | 25% | 33% | 60% | 13% | 22% | 62% |
| embodiment 4-1 | 2 | 22 | 6 | 2 | 5 | 14 | 21 | 30% | 14% | 36% | 16% | 9% | 72% |
| embodiment 4-2 | 2 | 22 | 6 | 3 | 6 | 14 | 24 | 30% | 21% | 43% | 16% | 13% | 68% |
| embodiment 4-3 | 2 | 22 | 6 | 4 | 7 | 14 | 26 | 30% | 29% | 50% | 16% | 19% | 62% |
| embodiment 5-1 | 2 | 22 | 7 | 2 | 4 | 13 | 24 | 35% | 15% | 31% | 20% | 9% | 68% |
| embodiment 5-2 | 2 | 22 | 7 | 3 | 5 | 13 | 26 | 35% | 23% | 38% | 20% | 15% | 62% |

Referring to the embodiments 2-5, 3-4, 4-3, and 5-2 of Table 5 together with FIGS. 10a and 10d, the maximum height ($h_N$) of the segments in the height variable region (②) of the segments is the same as 10 mm, but the minimum height ($h_1$) of the segments increases to 4 mm, 5 mm, 6 mm, and 7 mm by 1 mm, and the length of the height variable region (②) decreases to 6 mm, 5 mm, 4 mm, and 3 mm by 1 mm. In the four embodiments, the ratio (e/f) of the stack number uniform region is largest in the embodiments 2-5 as 69% and is smallest in the embodiment 5-2 as 38%, and the stack numbers of the stack number uniform regions are all the same.

From the results shown in Table 5, when the maximum height ($h_N$) of the segments is the same, it may be understood that as the width of the height variable region (②) of the segment increases since the minimum height ($h_1$) of the segments decreases, the width of the stack number uniform region also increases proportionally. The reason is that as the minimum length (h1) of the segments is smaller, the radius point at which the segment starts is closer to the core, and thus the area where the segments are stacked expands toward the core.

Seeing Table 5, it may be found that the stack number of the segments is 16 to 26, the ratio (d/f) of the height variable electrode area corresponding to the height uniform region (③) to the entire length of the electrode is 62% to 81%.

In the cylindrical batteries with form factors of 1865 and 2170, the electrode assembly has a radius of approximately 9 mm to 10 mm. Therefore, different from the embodiments, it is not possible to secure the length of the segment region (f) in the radial direction at the level of 13 mm to 16 mm, and it is not possible to secure the length of the stack number uniform region (e) where the stack number of the segments is 10 or more at the level of 5 mm to 11 mm while securing the length of the segment skip region (c, ①) at the level of about 4 mm to 7 mm. This is because, in the conventional cylindrical battery, when the radius of the core is designed to be 2 mm, which is the same as the embodiments, the radial region in which segments can be disposed is substantially only 7 mm to 8 mm. In addition, in the conventional cylindrical battery, the length of the electrode in the winding direction is about 600 mm to 980 mm. This short length of the electrode is only about 15% to 24% of the length of the electrode (positive electrode 3948 mm, negative electrode 4045 mm) in the embodiments. Therefore, the numerical ranges for the parameters h, i, and j cannot be easily derived from design specifications of the conventional cylindrical batteries.

Next, when the minimum height ($h_1$) and the maximum height ($h_N$) of the segments are the same in the height variable region (②) of the segments, it will be explained through specific embodiments how the stack number of the segments according to the diameter of the core C of the electrode assembly changes along the radial direction of the bending surface region F.

The electrode assemblies of the embodiments 6-1 to 6-6 have a radius of 22 mm, and the radius of the core C is 4 mm. In the height variable region (②) of the segments 61, the minimum height ($h_1$) of the segments is the same as 3 mm, and the maximum height ($h_N$) of the segments varies from 5 mm to 10 mm in increments of 1 mm. Therefore, in the electrode assemblies of the embodiments 6-1 to 6-6, the width of the height variable region (②) of the segments is 2 mm, 3 mm, 4 mm, 5 mm, 6 mm, and 7 mm, respectively, and the segment skip region (①) is a radial region with a radius of 4 mm to 7 mm.

The electrode assemblies of the embodiments 7-1 to 7-6 have a radius of 22 mm, and the radius of the core C is 2 mm. In the height variable region (②) of the segments 61, the minimum height ($h_1$) of the segments is the same as 3 mm, and the maximum height ($h_N$) of the segments varies from 5 mm to 10 mm in increments of 1 mm. Therefore, in the electrode assemblies of the embodiments 7-1 to 7-6, the height variable region (②) of the segments has a width of 2 mm, 3 mm, 4 mm, 5 mm, 6 mm, and 7 mm, respectively, and the segment skip region (①) is all the same as a radial region with a radius of 2 mm to 5 mm.

Figure 10E:
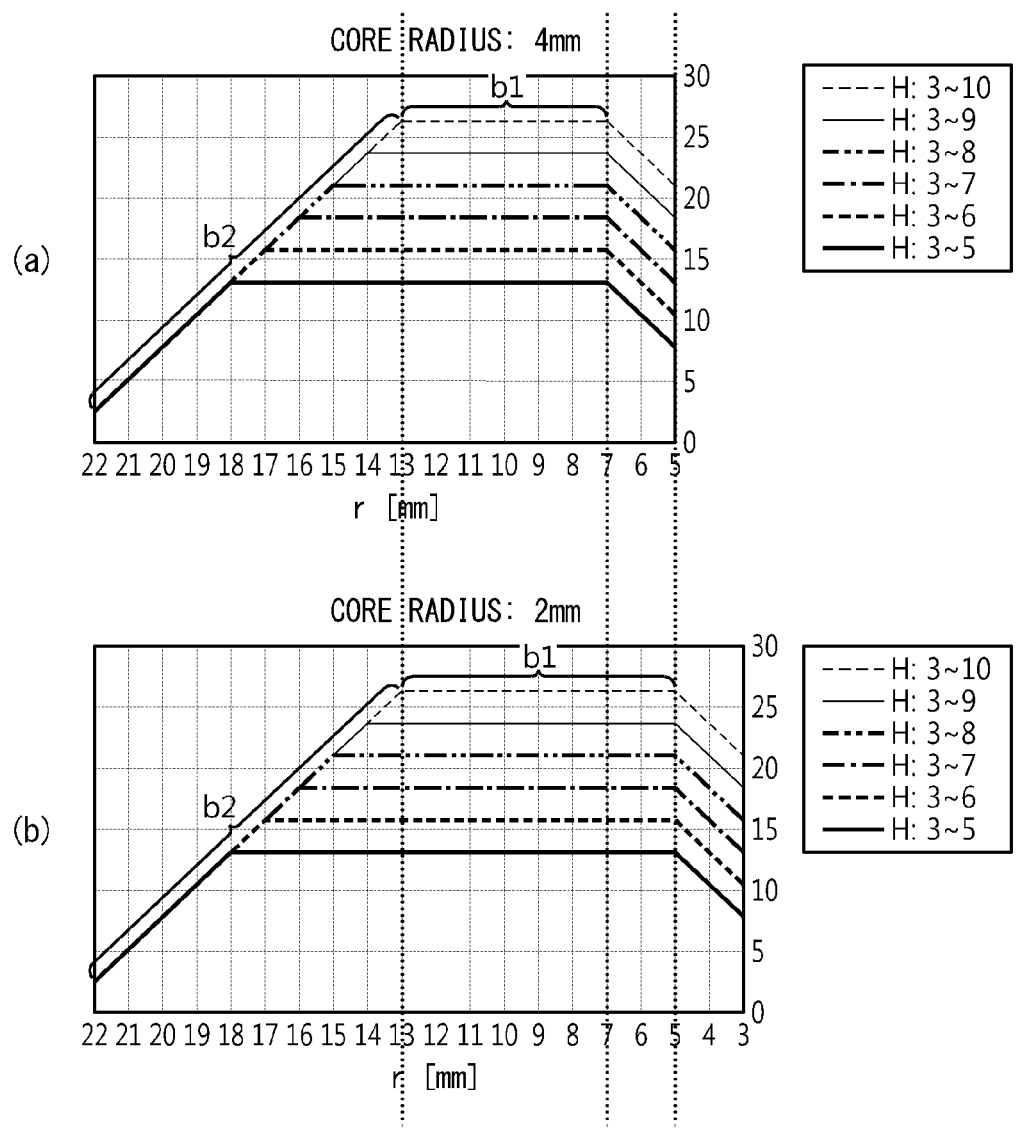
FIG. 10e is graphs showing the results of counting the stack number of segments measured along the radial direction in the bending surface region of the positive electrode formed at the upper portion of the electrode assembly according to the embodiments 6-1 to 6-6 and the embodiments 7-1 to 7-6.

FIG. 10e is graphs showing the results of counting the stack number of segments measured along the radial direction in the bending surface region F of the positive electrode formed at the upper portion of the electrode assembly according to the embodiments 6-1 to 6-6 and the embodiments 7-1 to 7-6. Substantially the same results appear in the bending surface region of the negative electrode.

In FIG. 10e, the graph (a) shows the result of counting the stack number of segments measured along the radial direction in the bending surface region F for the embodiments 6-1 to 6-6, and the graph (b) is for the embodiments 7-1 to 7-6.

Referring to FIG. 10e, the stack number uniform region b1 of the segments appears in common in all embodiments. The stack number uniform region b1 is a radial region of the flat area in the graph. The length of the stack number uniform region b1 in the radial direction increases as the maximum height ($h_N$) of the segments decreases when the minimum height ($h_1$) of the segments is the same. Meanwhile, in the stack number uniform region b1, the stack number of segments increases as the maximum height ($h_N$) of the segments increases. In the embodiments, the stack number decrease region b2 is identified near the stack number uniform region b1.

In all of the embodiments, the stack number of the segments is 10 or more in the stack number uniform region b1. Preferably, an area where the stack number of segments is 10 or more may be set as a desirable welding target area.

In the embodiments, the stack number uniform region b1 starts from the radius point where the height variable region (②) of the segments starts. In the embodiments 6-1 to 6-6, the radius where the height variable region (②) of the segment starts is 7 mm, and in the embodiments 7-1 to 7-6, the radius where the height variable region (②) of the segments starts is 5 mm.

Table 6 below shows the results of calculating various parameters for the embodiments 6-1 to 6-6 and the embodiments 7-1 to 7-6, including a ratio (e/f) of the length of the stack number uniform region to the length from the radius point (7 mm, 5 mm) where the stack number uniform region starts to the outermost point (22 mm) of the electrode assembly, a ratio (d/f) of the length of the height variable region (②) of the segments to the length from the radius point (7 mm, 5 mm) where the stack number uniform region starts to the outermost point (22 mm) of the electrode assembly, and the like.

TABLE 6

| Ref. | a. core radius (mm) | b. radius of winding structure (mm) | c. segment skip region (mm) | d. height variable region (mm) | e. stack number uniform region (mm) | f. segment region (mm) | g. stack number | c/(b-a) (%) | d/f (%) | e/f (%) | h. ratio of segment skip region | i. ratio of height variable region | j. ratio of height uniform region |
|---|---|---|---|---|---|---|---|---|---|---|---|---|---|
| embodiment 6-1 | 4 | 22 | 3 | 2 | 11 | 15 | 13 | 17% | 13% | 73% | 6% | 7% | 83% |
| embodiment 6-2 | 4 | 22 | 3 | 3 | 10 | 15 | 16 | 17% | 20% | 67% | 6% | 11% | 80% |
| embodiment 6-3 | 4 | 22 | 3 | 4 | 9 | 15 | 18 | 17% | 27% | 60% | 6% | 15% | 75% |
| embodiment 6-4 | 4 | 22 | 3 | 5 | 8 | 15 | 21 | 17% | 33% | 53% | 6% | 21% | 69% |
| embodiment 6-5 | 4 | 22 | 3 | 6 | 7 | 15 | 24 | 17% | 40% | 47% | 6% | 25% | 65% |
| embodiment 6-6 | 4 | 22 | 3 | 7 | 6 | 15 | 26 | 17% | 47% | 40% | 6% | 32% | 59% |
| embodiment 7-1 | 2 | 22 | 3 | 2 | 13 | 17 | 13 | 15% | 12% | 76% | 6% | 7% | 83% |
| embodiment 7-2 | 2 | 22 | 3 | 3 | 12 | 17 | 16 | 15% | 18% | 71% | 6% | 11% | 80% |
| embodiment 7-3 | 2 | 22 | 3 | 4 | 11 | 17 | 18 | 15% | 24% | 65% | 6% | 15% | 75% |
| embodiment 7-4 | 2 | 22 | 3 | 5 | 10 | 17 | 21 | 15% | 29% | 59% | 6% | 21% | 69% |
| embodiment 7-5 | 2 | 22 | 3 | 6 | 9 | 17 | 24 | 15% | 35% | 53% | 6% | 25% | 65% |
| embodiment 7-6 | 2 | 22 | 3 | 7 | 8 | 17 | 26 | 15% | 41% | 47% | 6% | 32% | 59% |

Seeing FIG. 10a and the embodiments 6-6 and 7-6 of Table 6, the minimum height ($h_1$) and the maximum height ($h_N$) of the segments in the height variable region (②) of the segments are the same as 3 mm and 10 mm, respectively. However, in the embodiment 6-6, the radius of the core is larger by 2 mm than that in the embodiment 7-6. Therefore, in the embodiment 6-6, the stack number uniform region (e) and the segment region (f) are smaller by 2 mm than those in the embodiment 7-6, and the stack number of segments is the same in the stack number uniform region. This result comes from the difference in the radius of the core. From the results shown in Table 6, when the width of the height variable region (②) of the segments is the same, it may be understood that, as the radius (a) of the core is smaller, the ratio (d/f) of the height variable region (②) decreases, but the ratio (e/f) of the stack number uniform region increases.

Seeing Table 6, it may be found that the stack number of segments is 13 to 26, the ratio (d/f) of the height variable region (②) of the segments is 12% to 47%, and the ratio (e/f) of the length of the stack number uniform region is 40% to 76%. In addition, the ratio (c/(b–a)) of the segment skip region (①) to the radius (b–a) of the electrode assembly excluding the core is 15% to 17%. In addition, the ratio of the length of the electrode area corresponding to the segment skip region (①) to the entire length of the electrode is 6%, the ratio of the length of the electrode area corresponding to the height variable region (②) to the entire length of the electrode is 7% to 32%, and the ratio of the length of the electrode area corresponding to the height uniform region (③) to the entire length of the electrode is 59% to 83%.

For cylindrical batteries with form factors of 1865 and 2170, the radius of the electrode assembly is approximately 9 mm to 10 mm. Therefore, different from the embodiments, the length of the segment region (f) in the radial direction is not secured at the level of 15 mm to 17 mm, and at the same time the length of the stack number uniform region (e) where the stack number of segments is 10 or more cannot be secured at the level of 6 mm to 13 mm, while securing the length of the segment skip region (①) at the level of about 3 mm. This is because, in the conventional cylindrical battery, when the radius of the core is designed to be 2 mm to 4 mm, which is the same as the embodiments, the radial region in which segments can be disposed is substantially only 5 mm to 8 mm. In addition, in the conventional cylindrical battery, the length of the electrode in the winding direction is about 600 mm to 980 mm. This short length of the electrode is only about 15% to 24% of the length of the electrode (positive electrode 3948 mm, negative electrode 4045 mm) in the embodiments. Therefore, the numerical ranges for the parameters h, i, and j cannot be easily derived from design specifications of the conventional cylindrical batteries.

Comprehensively considering the data in Tables 4 to 6, the stack number of segments may be 11 to 26 in the stack number uniform region of the segments. In addition, the ratio (d/f) of the height variable region (②) of the segments may be 6% to 47%. Also, the ratio (e/f) of the stack number uniform region may be 31% to 82%. In addition, the ratio (c/(b–a)) of the length of the segment skip region (①) to the radius of the electrode assembly excluding the core may be 15% to 35%. In addition, the ratio of the length of the electrode area corresponding to the segment skip region (①) to the entire length (length in the winding direction) of the electrode may be 6% to 20%. In addition, the ratio of the length of the electrode area corresponding to the height variable region (②) of the segments to the entire length of the electrode may be 3% to 32%. In addition, the ratio of the length of the electrode area corresponding to the height uniform region (③) of the segments to the entire length of the electrode may be 59% to 87%.

Meanwhile, the parameters described in Tables 4 to 6 are be varied according to design factors including the radius (a) of the core; the radius of the electrode assembly (b); the minimum height ($h_1$) and the maximum height ($h_N$) in the height variable region (②) of the segments; the height change amount (Δh) of the segments per 1 mm increment of the radius; the thickness of the positive electrode, the negative electrode and the separator, and the like.

Therefore, in the stack number uniform region of the segments, the segment stack number may be extended as 10 to 35. The ratio (d/f) of the height variable region (②) of the segments may be extended as 1% to 50%. Also, the ratio (e/f) of the stack number uniform region may be extended as 30% to 85%. In addition, the ratio (c/(b–a)) of the length of the segment skip region (①) to the radius of the electrode assembly excluding the core may be extended as 10% to 40%. In addition, the ratio of the length of the electrode area corresponding to the segment skip region (①) to the entire length (length in the winding direction) of the electrode may be expanded as 1% to 30%. In addition, the ratio of the length of the electrode area corresponding to the height variable region (②) of the segments to the entire length of the electrode may be expanded as 1% to 40%. In addition, the ratio of the length of the electrode area corresponding to the height uniform region (③) of the segments to the entire length of the electrode may be expanded as 50% to 90%. In the embodiments, the height index N of the maximum height ($h_N$) of the segments included in the height variable region (②) and the height uniform region (③) is 2 to 8. For example, seeing Table 4, the height index N for the embodiments 1-1 and 1-7 is 2 and 8, respectively. However, the height index N may vary depending on the height change amount (Δh) of the segment in the radial direction of the electrode assembly. When the radial length of the height variable region (②) is fixed, if the height change amount (Δh) of the segment decreases, the height index N increases accordingly, or vice versa. Preferably, the height index N may be further expanded to 2 to 20, optionally to 2 to 30.

In the bending surface region F formed at the upper portion and the lower portion of the electrode assembly, the stack number uniform region may be used as the welding target area of the current collector.

Preferably, the welding region of the current collector overlaps the stack number uniform region by at least 50% in the radial direction of the electrode assembly, and a higher overlapping ratio is more preferred.

Preferably, the rest area of the welding region of the current collector that does not overlap with the stack number uniform region may overlap with the stack number decrease region adjacent to the stack number uniform region in the radial direction.

More preferably, the rest area of the welding region of the current collector that does not overlap with the stack number uniform region may overlap with the area of the stack number decrease region in which the segment stack number is 10 or more.

If the current collector is welded to the area where the segment stack number is 10 or more, it is desirable in terms of the welding strength and prevention of damage to the separator or the active material layer during welding. In particular, it is useful when welding the current collector using a high-power laser with high transmission characteristics.

If the stack number uniform region where 10 or more of the segments are stacked and the current collector are welded with a laser, even if the output of the laser is increased to improve welding quality, the stack number uniform region absorbs most of the laser energy to form a welding bead, so it is possible to prevent the separator and the active material layer below the bending surface region F from being damaged by the laser.

In addition, since the segment stack number is 10 or more in the area where the laser is irradiated, welding beads are formed with sufficient volume and thickness. Therefore, sufficient welding strength may be secured and the resistance of the welding interface may be reduced to a level suitable for rapid charging.

When welding the current collector, the output of the laser may be determined by the desired welding strength between the bending surface region F and the current collector. The welding strength increases in proportion to the stack number of segments. This is because the volume of the welding beads formed by the laser increases as the stack number increases. The welding beads are formed as the material of the current collector and the material of the segment are melted together. Therefore, when the volume of the welding bead is large, the current collector and the bending surface region are coupled stronger and the contact resistance of the welding interface is lowered.

Preferably, the welding strength may be 2 kgf/cm$^2$ or more, more preferably 4 kgf/cm$^2$ or more. The maximum welding strength may vary depending on the output of the laser welding equipment. Also, the welding strength may be preferably set to 8 kgf/cm$^2$ or less, more preferably 6 kgf/cm$^2$ or less. However, the present disclosure is not limited thereto.

When the welding strength satisfies the above numerical range, even if severe vibration is applied to the electrode assembly along the winding axis direction and/or the radial direction, the properties of the welding interface do not deteriorate, and the resistance of the welding interface may be reduced since the volume of the welding beads is sufficient.

The power of the laser to meet the welding strength condition differs depending on the laser equipment, and may be appropriately adjusted in the range of 250 W to 320 W or in the range of 40% to 100% of the laser maximum output provided by the equipment.

The welding strength may be defined as a tensile force (kgf/cm$^2$) per unit area of the current collector when the current collector starts to separate from the bending surface region F. Specifically, after the current collector is completely welded, a tensile force may be applied to the current collector while gradually increasing the magnitude of the tensile force. When the tensile force exceeds a threshold value, the segment starts to separate from the welding interface. At this time, the value obtained by dividing the tensile force applied to the current collector by the area of the current collector corresponds to the welding strength.

In the bending surface region F, the segments are stacked in a plurality of layers, and according to the above embodiments, the stack number of segments may increase to 10 at minimum to 35 at maximum.

The thickness of the positive electrode current collector (foil) constituting the uncoated portion 43 is 10 um to 25 um, and the thickness of the negative electrode current collector (foil) constituting the uncoated portion 43 may be 5 um to 20 um. Therefore, the bending surface region F of the positive electrode may include an area where the total stack thickness of the segments is 100 um to 875 um. In addition, the bending surface region F of the negative electrode may include an area where the total layered thickness of the segments is 50 um to 700 um.

Figure 10F:
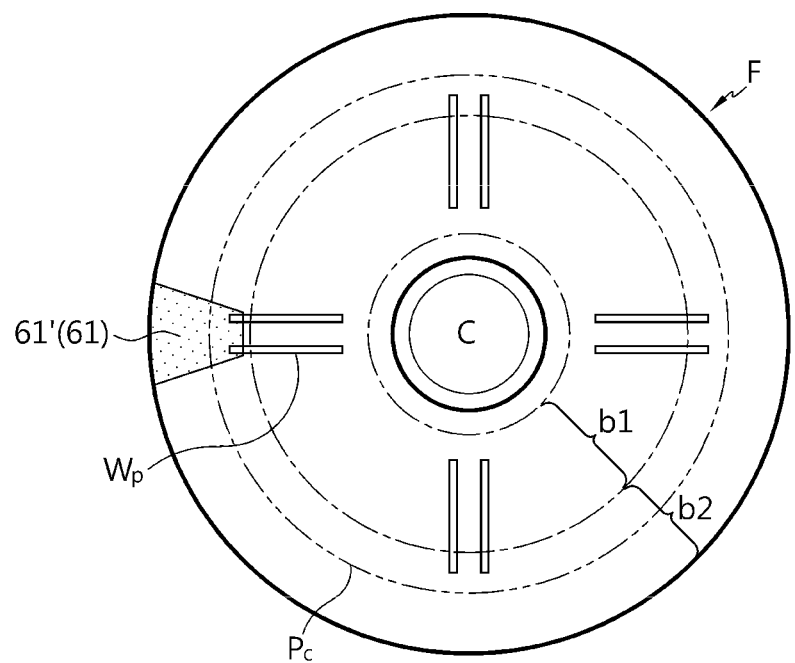
FIG. 10f is a top plan view of the electrode assembly showing a stack number uniform region b1 and a stack number decrease region b2 in the bending surface region of the segment according to an embodiment of the present disclosure.

FIG. 10f is a top plan view of the electrode assembly showing the stack number uniform region b1 and the stack number decrease region b2 in the bending surface region F of the segments 61, 61' according to an embodiment of the present disclosure.

Referring to FIG. 10f, the area between two circles indicated by the thick solid line corresponds to the bending surface region F of the segments, and the area between two circles indicated by the dashed-dotted line corresponds to the stack number uniform region b1 in which the stack number of the segments is 10 or more, and the outer area of the stack number uniform region b1 corresponds to the stack number decrease region b2.

In one example, when the current collector ($P_c$) is welded to the bending surface region F, a welding pattern ($W_p$) is generated on the surface of the current collector ($P_c$). The welding pattern ($W_p$) may have an array of line patterns or dot patterns. The welding pattern ($W_p$) corresponds to the welding region and may overlap by 50% or more with the stack number uniform region b1 of the segments along the radial direction. Therefore, a part of the welding pattern ($W_p$) may be included in the stack number uniform region b1, and the rest of the welding pattern ($W_p$) may be included in the stack number decrease region b2 outside the stack number uniform region b1. Of course, the entire welding pattern ($W_p$) may overlap with the stack number uniform region b1 in order to maximize the welding strength and lower the resistance of the welding region.

The area of the bending surface region F may be defined as the sum of the area of the stack number uniform region b1 and the area of the stack number decrease region b2 of the segment. Since the ratio (e/f) of the stack number uniform region b1 is 30% to 85%, preferably 31% to 82%, the ratio of the area of the stack number uniform region b1 to the area of the bending surface region F may be 9% ($30^2/100^2$) to 72% ($85^2/100^2$), preferably 10% ($31^2/100^2$) to 67% ($82^2/100^2$).

Preferably, the edge of the portion where the current collector ($P_c$) contacts the bending surface region F may cover the end of the segment 61, 61' bent toward the core C in the last winding turn of the height uniform region (③). In this case, since the welding pattern ($W_p$) is formed in a state where the segments 61, 61' are pressed by the current collector ($P_c$), the current collector ($P_c$) and the bending surface region F are strongly coupled. As a result, since the segments 61, 61' stacked in the winding axis direction come into close contact with each other, the resistance at the welding interface may be lowered and lifting of the segments 61, 61' may be prevented.

Meanwhile, the bending direction of the segments may be opposite to that described above. That is, the segments may be bent from the core toward the outer circumference. In this case, the pattern in which the heights of the segments change along the winding direction (X-axis direction) may be opposite to that of the embodiments (modifications) described above. For example, the heights of the segments may gradually decrease from the core toward the outer circumference. Also, the structure applied to the first portion B1 and the structure applied to the second portion B3 may be switched with each other. Preferably, the height change pattern may be designed such that the heights of the segments are gradually decreased from the core toward the outer circumference, but when the segment closest to the outer circumference of the electrode assembly is bent toward the outer circumference, the end of the segment does not protrude out of the outer circumference of the electrode assembly.

The electrode structure of the above embodiments (modifications) may be applied to at least one of the first electrode and the second electrode having different polarities included in the jelly-roll type electrode assembly or another type electrode assembly known in the art. In addition, when the electrode structure of the above embodiments (modifications) is applied to any one of the first electrode and the second electrode, the conventional electrode structure may be applied to the other one. In addition, the electrode structures applied to the first electrode and the second electrode may not be identical but be different from each other.

For example, when the first electrode and the second electrode are a positive electrode and a negative electrode, respectively, any one of the above embodiments (modifications) may be applied to the first electrode and the conventional electrode structure (see FIG. 1) may be applied to the second electrode.

As another example, when the first electrode and the second electrode are a positive electrode and a negative electrode, respectively, any one of the above embodiments (modifications) may be selectively applied to the first electrode and any one of the above embodiments (modifications) may be selectively applied to the second electrode.

In the present disclosure, a positive electrode active material coated on the positive electrode and a negative electrode active material coated on the negative electrode may employ any active material known in the art without limitation.

In one example, the positive electrode active material may include an alkali metal compound expressed by a general formula $A(A_xM_y)O_{2+z}$ (A includes at least one element among Li, Na and K; M includes at least one element selected from is Ni, Co, Mn, Ca, Mg, Al, Ti, Si, Fe, Mo, V, Zr, Zn, Cu, Al, Mo, Sc, Zr, Ru, and Cr; $x \geq 0$, $1 \leq x+y \leq 2$, $-0.1 \leq z \leq 2$; and the stoichiometric coefficients x, y and z are selected so that the compound maintains electrical neutrality).

In another example, the positive electrode active material may be an alkali metal compound $xLiM^1O_2$-$(1-x)Li_2M^2O_3$ disclosed in U.S. Pat. Nos. 6,677,082, 6,680,143, et al., wherein $M^1$ includes at least one element having an average oxidation state 3; $M^2$ includes at least one element having an average oxidation state 4; and $0 \leq x \leq 1$).

In still another example, the positive electrode active material may be lithium metal phosphate expressed by a general formula $Li_aM1_xFe_{1-x}M2_yP_{1-y}M3_zO_{4-z}$ (M1 includes at least one element selected from the Ti, Si, Mn, Co, Fe, V, Cr, Mo, Ni, Nd, Al, Mg and Al; M2 includes at least one element selected from Ti, Si, Mn, Co, Fe, V, Cr, Mo, Ni, Nd, Al, Mg, Al, As, Sb, Si, Ge, V and S; M3 includes a halogen element optionally including F; $0 \leq a \leq 2$, $0 \leq x \leq 1$, $0 \leq y \leq 1$, $0 \leq z < 1$; the stoichiometric coefficient a, x, y and z are selected so that the compound maintains electrical neutrality), or $Li_3M2(PO_4)_3$ (M includes at least one element selected from Ti, Si, Mn, Fe, Co, V, Cr, Mo, Ni, Al, Mg and Al).

In another example, as a main component, the positive electrode active material may include a lithium intercalation material, selected from a layered compound such as lithium cobalt oxide ($LiCoO_2$) or lithium nickel oxide ($LiNiO_2$) or a compound substituted with one or more transition metals; lithium manganese oxide ($LiMnO_2$) such as $Li_{1+x}Mn_{2-x}O_4$ (where x is 0 to 0.33), $LiMnO_3$, $LiMn_2O_3$, and $LiMnO_2$; lithium copper oxide ($Li_2CuO_2$); vanadium oxides, such as $LiV_3O_8$, $LiFe_3O_4$, $V_2O_5$, and $Cu_2V_2O_7$; lithiated nickel oxide represented by the formula $LiNi_{1-x}M_xO_2$ (where M=Co, Mn, Al, Cu, Fe, Mg, B or Ga, and x=0.01 to 0.3); lithium manganese composite oxide represented by the formula $LiMn_{2-x}M_xO_2$ (where M=Co, Ni, Fe, Cr, Zn or Ta and x=0.01 to 0.1) or $Li_2Mn_{3\,m}O_8$ (where M=Fe, Co, Ni, Cu or Zn); $LiMn_2O_4$ in which a part of lithium in the formula is replaced with an alkaline earth metal ion; disulfide compounds; $Fe_2(MoO_4)_3$, or composite oxide formed by a combination thereof.

The positive electrode current collector has a thickness of, for example, 3 μm to 500 μm. The positive electrode current collector is not particularly limited as long as it has conductivity without causing chemical change in the battery, and may use, for example, stainless steel, aluminum, nickel, titanium, fired carbon, or aluminum or stainless steel surface-treated with carbon, nickel, titanium, silver, or the like. The positive electrode current collector may have fine irregularities formed on its surface to increase the adhesive strength of the positive electrode active material, and may have various forms such as films, sheets, foils, nets, porous materials, foams, and non-woven fabrics.

A conductive material may be additionally mixed with the positive electrode active material particles. The conductive material is added in an amount of 1 to 50 weight % based on the total weight of the mixture including the positive electrode active material, for example. The conductive material is not particularly limited as long as it has high conductivity without causing chemical change in the battery, and may use, for example, conductive materials selected from graphite such as natural graphite and artificial graphite; carbon black such as carbon black, acetylene black, ketjen black, channel black, furnace black, lamp black, and summer black; conductive fibers such as carbon fibers and metal fibers; metal powders such as carbon fluoride, aluminum, and nickel powder; conductive whiskeys such as zinc oxide and potassium titanate; conductive oxides such as titanium oxide; polyphenylene derivatives, and the like.

Preferably, the positive electrode active material may include primary particles and/or secondary particles in which the primary particles are aggregated.

In addition, the negative electrode is manufactured by applying and drying negative electrode active material particles on the negative electrode current collector, and if necessary, components such as the aforementioned conductive material, binder, and solvent may be further included.

The negative electrode current collector has a thickness of, for example, 3 μm to 500 μm. The negative electrode current collector is not particularly limited as long as it has conductivity without causing chemical change in the battery, and may use, for example, copper, stainless steel, aluminum, nickel, titanium, fired carbon, copper or stainless steel surface-treated with carbon, nickel, titanium, silver, or the like, an aluminum-cadmium alloy, or the like. Also, like the positive electrode current collector, it is possible to strengthen the coupling force of the negative electrode active material by forming fine irregularities on the surface, and the negative electrode current collector may be used in various forms such as films, sheets, foils, nets, porous bodies, foams, and non-woven fabrics.

In one example, the negative electrode active material may employ carbon material, lithium metal or lithium metal compound, silicon or silicon compound, tin or tin compound, or the like. Metal oxides such as $TiO_2$ and $SnO_2$ with a potential of less than 2V may also be used as the negative electrode active material. As the carbon material, low-crystalline carbon, high-crystalline carbon or the like may be used.

In another example, the negative electrode active material may use, for example, carbon such as non-graphitizable carbon, graphitic carbon, and the like; metal composite oxides of $Li_xFe_2O_3$ (0≤x≤1), $Li_xWO_2$ (0≤x≤1), $Sn_xMe_{1-x}Me'yO_z$ (Me:Mn, Fe, Pb, Ge; Me':Al, B, P, Si, elements in Groups 1, 2 and 3 of the periodic table, halogens; 0<x≤1; 1≤y≤3; 1≤z≤8); lithium metal; lithium alloys; silicon-based alloys; tin-based alloys; oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni-based materials, or the like.

The binder polymer that can be used for the electrode is a component that assists in the coupling of the electrode active material particles and the conductive material or the like and the coupling to the electrode current collector, and, for example, is added in an amount of 1 to 50 weight % based on the total weight of the mixture containing the electrode active material. For example, the binder polymer may use any one binder polymer selected from the group consisting of polyvinylidene fluoride-co-hexafluoropropylene (PVdF), polyvinylidene fluoride-co-trichloroethylene, polymethyl methacrylate, polybutyl acrylate, polyacrylonitrile, polyvinyl pyrrolidone, polyvinyl acetate, ethylene-co-vinyl acetate, polyethylene oxide, polyarylate, cellulose acetate, cellulose acetate butyrate, cellulose acetate propionate, cyanoethyl pullulan, cyanoethyl polyvinylalcohol, cyanoethyl cellulose, cyanoethyl sucrose, pullulan, and carboxylmethyl cellulose, or a mixture thereof, but is not limited thereto.

Non-limiting examples of the solvent used for preparing the electrode include acetone, tetrahydrofuran, methylene chloride, chloroform, dimethyl formamide, N-methyl-2-pyrrolidone (NMP), cyclohexane, water or mixtures thereof. These solvents provide an appropriate level of viscosity so that a slurry coating layer can be formed at a desired level on the surface of the electrode current collector.

The negative electrode includes a current collector; and a negative electrode active material layer located on at least one surface of the current collector and including a negative electrode active material, a binder polymer, and a conductive material, and the negative electrode active material layer includes a lower layer region in surface contact with the current collector and an upper layer region in surface contact with the lower layer region and extending to the surface of the negative electrode active material layer. Also, the lower layer region and the upper layer region may independently include at least one of graphite and silicon-based compounds as a negative electrode active material.

The lower layer region may include natural graphite as a negative electrode active material, and the upper layer region may include artificial graphite as a negative electrode active material.

The lower layer region and the upper layer region may independently further include a silicon-based compound as a negative electrode active material.

The silicon-based compound may include at least one of $SiO_x$ (0≤x≤2) and SiC.

According to one embodiment of the present disclosure, the negative electrode may be manufactured by applying and drying a lower layer slurry containing a lower layer negative electrode active material on the current collector to form a lower layer region, and then applying and drying an upper layer slurry containing an upper layer negative electrode active material on the lower layer region to form an upper layer region.

In addition, according to one embodiment of the present disclosure, the negative electrode may be manufactured by the steps of:

preparing a lower layer slurry containing a lower layer negative electrode active material; and an upper layer slurry containing an upper layer negative electrode active material;

coating the lower layer slurry on one surface of a negative electrode current collector, and coating the upper layer slurry on the lower layer slurry at the same time or with a predetermined time difference; and forming an active material layer by simultaneously drying the coated lower layer slurry and the upper layer slurry.

When the negative electrode is manufactured by the latter method, an intermixing region in which these different types of active materials are mixed may exist in a portion of the negative electrode where the lower layer region and the upper layer region are in contact with each other. This is because when the active material layer is formed by coating a lower layer slurry provided as the lower layer negative electrode active material and an upper layer slurry provided as the upper layer negative electrode active material on the current collector at the same time or successively with a very short time difference and then drying them at the same time, a predetermined mixed region is generated in the interface where the lower layer slurry and the upper layer slurry come into contact before drying and, then during drying, this mixed region is formed in the form of a layer of the mixed region.

In the active material layer of the negative electrode according to one embodiment of the present disclosure, the weight ratio (or the ratio of the loading amount per unit area) of the upper layer region and the lower layer region may be 20:80 to 50:50, specifically 25:75 to 50:50.

The thicknesses of the lower layer region and the upper layer region of the active material layer of the negative electrode of the present disclosure may not completely match the thicknesses of the coated lower layer slurry and the coated upper layer slurry. However, as a result of the drying or selective rolling process, the ratio of the thickness of the lower layer region and the upper layer region of the active material layer of the negative electrode of the present disclosure finally obtained may match the ratio of the thickness of the coated lower layer slurry and the coated upper layer slurry.

The first slurry is coated, and the second slurry is coated on the first slurry at the same time or with a predetermined time difference, and according to an embodiment of the present disclosure, the predetermined time difference may be 0.6 seconds or less, or 0.02 seconds to 0.6 seconds, or 0.02 seconds to 0.06 seconds, or 0.02 seconds to 0.03 seconds. Since the time difference during coating of the first slurry and the second slurry is due to the coating equipment, it may be more preferable to simultaneously coat the first slurry and the second slurry. The second slurry may be coated on the first slurry using a device such as a double slot die.

The step of forming the active material layer may further include rolling the active material layer after the drying step. At this time, the rolling may be performed by a method commonly used in the art, such as roll pressing, and may be performed at a pressure of 1 MPa to 20 MPa and a temperature of 15° C. to 30° C.

The step of simultaneously drying the coated lower layer slurry and the coated upper layer slurry to form an active material layer may be performed by a method commonly used in the art using a device in which a hot air drying device and an infrared drying device are combined.

Weight % of the first binder polymer in the solid content of the lower layer slurry may be equal to or greater than weight % of the second binder polymer in the solid content of the upper layer slurry. According to one embodiment of the present disclosure, the weight % of the first binder polymer in the solid content of the lower layer slurry may be 1.0 to 4.2 times larger, or 1.5 to 3.6 times larger, or 1.5 to 3 times larger than the weight % of the second binder polymer in the solid content of the upper layer slurry.

When the weight % of the first binder in the coated lower layer slurry and the weight % of the second binder in the coated upper layer slurry satisfy the above ranges, the binder in the lower layer region is not too small, and thus the separation of the electrode layer does not occur. Also, since the binder in the upper layer region is not too much, the resistance of the upper layer of the electrode is reduced and the rapid charging performance may be advantageous.

In the solid content of the lower layer slurry, the weight % of the first binder polymer may be 2 to 30 weight %, or 5 to 20 weight %, and the proportion (weight %) of the second binder polymer in the solid content of the upper layer slurry may be 0.5 to 20 weight %, or 1 to 15 weight %, or 1 to 10 weight %, or 2 to 5 weight %.

The total ratio (weight %) of the first binder polymer and the second binder polymer in the total solid content of the lower layer slurry and the upper layer slurry may be 2 to 20 weight %, or 5 to 15 weight %.

The separator includes a porous polymer substrate; and a porous coating layer located on both surfaces of the porous polymer substrate and containing inorganic particles and a binder polymer.

The porous polymer substrate may be a polyolefin-based porous substrate.

The polyolefin porous substrate may be in the form of a film or non-woven web. Since the substrate has a porous structure as above, the electrolyte may smoothly move between the positive electrode and the negative electrode, and the electrolyte impregnation property of the substrate itself may be increased, thereby securing excellent ion conductivity. Also, the increase in resistance inside the electrochemical device is prevented, thereby preventing performance degradation of the electrochemical device.

As the polyolefin porous substrate used in the present disclosure, any planar porous substrate commonly used in an electrochemical device may be used, and its material or shape may be variously selected according to the purpose.

The polyolefin porous substrate may be a film or non-woven web formed of high-density polyethylene, low-density polyethylene, linear low-density polyethylene, ultra-high molecular weight polyethylene, polypropylene, or a mixture thereof, but is not limited thereto.

The polyolefin porous substrate may have a thickness of 8 μm to 30 μm, but this is just an example, and a thickness beyond the range may be adopted in consideration of mechanical properties or high-rate charge/discharge characteristics of the battery.

The non-woven sheet according to the present disclosure may be formed of polyethylene (PE), polypropylene (PP), or a mixture thereof. For example, the non-woven sheet may be manufactured by fiber spinning. For example, the non-woven sheet may be manufactured by making fibers of the above material into the form of fiber spinning at a melting point or higher and spinning them together by using a melt blown method.

The non-woven sheet may have an elongation of 200% to 400%, more preferably 300% to 400%. If the elongation is less than 200%, the probability of contact between the electrodes increases when a nail is penetrated, and if it is greater than 400%, the area around the nail penetration is also elongated so that the separator becomes thinner to reduce the barrier property.

A plurality of pores having an average diameter of 0.1 μm to 10 μm are formed in the non-woven sheet. If the pore size is smaller than 0.1 μm, smooth movement of lithium ions and/or electrolyte may not be achieved, and if the pore size is larger than 10 μm, the effect of the present disclosure to prevent contact between the positive electrode and the negative electrode by elongating the non-woven sheet during nail penetration may not be achieved.

In addition, the non-woven sheet may have a porosity of 40% to 70%. If the porosity is less than 40%, smooth movement of lithium ions and/or electrolyte may not be achieved, and if the porosity is greater than 70%, the effect of the present disclosure to prevent contact between the positive electrode and the negative electrode by elongating the non-woven sheet during nail penetration may not be achieved. The non-woven sheet prepared in this way may have an air permeability of 1 to 20 seconds/100 mL.

In addition, the non-woven sheet may have a thickness of 10 μm to 20 μm, but this is only an example, and the present disclosure is not limited thereto. Depending on the permeability of the non-woven sheet, it is possible to adopt a non-woven sheet with a thickness beyond the range.

The non-woven sheet may be coupled to the separator provided below the non-woven sheet by lamination. The lamination may be performed in the temperature range of 100° C. to 150° C. When the lamination is performed at a temperature lower than 100° C., the lamination effect does not occur, and when the lamination is performed at a temperature higher than 150° C., a part of the non-woven fabric is melted.

Compared to a separator made of a conventional non-woven sheet, the separator according to an embodiment of the present disclosure, which is laminated under the above conditions, has improved resistance to nail penetration compared to the separator in which a layer containing inorganic particles is formed on at least one surface of a film or non-woven sheet.

In the porous coating layer, the inorganic particles may be bound to each other by the binder polymer in a state of being charged and in contact with each other, and as a result, an interstitial volume is formed between the inorganic particles, so that the interstitial volume between the inorganic particles may become an empty space to form a pore.

As the inorganic particles used to form the porous coating layer, inorganic particles, namely inorganic particles that do not undergo oxidation and/or reduction reactions in the operating voltage range of the electrochemical device (e.g., 0V to 5V based on $Li/Li^+$), may be further added. In particular, in the case of using inorganic particles having ion transfer capability, performance improvement may be achieved by increasing ion conductivity in the electrochemical device. In addition, when inorganic particles with high dielectric permittivity are used as the inorganic particles, the ion conductivity of the electrolyte may be improved by contributing to an increase in the degree of dissociation of electrolyte salts, such as lithium salts, in the liquid electrolyte.

For the reasons described above, the inorganic particles preferably include high dielectric constant inorganic particles having a dielectric constant of 5 or more, preferably 10 or more, inorganic particles having lithium ion transfer capability, or a mixture thereof.

Non-limiting examples of the inorganic particles having a dielectric constant of 5 or more include $BaTiO_3$, $Pb(Zr,Ti)O_3$ (PZT), $Pb_{1-x}La_xZr_{1-y}Ti_yO_3$ (PLZT), $PB(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC or mixtures thereof.

In particular, the aforementioned inorganic particles such as $BaTiO_3$, $Pb(Zr,Ti)O_3$ (PZT), $Pb_{1-x}La_xZr_{1-y}Ti_yO_3$ (PLZT), $PB(Mg_{1/3}Nb_{2/3})O_3$—$PbTiO_3$ (PMN-PT) and hafnia ($HfO_2$) not only exhibit high dielectric permittivity characteristics with a dielectric constant of 100 or more, but also have piezoelectricity to cause a potential difference between the surfaces of the particles by generating a charge when the inorganic particles are stretched or compressed by applying a certain pressure. Thus, it is possible to by prevent the occurrence of an internal short circuit between the electrodes caused by an external impact, thereby improving the safety of the electrochemical device. In addition, when the above-mentioned high dielectric permittivity inorganic particles and the inorganic particles having lithium ion transfer capability are mixed, their synergistic effect may be reinforced.

The inorganic particles having lithium ion transfer capability refer to inorganic particles that contain a lithium element and have a function of moving lithium ions without storing lithium. Since the inorganic particles with lithium ion transfer capability may transfer and move lithium ions due to a kind of defect that exists inside the particle structure, the lithium ion conductivity in the battery is improved, thereby improving battery performance. Non-limiting examples of the inorganic particles having the lithium ion transfer capability include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ series glass ($0<x<4$, $0<y<13$) such as $14Li_2O-9Al_2O_3-38TiO_2-39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$ series glass ($Li_xSi_yS_z$, $0<x<3$, $0<y<2$, $0<z<4$) such as $Li_3PO_4$—$Li_2S$—$SiS_2$, $P_2S_5$ series glass ($Li_xP_yS_z$, $0<x<3$, $0<y<3$, $0<z<7$) such as $LiI$—$Li_2S$—$P_2S_5$, or mixtures thereof.

The size of the inorganic particles in the porous coating layer is not limited, but is preferably 0.001 µm to 10 µm in order to form a coating layer with a uniform thickness and an appropriate porosity. If the size is less than 0.001 µm, the dispersibility of the inorganic particles may deteriorate, and if the size exceeds 10 µm, the thickness of the porous coating layer may increase to deteriorate mechanical properties, and due to the excessively large pore size, the probability of internal short circuit increases during battery charging and discharging.

The binder polymer that forms the porous coating layer may use any one selected binder polymer selected from the group consisting of polyvinylidene fluoride-co-hexafluoropropylene (PVdF), polyvinylidene fluoride-co-trichloroethylene, polymethyl methacrylate, polybutyl acrylate, polyacrylonitrile, polyvinyl pyrrolidone, polyvinyl acetate, ethylene-co-vinyl acetate, polyethylene oxide, polyarylate, cellulose acetate, cellulose acetate butyrate, cellulose acetate propionate, cyanoethyl pullulan, cyanoethyl polyvinylalcohol, cyanoethyl cellulose, cyanoethyl sucrose, pullulan and carboxyl methyl cellulose, or a mixture thereof, but is not limited thereto.

The composition ratio of the inorganic particles and the binder polymer used in the porous coating layer is preferably in the range of, for example, 50:50 to 99:1, and more preferably 70:30 to 95:5. If the content ratio of the inorganic particles to the binder polymer is less than 50:50, the content of the binder polymer increases and the thermal safety improvement of the separator may deteriorate. In addition, the pore size and porosity may be reduced due to the reduction of the empty space formed between the inorganic particles, resulting in deterioration in final battery performance. If the content of the inorganic particles exceeds 99 parts by weight, the peeling resistance of the porous coating layer may be weakened because the content of the binder polymer is too small. The thickness of the porous coating layer is not particularly limited, but is preferably in the range of 0.01 µm to 20 µm. In addition, the pore size and porosity are also not particularly limited, but the pore size is preferably in the range of 0.001 µm to 10 µm, and the porosity is preferably in the range of 10% to 90%. The pore size and porosity mainly depend on the size of the inorganic particles. For example, when inorganic particles having a particle size of 1 µm or less are used, pores are also formed to have a size of approximately 1 µm or less. The pore structure as above is filled with the electrolyte injected later, and the filled electrolyte plays a role of transferring ions. When the pore size and porosity are less than 0.001 µm and 10%, respectively, the pore may act as a resistance layer, and when the pore size and porosity exceed 10 µm and 90%, respectively, mechanical properties may be deteriorated.

The porous coating layer may be formed by dissolving or dispersing a binder polymer in a dispersion medium, adding inorganic particles to obtain a slurry for forming a porous coating layer, coating the slurry on at least one surface of the substrate, and drying the same. The dispersion medium preferably has a solubility index similar to that of the binder polymer to be used and a low boiling point. This is to facilitate uniform mixing and subsequent removal of the dispersion medium. Non-limiting examples of usable dispersion medium include acetone, tetrahydrofuran, methylene chloride, chloroform, dimethyl formamide, N-methyl-2-pyrrolidone (NMP), cyclohexane, water or mixtures thereof.

It is preferable to crush the inorganic particles after the inorganic particles are added to a dispersion where the binder polymer is dispersed in the dispersion medium. At this time, 1 to 20 hours is appropriate for the crushing time, and the particle size of the crushed inorganic particles is preferably 0.001 µm to 10 µm as described above. Conventional methods may be used as the crushing method, and ball milling is particularly preferred.

After that, the binder polymer dispersion in which the inorganic particles are dispersed is coated on at least one surface of the porous polymer substrate under a humidity condition of 10% to 80% and dried. As a method of coating the dispersion on the porous polymer substrate, conventional coating methods known in the art may be used, for example, dip coating, die coating, roll coating, comma coating, or mixed methods thereof.

Other additives such as a conductive agent may be further included in addition to the inorganic particles and the binder polymer described above as components of the porous coating layer.

The final manufactured separator according to the present disclosure may have a thickness of 1 µm to 100 µm, or 5 µm to 50 µm. If the thickness is less than 1 µm, the function of the separator may not be sufficiently exhibited and mechanical properties may deteriorate. If the thickness exceeds 100 µm, the characteristics of the battery may deteriorate during high rate charging and discharging. In addition, the separator may have a porosity of 40% to 60% and an air permeability of 150 to 300 seconds/100 mL.

According to one embodiment of the present disclosure, the porous polymer substrate may use polyethylene or polypropylene series. In addition, Al oxide and Si oxide-based materials may be used as the inorganic particles in the porous coating layer.

In the case of using the separator according to one embodiment of the present disclosure, since a porous coating layer is provided to both surfaces of the porous polymer substrate, it is possible to form a uniform solid electrolyte interface layer by improving the impregnation performance for the electrolyte, and may secure superior air permeability compared to the single-sided inorganic coating separator. For example, the air permeability may be less than 120 s/100 cc. In addition, even if the inorganic porous coating layer is provided on both surfaces, it is possible to realize a thickness comparable to that of a conventional single-sided inorganic coating separator. For example, the thickness may be less than 15.0 µm.

In addition, when the separator according to one embodiment of the present disclosure is used, the stability of the separator is improved to secure heat resistance and compression resistance. Specifically, it is possible to secure heat resistance with heat shrinkage characteristics of less than 5% at 180° C., and it is possible to secure puncture strength property of 550 gf or more. Also, when core deformation occurs during the cycle of a battery employing such a separator, it is possible to prevent damage or penetration of the separator at the step portion of the core.

The separator may employ a porous polymer film, for example, a porous polymer film made of a polyolefin-based polymer such as ethylene homopolymer, propylene homopolymer, ethylene/butene copolymer, ethylene/hexene copolymer, ethylene/methacrylate copolymer, or the like, or laminates thereof. As another example, the separator may employ a common porous nonwoven fabric, for example, a nonwoven fabric made of high melting point glass fiber, polyethylene terephthalate fiber, or the like.

Hereinafter, the structure of the electrode assembly according to an embodiment of the present disclosure will be described in detail.

FIG. 11 is a cross-sectional view of a jelly-roll type electrode assembly 80 in which the electrode 40 according to the first embodiment is applied to a first electrode (positive electrode) and a second electrode (negative electrode), taken along the Y-axis direction (winding axis direction).

The electrode assembly 80 may be manufactured by the winding method described with reference to FIG. 2. For convenience of description, the protruding structure of the first uncoated portion 43a and the second uncoated portion 43b extending to the outside of the separator is shown in detail, and the winding structure of the first electrode, the second electrode, and the separator is not depicted. The first uncoated portion 43a upwardly protruding extends from the first electrode, and the second uncoated portion 43b downwardly protruding extends from the second electrode.

A pattern in which the heights of the first and second uncoated portions 43a, 43b change is schematically shown. That is, the height of the uncoated portion may change irregularly depending on the position where the section is cut. For example, if the side of the trapezoid segment 61, 61' or the cut groove 63 is cut, the height of the uncoated portion in the cross section is lower than the height (H) of the segment 61, 61'. Accordingly, it should be understood that the height of the uncoated portion shown in the cross-sectional drawings of the electrode assembly corresponds to the average of the heights (H in FIGS. 7b and 8b) of the uncoated portions included in each winding turn.

Referring to FIG. 11, the first uncoated portion 43a includes a first portion B1 adjacent to the core of the electrode assembly 80, a second portion B3 adjacent to the outer circumferential surface of the electrode assembly 80, and a third portion B2 interposed between the first portion B1 and the second portion B3.

The height (length in the Y-axis direction) of the second portion B3 is relatively smaller than the height of the third portion B2. Therefore, while the beading portion of the battery housing is being pressed near the second portion B3, it is possible to prevent a phenomenon in which an internal short circuit occurs as the beading portion and the second portion B3 contact each other.

The second uncoated portion 43b has the same structure as the first uncoated portion 43a. In one modification, the second uncoated portion 43b may have a conventional electrode structure or the electrode structure in other embodiments (modifications).

The ends 81 of the first uncoated portion 43a and the second uncoated portion 43b may be bent in the radial direction of the electrode assembly 80, for example from the outer circumference toward the core. At this time, the second portion B3 may not be substantially bent.

Figure 12:
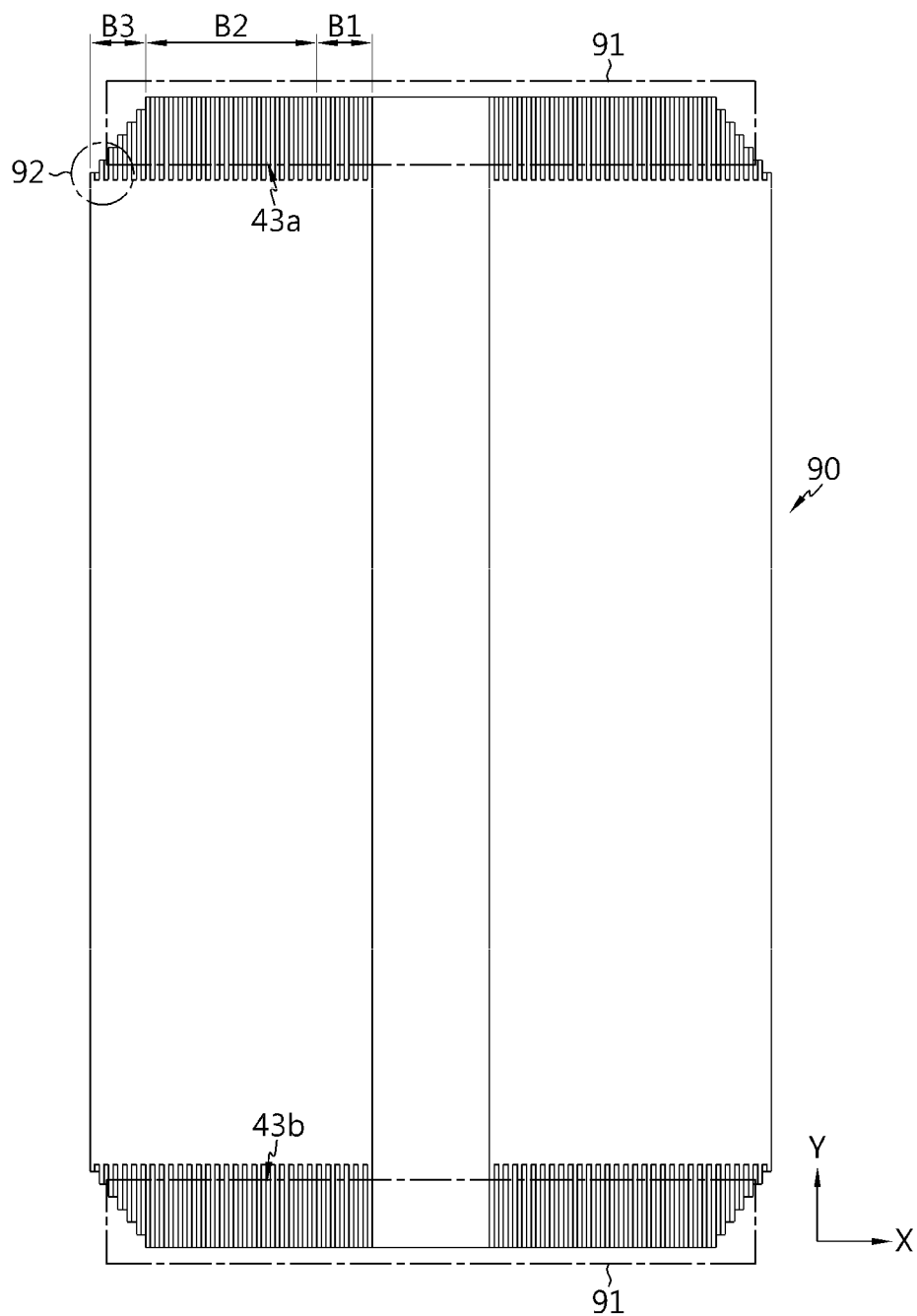
FIG. 12 is a cross-sectional view of a jelly-roll type electrode assembly in which an electrode of the second embodiment is applied to the first electrode (positive electrode) and the second electrode (negative electrode), taken along the Y-axis direction (winding axis direction).

FIG. 12 is a cross-sectional view of a jelly-roll type electrode assembly 90 in which the electrode 45 of the second embodiment is applied to the first electrode (positive electrode) and the second electrode (negative electrode), taken along the Y-axis direction (winding axis direction).

Referring to FIG. 12, the first uncoated portion 43a of the first electrode includes a first portion B1 adjacent to the core of the electrode assembly 90, a second portion B3 adjacent to the outer circumferential surface of the electrode assembly 90, and a third portion B2 interposed between the first portion B1 and the second portion B3.

The height of the second portion B3 is relatively smaller than that of the third portion B2 and gradually or stepwise decreases from the core toward the outer circumference. Therefore, while the beading portion of the battery housing is being pressed near the second portion B3, it is possible to prevent a phenomenon in which an internal short circuit occurs as the beading portion and the second portion B3 contact each other.

The second uncoated portion 43b has the same structure as the first uncoated portion 43a. In one modification, the second uncoated portion 43b may have a conventional electrode structure or an electrode structure of other embodiments (modifications).

The ends 91 of the first uncoated portion 43a and the second uncoated portion 43b may be bent in the radial direction of the electrode assembly 90, for example from the outer circumference toward the core. At this time, the outermost side 92 of the second portion B3 may not be substantially bent.

Figure 13:
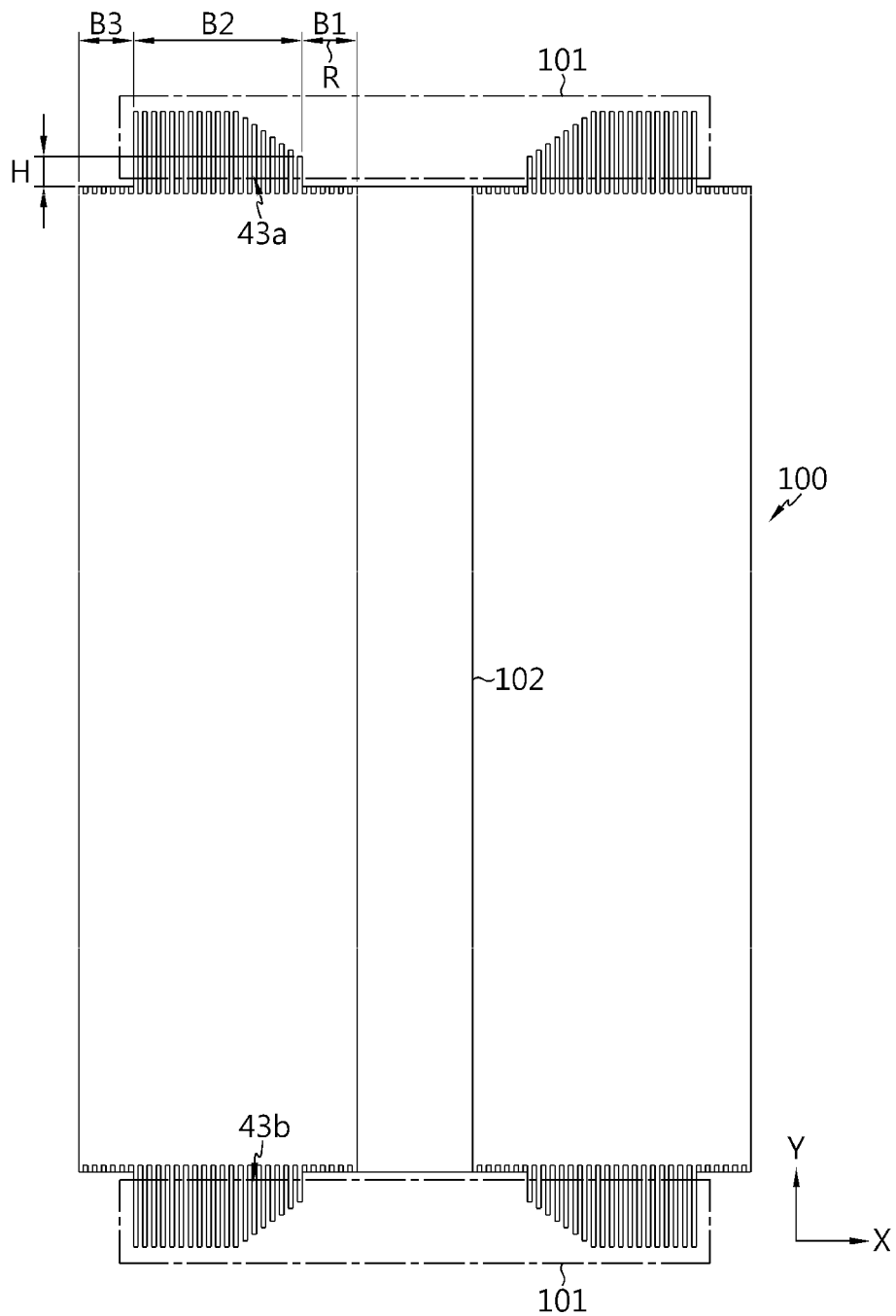
FIG. 13 is a cross-sectional view of a jelly-roll type electrode assembly in which any one of the electrodes of the third to fifth embodiments (modifications thereof) is applied to the first electrode (positive electrode) and the second electrode (negative electrode), taken along the Y-axis direction (winding axis direction).

FIG. 13 is a cross-sectional view of a jelly-roll type electrode assembly 100 in which any one of the electrodes 50, 60, 70 of the third to fifth embodiments (modifications thereof) is applied to the first electrode (positive electrode) and the second electrode (negative electrode), taken along the Y-axis direction (winding axis direction).

Referring to FIG. 13, the uncoated portion 43a of the first electrode includes a first portion B1 adjacent to the core of the electrode assembly 100, a second portion B3 adjacent to the surface of the outer circumference of the electrode assembly 100, and a third portion B2 interposed between the first portion B1 and the second portion B3.

The height of the first portion B1 is relatively smaller than that of the third portion B2. Also, in the third portion B2, the bending length of the uncoated portion 43a located at the innermost side is equal to or smaller than the radial length (R) of the first portion B1. The bending length (H) corresponds to a distance from the point where the uncoated portion 43a is bent to a top end of the uncoated portion 43a. In a modification, the bending length H may be less than the sum of the radial length (R) of the first portion B1 and 10% of the radius of the core 102.

Therefore, even if the third portion B2 is bent, more than 90% of the diameter of the core 102 of the electrode assembly 100 is open to the outside. The core 102 is a cavity at the center of the electrode assembly 100. If the core 102 is not blocked, there is no difficulty in the electrolyte injection process and the electrolyte injection efficiency is improved. In addition, by inserting a welding jig through the core 102, a welding process between the current collector at the negative electrode (or, the positive electrode) and the battery housing (or, the terminal) may be easily performed.

The height of the second portion B3 is relatively smaller than the height of the third portion B2. Therefore, while the beading portion of the battery housing is being pressed near the second portion B3, it is possible to prevent a phenomenon in which an internal short circuit occurs as the beading portion and the second portion B3 contact each other.

In one modification, the height of the second portion B3 may decrease gradually or stepwise, unlike that shown in FIG. 13. Also, in FIG. 13, the height of the third portion B2 is the same in a part near the outer circumference, but the height of the third portion B2 may increase gradually or stepwise from the boundary between the first portion B1 and the third portion B2 toward the boundary between the third portion B2 and the second portion B3. When the third portion B2 is divided into a plurality of segments, a region in which the height of the uncoated portion 43a changes corresponds to the segment height variable region (② in FIG. 10a).

The second uncoated portion 43b has the same structure as the first uncoated portion 43a. In one modification, the second uncoated portion 43b may have a conventional electrode structure or an electrode structure of other embodiments (modifications).

The ends 101 of the first uncoated portion 43a and the second uncoated portion 43b may be bent in the radial direction of the electrode assembly 100, for example from the outer circumference toward the core. At this time, the first portion B1 and the second portion B3 are not substantially bent.

When the third portion B2 includes a plurality of segments, the bending stress may be alleviated to prevent the uncoated portions 43a near the bending point from being torn or abnormally deformed. In addition, when the width and/or height and/or separation pitch of the segments is adjusted according to the numerical range of the above embodiment, the segments are bent toward the core and overlapped in several layers enough to secure sufficient welding strength, and an empty hole (gap) is not formed in the bending surface region.

Figure 14:
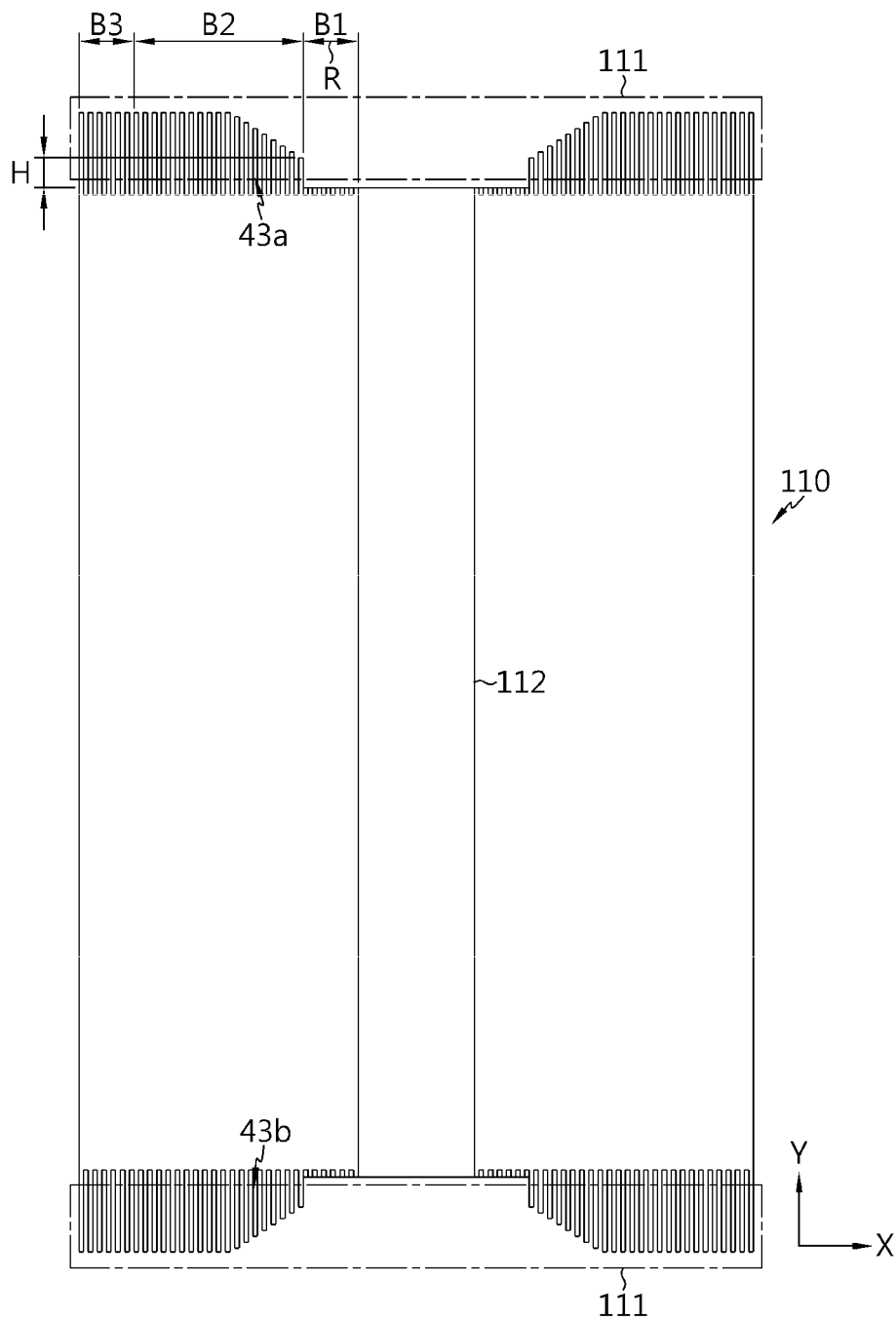
FIG. 14 is a cross-sectional view of an electrode assembly according to still another embodiment of the present disclosure, taken along the Y-axis direction (winding axis direction).

FIG. 14 is a cross-sectional view of an electrode assembly 110 according to still another embodiment of the present disclosure, taken along the Y-axis direction (winding axis direction).

Referring to FIG. 14, the electrode assembly 110 has substantially the same configuration as the electrode assembly 100 of FIG. 13, except that the height of the second portion B3 is substantially equal to the height of the outermost side of the third portion B2.

The second portion B3 may include a plurality of segments. The configuration of the plurality of segments is substantially the same as that of the fourth and fifth embodiments (modifications) of the electrode.

In the electrode assembly 110, the height of the first portion B1 is relatively smaller than the height of the third portion B2. Also, in the third portion B2, the bending length (H) of the uncoated portion located at the innermost side is equal to or smaller than the radial length (R) of the first portion B1. Preferably, the first portion B1 may be a segment skip region (① in FIG. 10a) with no segment. In a modification, the bending length H may be less than the sum of the radial length (R) of the first portion B1 and 10% of the radius of the core 112.

Therefore, even if the third portion B2 is bent, 90% or more of the diameter of the core 112 of the electrode assembly 110 is open to the outside. If the core 112 is not blocked, there is no difficulty in the electrolyte injection process and the electrolyte injection efficiency is improved. In addition, the welding process between the current collector at the negative electrode (or, the positive electrode) and the battery housing (or, the terminal) may be easily performed by inserting a welding jig through the core 112.

In one modification, the structure in which the height of the third portion B2 gradually or stepwise increases from the core toward the outer circumference may be extended to the second portion B3. In this case, the height of the uncoated portion 43a may gradually or stepwise increase from the boundary between the first portion B1 and the third portion B2 toward the surface of the outermost side of the electrode assembly 110.

The second uncoated portion 43b has the same structure as the first uncoated portion 43a. In one modification, the second uncoated portion 43b may have a conventional electrode structure or then electrode structure of other embodiments (modifications).

The ends 111 of the first uncoated portion 43a and the second uncoated portion 43b may be bent in the radial direction of the electrode assembly 110, for example from the outer circumference toward the core. At this time, the first portion B1 is not substantially bent.

When the third portion B2 and the second portion B3 include a plurality of segments, the bending stress is relieved, so it is possible to prevent tearing or abnormal deformation of the uncoated portions 43a, 43b near the bending point. In addition, when the width and/or height and/or separation pitch of the segment is adjusted according to the numerical ranges of the above embodiment, the segments are bent toward the core and overlapped in several layers enough to secure sufficient welding strength, and an empty hole (gap) is not formed in the bending surface region.

Figure 15:
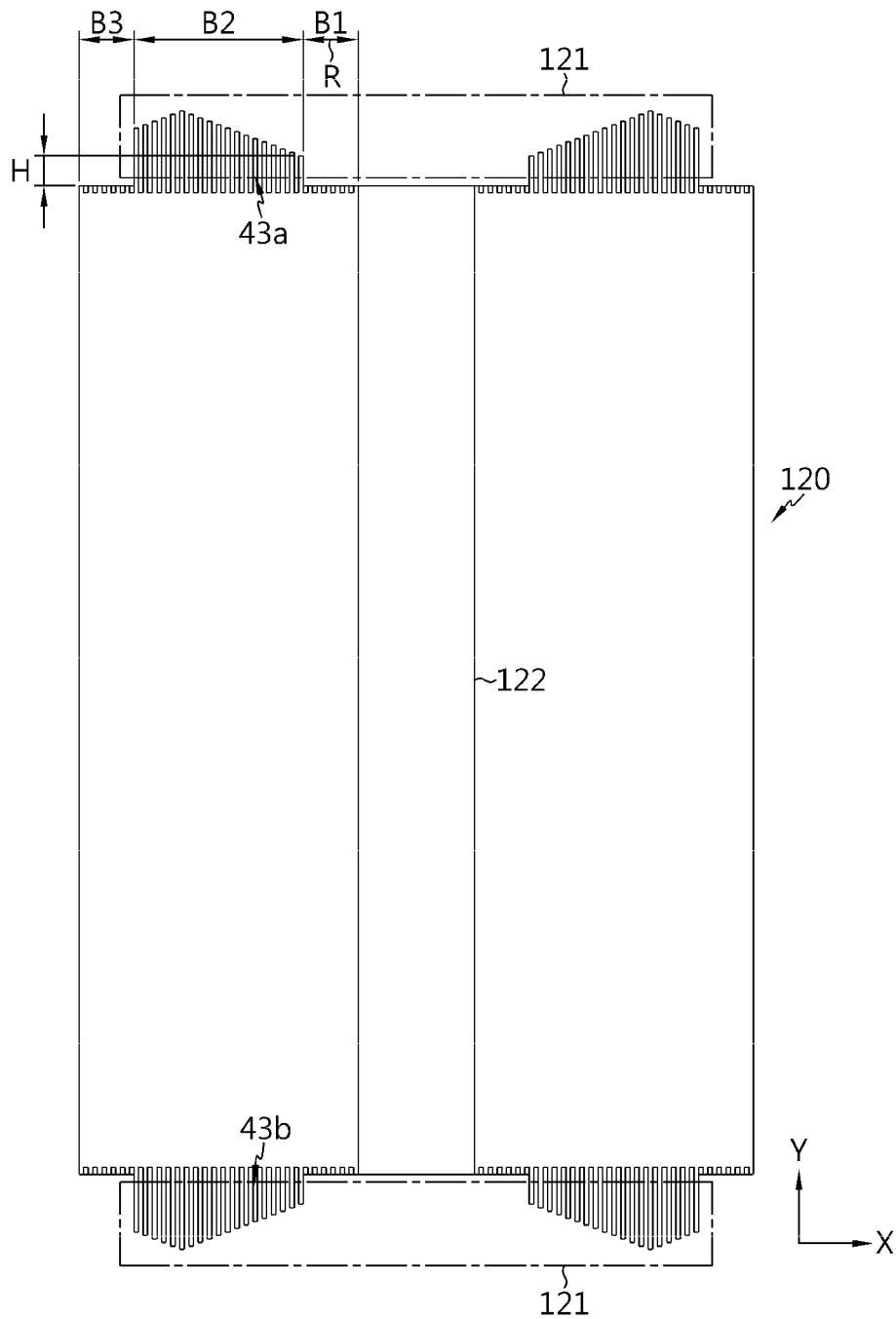
FIG. 15 is a cross-sectional view of an electrode assembly according to still another embodiment of the present disclosure, taken along the Y-axis direction (winding axis direction).

FIG. 15 is a cross-sectional view showing the electrode assembly 120 according to still another embodiment of the present disclosure, taken along the Y-axis direction (winding axis direction).

Referring to FIG. 15, the electrode assembly 120 is substantially identical to the electrode assembly 100 of FIG.

13, except that the heights of the third portion B2 have a pattern of increasing gradually or stepwise and then decreasing. The radial region in which the heights of the third portion B2 change may be regarded as the height variable region (②  in FIG. 10a) of the segments. Even in this case, the height variable region of the segments may be designed so that the stack number uniform region in which the stack number of the segments is 10 or more appears in the desirable numerical range described above in the bending surface region F formed by bending the third portion B2.

The change in height of the third portion B2 may be implemented by adjusting the height of the step pattern (see FIG. 6) or the segment (see FIG. 7a or 8a) included in the third portion B2.

In the electrode assembly 120, the height of the first portion B1 is relatively smaller than the height of the third portion B2. In addition, in the third portion B2, the bending length H of the uncoated portion located at the innermost side is equal to or smaller than the radial length R of the first portion B1. The region corresponding to the first portion B1 corresponds to the segment skip region (① in FIG. 10a) with no segment. In one modification, the bending length H may be less than the sum of the radial length R of the first portion B1 and 10% of the radius of the core 122.

Therefore, even if the third portion B2 is bent toward the core, 90% or more of the diameter of the core 122 of the electrode assembly 120 is open to the outside. If the core 122 is not blocked, there is no difficulty in the electrolyte injection process, and the electrolyte injection efficiency is improved. In addition, by inserting a welding jig through the core 122, the welding process may be easily performed between the current collector of the negative electrode (or, positive electrode) and the battery housing (or, rivet terminal).

Also, the height of the second portion B3 is relatively smaller than the heights of the third portion B2, and preferably, the segment may not be formed in the second portion B3. Therefore, it is possible to prevent the phenomenon that the beading portion and the second portion B3 come into contact with each other to cause an internal short circuit while the beading portion of the battery housing is being pressed near the second portion B3. In one modification, the height of the second portion B3 may decrease gradually or stepwise toward the outer circumference.

The second uncoated portion 43b has the same structure as the first uncoated portion 43a. In one modification, the second uncoated portion 43b may have a conventional electrode structure or an electrode structure of other embodiments (modifications).

The ends 121 of the first uncoated portion 43a and the second uncoated portion 43b may be bent from the outer circumference of the electrode assembly 120 toward the core. At this time, the first portion B1 and the second portion B3 are substantially not bent.

When the third portion B2 includes a plurality of segments, the bending stress is alleviated to prevent the uncoated portions 43a, 43b from being torn or abnormally deformed. In addition, when the width and/or height and/or separation pitch of the segments is adjusted according to the numerical range of the above embodiment, the segments are bent toward the core and overlapped in several layers enough to secure sufficient welding strength, and an empty hole (gap) is not formed in the bending surface region.

Figure 16:
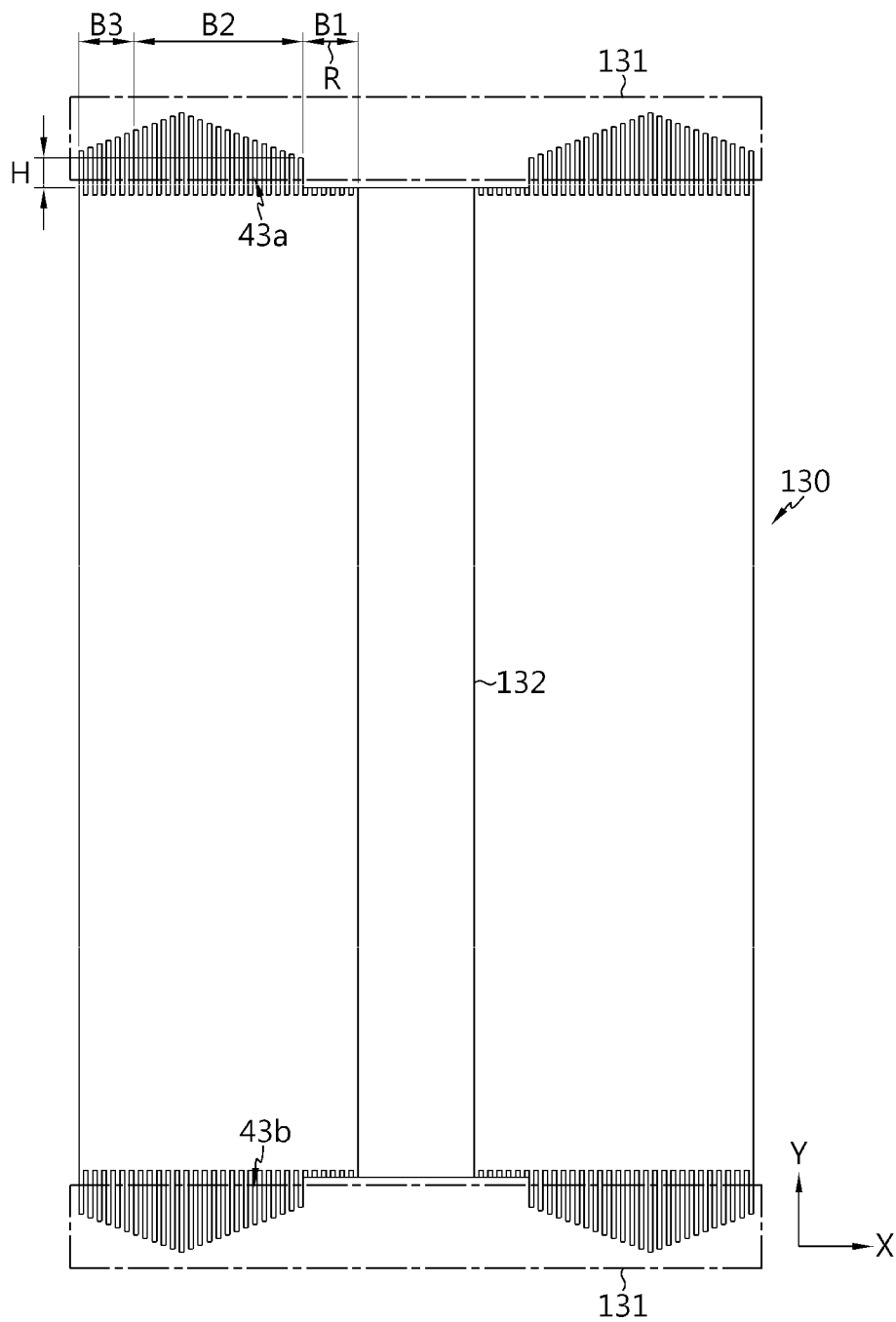
FIG. 16 is a cross-sectional view of an electrode assembly according to still another embodiment of the present disclosure, taken along the Y-axis direction (winding axis direction).

FIG. 16 is a cross-sectional view showing the electrode assembly 130 according to still another embodiment of the present disclosure, taken along the Y-axis direction (winding axis direction).

Referring to FIG. 16, the electrode assembly 130 is substantially identical to the electrode assembly 120 of FIG. 15, except that the height of the second portion B3 has a pattern of decreasing gradually or stepwise from the boundary point of the second portion B3 and the third portion B2 toward the outermost surface of the electrode assembly 130.

The change in height of the second portion B3 may be implemented by extending the step pattern (see FIG. 6) included in the third portion B2 to the second portion B3 and at the same time gradually or stepwise decreasing the height of the pattern toward the outer circumference. Also, in another modification, the change in height of the second portion B3 may be implemented by extending the segment structure of the third portion B2 to the second portion B3 and at the same time gradually or stepwise decreasing the height of the segment toward the outer circumference.

In the electrode assembly 120, the height of the first portion B1 is relatively smaller than the height of the third portion B2. In addition, in the third portion B2, the bending length H of the uncoated portion located at the innermost side is equal to or smaller than the radial length R of the first portion B1. The first portion B1 corresponds to the segment skip region (① in FIG. 10a) with no segment. In one modification, the bending length H may be less than the sum of the radial length R of the first portion B1 and 10% of the radius of the core 132.

Therefore, even if the third portion B2 is bent toward the core, 90% or more of the diameter of the core 132 of the electrode assembly 130 is open to the outside. If the core 132 is not blocked, there is no difficulty in the electrolyte injection process, and the electrolyte injection efficiency is improved. In addition, by inserting a welding jig through the core 132, the welding process may be easily performed between the current collector of the negative electrode (or, positive electrode) and the battery housing (or, terminal).

The second uncoated portion 43b has the same structure as the first uncoated portion 43a. In one modification, the second uncoated portion 43b may have a conventional electrode structure or the electrode structure of other embodiments (modifications).

The ends 131 of the first uncoated portion 43a and the second uncoated portion 43b may be bent from the outer circumference of the electrode assembly 130 toward the core. At this time, the first portion B1 is substantially not bent.

When the third portion B2 and the second portion B3 include a plurality of segments, the bending stress is alleviated to prevent the uncoated portions 43a, 43b near the bending point from being torn or abnormally deformed. In addition, when the width and/or height and/or separation pitch of the segments is adjusted according to the numerical range of the above embodiment, the segments are bent toward the core and overlapped in several layers enough to secure sufficient welding strength, and an empty hole (gap) is not formed in the bending surface region.

Meanwhile, in the above embodiments (modifications), the ends of the first uncoated portion 43a and the second uncoated portion 43b may be bent from the core toward the outer circumference. In this case, it is preferable that the second portion B3 is designed as the segment skip region (① in FIG. 10a) with no segment and not bent toward the outer circumference. In addition, the radial width of the second portion B3 may be equal to or greater than the bending length of the outermost uncoated portion (or, segment) of the third portion B2. In this case, when the outermost uncoated portion (or, segment) of the third portion B2 is bent toward the outer circumference, the end of the bent portion does not protrude toward the inner surface of the battery housing beyond the outer circumference of the electrode assembly. In addition, the structural change pattern of the segments may be opposite to the above embodiments (modifications). For example, the heights of the segments may increase stepwise or gradually from the outer circumference toward the core. That is, by sequentially arranging the segment skip region (①in FIG. 10a), the height variable region (② in FIG. 10a), and the height uniform region (③) in FIG. 10a) from the outer circumference of the electrode assembly toward the core, in the bending surface region, the stack number uniform region in which the stack number of segments is 10 or more may appear in a desirable numerical range.

Various electrode assembly structures according to an embodiment of the present disclosure may be applied to a cylindrical battery.

Preferably, the cylindrical battery may be, for example, a cylindrical battery whose form factor ratio (defined as a value obtained by dividing the diameter of the cylindrical battery by height, namely a ratio of diameter ($\Phi$) to height (H)) is greater than about 0.4. Here, the form factor means a value indicating the diameter and height of a cylindrical battery.

Preferably, the cylindrical battery may have a diameter of 40 mm to 50 mm and a height of 60 mm to 130 mm. The form factor of the cylindrical battery according to an embodiment of the present disclosure may be, for example, 46110, 4875, 48110, 4880, or 4680. In the numerical value representing the form factor, first two numbers indicate the diameter of the battery, and the remaining numbers indicate the height of the battery.

When an electrode assembly having a tab-less structure is applied to a cylindrical battery having a form factor ratio of more than 0.4, the stress applied in the radial direction when the uncoated portion is bent is large, so that the uncoated portion may be easily torn. In addition, when welding the current collector to the bending surface region of the uncoated portion, it is necessary to sufficiently increase the number of stacked layers of the uncoated portion in the bending surface region in order to sufficiently secure the welding strength and lower the resistance. This requirement may be achieved by the electrode and the electrode assembly according to the embodiments (modifications) of the present disclosure.

A battery according to an embodiment of the present disclosure may be an approximately cylindrical battery, whose diameter is approximately 46 mm, height is approximately 110 mm, and form factor ratio is 0.418.

A battery according to another embodiment may be an approximately cylindrical battery, whose diameter is about 48 mm, height is about 75 mm, and form factor ratio is 0.640.

A battery according to still another embodiment may be an approximately cylindrical battery, whose diameter is approximately 48 mm, height is approximately 110 mm, and form factor ratio is 0.436.

A battery according to still another embodiment may be an approximately cylindrical battery, whose diameter is approximately 48 mm, height is approximately 80 mm, and form factor ratio is 0.600.

A battery according to still another embodiment may be an approximately cylindrical battery, whose diameter is approximately 46 mm, height is approximately 80 mm, and form factor ratio is 0.575.

Conventionally, batteries having a form factor ratio of about 0.4 or less have been used. That is, conventionally, for example, 1865 battery, 2170 battery, etc. were used. The 1865 battery has a diameter of approximately 18 mm, height of approximately 65 mm, and a form factor ratio of 0.277. The 2170 battery has a diameter of approximately 21 mm, a height of approximately 70 mm, and a form factor ratio of 0.300.

Hereinafter, the cylindrical battery according to an embodiment of the present disclosure will be described in detail.

Figure 17:
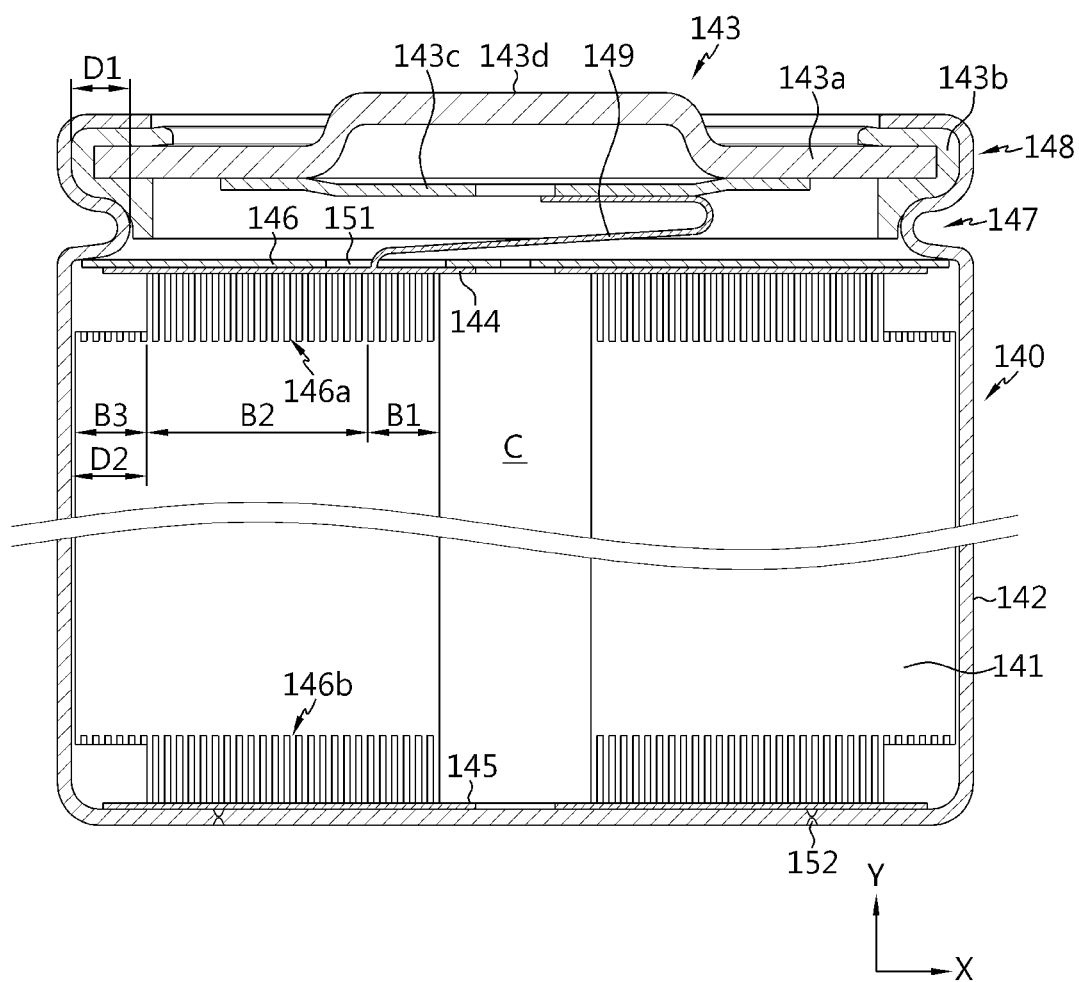
FIG. 17 is a sectional view showing a cylindrical battery according to an embodiment of the present disclosure, taken along the Y-axis direction.

FIG. 17 is a cross-sectional view showing a cylindrical battery 140 according to an embodiment of the present disclosure, taken along the Y-axis direction.

Referring to FIG. 17, the cylindrical battery 140 according to an embodiment of the present disclosure includes an electrode assembly 141 having a first electrode, a separator and a second electrode, a battery housing 142 for accommodating the electrode assembly 141, and a sealing body 143 for sealing an open end of the battery housing 142.

The battery housing 142 is a cylindrical container with an opening at the top. The battery housing 142 is made of a conductive metal material such as aluminum, steel or stainless steel. A nickel coating layer may be formed on the surface of the battery housing 142. The battery housing 142 accommodates the electrode assembly 141 in the inner space through the top opening and also accommodates the electrolyte.

The electrolyte may be a salt having a structure like $A^+B^-$. Here, $A^+$ includes an alkali metal cation such as $Li^+$, $Na^+$, or $K^+$, or a combination thereof and $B^-$ includes at least one anion selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The electrolyte may also be dissolved in an organic solvent. The organic solvent may employ propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone, or a mixture thereof.

The electrode assembly 141 may have a jelly-roll shape, but the present disclosure is not limited thereto. The electrode assembly 141 may be manufactured by winding a laminate formed by sequentially laminating a lower separator, a first electrode, an upper separator, and a second electrode at least once, based on the winding axis C, as shown in FIG. 2.

The first electrode and the second electrode have different polarities. That is, if one has positive polarity, the other has negative polarity. At least one of the first electrode and the second electrode may have an electrode structure according to the above embodiments (modifications). In addition, the other of the first electrode and the second electrode may have a conventional electrode structure or an electrode structure according to embodiments (modifications). The electrode pair included in the electrode assembly 141 is not limited to one electrode pair, two or more electrode pairs may be included.

The first uncoated portion 146a of the first electrode and the second uncoated portion 146b of the second electrode protrude at the upper portion and the lower portion of the electrode assembly 141, respectively. The first electrode has the electrode structure of the first embodiment (modification). Therefore, in the first uncoated portion 146a, the height of the second portion B3 is smaller than the height of the uncoated portion of the other region. The second portion B3 is spaced apart from the inner circumference of the battery housing 142, particularly the beading portion 147, by a predetermined distance. Therefore, the second portion B3 of the first electrode does not come into contact with the battery housing 142 electrically connected to the second electrode, thereby preventing an internal short circuit of the battery 140.

The second uncoated portion 146b of the second electrode may have the same structure as the first uncoated portion 146a. In another modification, the second uncoated portion 146b may selectively have the uncoated portion structures of the electrodes according to the embodiments (modifications)

The sealing body 143 may include a cap 143a having a plate shape, a first gasket 143b for providing airtightness between the cap 143a and the battery housing 142 and having insulation, and a connection plate 143c electrically and mechanically coupled to the cap 143a.

The cap 143a is a component made of a conductive metal material, and covers the top opening of the battery housing 142. The cap 143a is electrically connected to the uncoated portion 146a of the first electrode, and is electrically insulated from the battery housing 142 by means of the first gasket 143b. Accordingly, the cap 143a may function as the first electrode (for example, positive electrode) of the cylindrical battery 140.

The cap 143a is placed on the beading portion 147 formed on the battery housing 142, and is fixed by a crimping portion 148. Between the cap 143a and the crimping portion 148, the first gasket 143b may be interposed to secure the airtightness of the battery housing 142 and the electrical insulation between the battery housing 142 and the cap 143a. The cap 143a may have a protrusion 143d protruding upward from the center thereof.

The battery housing 142 is electrically connected to the second uncoated portion 146b of the second electrode. Therefore, the battery housing 142 has the same polarity as the second electrode. If the second electrode has negative polarity, the battery housing 142 also has negative polarity.

The battery housing 142 includes the beading portion 147 and the crimping portion 148 at the top thereof. The beading portion 147 is formed by press-fitting the periphery of the outer circumferential surface of the battery housing 142. The beading portion 147 prevents the electrode assembly 141 accommodated inside the battery housing 142 from escaping through the top opening of the battery housing 142, and may function as a support portion on which the sealing body 143 is placed.

The inner circumference of the beading portion 147 may be spaced apart from the second portion B3 of the first electrode by a predetermined interval. More specifically, the lower end of the inner circumference of the beading portion 147 is separated from the second portion B3 of the first electrode by a predetermined interval. In addition, since the second portion B3 has a low height, the second portion B3 is not substantially affected even when the battery housing 142 is press-fitted at the outside to form the beading portion 147. Therefore, the second portion B3 is not pressed by other components such as the beading portion 147, and thus partial shape deformation of the electrode assembly 141 is prevented, thereby preventing a short circuit inside the cylindrical battery 140.

Preferably, when the press-fit depth of the beading portion 147 is defined as D1 and the radial length from the inner circumference of the battery housing 142 to the boundary point between the second portion B3 and the third portion B2 is defined as D2, the relational expression $D1 \leq D2$ may be satisfied. In this case, when press-fitting the battery housing 142 to form the beading portion 147, it is possible to substantially prevent the second portion B3 from being damaged.

The crimping portion 148 is formed on the beading portion 147. The crimping portion 148 has an extended and bent shape to cover the outer circumference of the cap 143a disposed on the beading portion 147 and a part of the upper surface of the cap 143a.

The cylindrical battery 140 may further include a first current collector 144 and/or a second current collector 145 and/or an insulator 146.

The first current collector 144 is coupled to the upper portion of the electrode assembly 141. The first current collector 144 is made of a conductive metal material such as aluminum, copper, steel, nickel and so on, and is electrically connected to the first uncoated portion 146a of the first electrode. The electric connection may be made by welding. A lead 149 may be connected to the first current collector 144. The lead 149 may extend upward above the electrode assembly 141 and be coupled to the connection plate 143c or directly coupled to the lower surface of the cap 143a. The lead 149 may be connected to other components by welding.

Preferably, the first current collector 144 may be integrally formed with the lead 149. In this case, the lead 149 may have an elongated plate shape extending outward from near the center of the first current collector 144.

The first current collector 144 may have a plurality of irregularities (not shown) formed radially on the lower surface thereof. When the radial irregularities are provided, the irregularities may be press-fitted into the first uncoated portion 146a of the first electrode by pressing the first current collector 144.

The first current collector 144 is coupled to an end of the first uncoated portion 146a. The first uncoated portion 146a and the first current collector 144 may be coupled by, for example, laser welding. Laser welding may be performed by partially melting a base material of the current collector 144. In one modification, the first current collector 144 and the first uncoated portion 146a may be welded with a solder interposed therebetween. In this case, the solder may have a lower melting point compared to the first current collector 144 and the first uncoated portion 146a. The laser welding may be replaced with resistance welding, ultrasonic welding, spot welding, or the like.

The second current collector 145 may be coupled to the lower surface of the electrode assembly 141. One side of the second current collector 145 may be coupled by welding to the second uncoated portion 146b, and the other side may be coupled to the inner bottom surface of the battery housing 142 by welding. The coupling structure between the second current collector 145 and the second uncoated portion 146b may be substantially the same as the coupling structure between the first current collector 144 and the first uncoated portion 146a.

The uncoated portions 146a, 146b are not limited to the illustrated structure. Accordingly, the uncoated portions 146a, 146b may selectively have a conventional uncoated portion structure as well as the electrode uncoated portion structure according to the embodiments (modifications).

The insulator 146 may cover the first current collector 144. The insulator 146 may cover the first current collector 144 at the upper surface of the first current collector 144, thereby preventing direct contact between the first current collector 144 and the inner circumference of the battery housing 142.

The insulator 146 has a lead hole 151 so that the lead 149 extending upward from the first current collector 144 may be withdrawn therethrough. The lead 149 is drawn upward through the lead hole 151 and coupled to the lower surface of the connection plate 143c or the lower surface of the cap 143a.

A peripheral region of the edge of the insulator 146 may be interposed between the first current collector 144 and the beading portion 147 to fix the coupled body of the electrode assembly 141 and the first current collector 144. Accordingly, the movement of the coupled body of the electrode assembly 141 and the first current collector 144 may be restricted in the winding axis direction Y of the battery 140, thereby improving the assembly stability of the battery 140.

The insulator 146 may be made of an insulating polymer resin. In one example, the insulator 146 may be made of polyethylene, polypropylene, polyimide, or polybutylene terephthalate.

The battery housing 142 may further include a venting portion 152 formed at a lower surface thereof. The venting portion 152 corresponds to a region having a smaller thickness compared to the peripheral region of the lower surface of the battery housing 142. The venting portion 152 is structurally weak compared to the surrounding area. Accordingly, when an abnormality occurs in the cylindrical battery 140 and the internal pressure increases to a predetermined level or more, the venting portion 152 may be ruptured so that the gas generated inside the battery housing 142 is discharged to the outside. The internal pressure at which the venting portion 152 is ruptured may be approximately 15 kgf/cm$^2$ to 35 kgf/cm$^2$.

The venting portion 152 may be formed continuously or discontinuously while drawing a circle at the lower surface of the battery housing 142. In one modification, the venting portion 152 may be formed in a straight pattern or other patterns.

Figure 18:
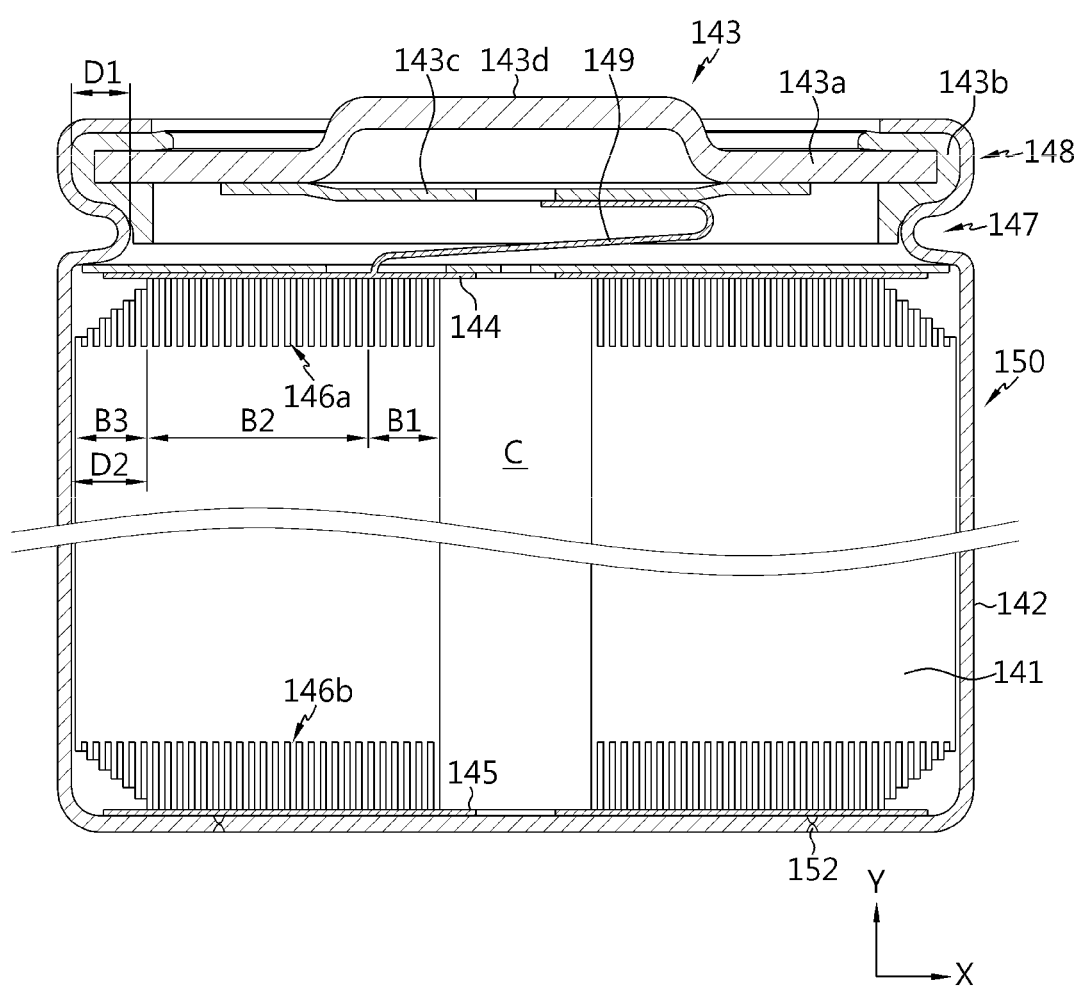
FIG. 18 is a sectional view showing a cylindrical battery according to another embodiment of the present disclosure, taken along the Y-axis direction.

FIG. 18 is a cross-sectional view showing a cylindrical battery 150 according to an embodiment of the present disclosure, taken along the Y-axis direction.

Referring to FIG. 18, the cylindrical battery 150 has substantially the same configuration as the cylindrical battery 140 of FIG. 17, except that the electrode structure of the second embodiment (modification) is adopted in the first uncoated portion 146a of the first electrode.

Referring to FIG. 18, the first uncoated portion 146a of the first electrode may have a shape in which the height of the second portion B3 gradually or stepwise decreases toward the inner circumference of the battery housing 142. Preferably, an imaginary line connecting the top of the second portion B3 may have the same or similar shape as the inner circumference of the beading portion 147.

The second portion B3 forms an inclined surface. Therefore, when the battery housing 142 is press-fitted to form the beading portion 147, the second portion B3 may be prevented from being compressed and damaged by the beading portion 147. In addition, it is possible to suppress a phenomenon in which the second portion B3 contacts the battery housing 142 having a different polarity and causes an internal short circuit.

The other configuration of the cylindrical battery 150 is substantially the same as the embodiment (modification) described above.

The uncoated portions 146a, 146b are not limited to the illustrated structure. Accordingly, the uncoated portions 146a, 146b may selectively have a conventional uncoated portion structure as well as the electrode uncoated portion structure according to the embodiments (modifications).

Figure 19:
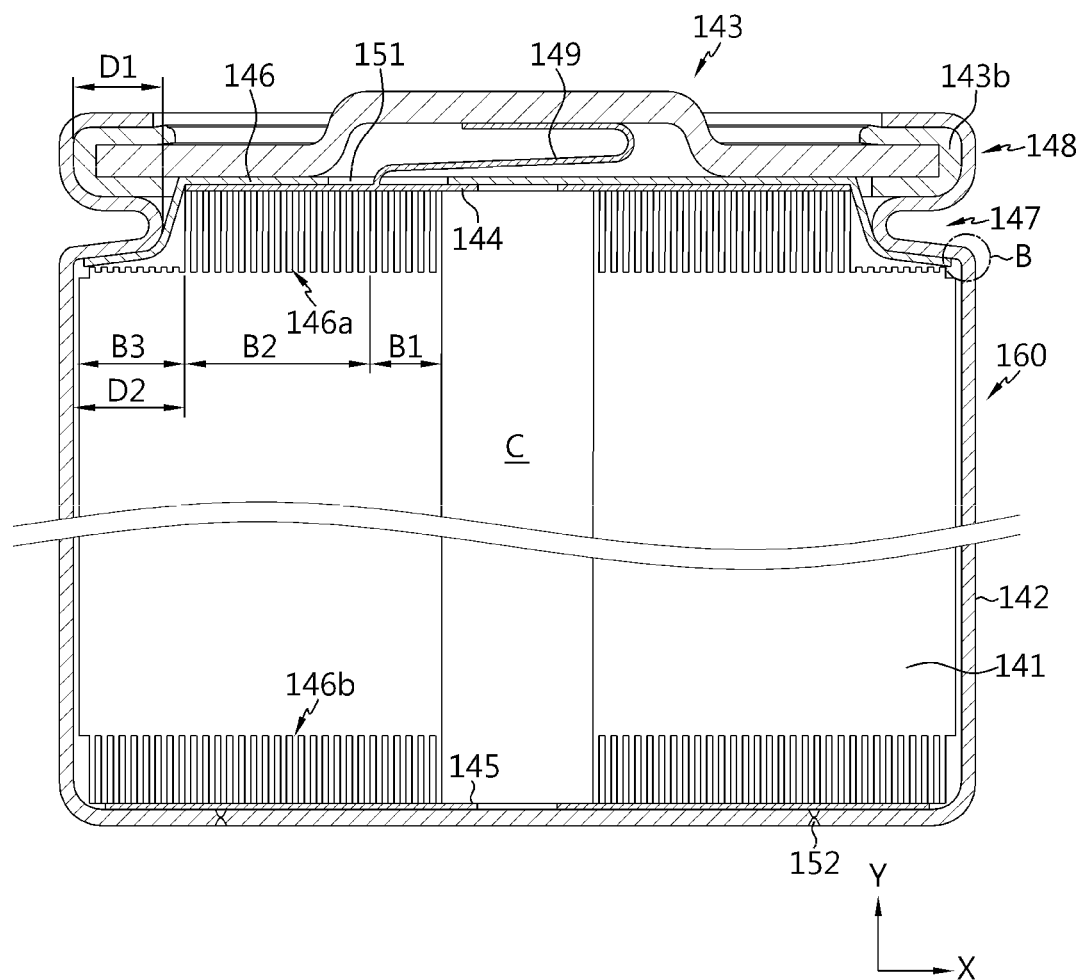
FIG. 19 is a cross-sectional view showing a cylindrical battery according to still another embodiment of the present disclosure, taken along the Y-axis direction.

FIG. 19 is a cross-sectional view showing a cylindrical battery 160 according to still another embodiment of the present disclosure, taken along the Y-axis direction.

Referring to FIG. 19, the cylindrical battery 160 is substantially the same as the cylindrical batteries 140, 150, described above, except that the lead 149 connected to the first current collector 144 is connected directly to the cap 143a of the sealing body 143 through the lead hole 151 of the insulator 146, and the insulator 146 and the first current collector 144 have a structure in close contact with the lower surface of the cap 143a.

In the cylindrical battery 160, the diameter of the first current collector 144 and the diameter of the outermost side of the third portion B2 are smaller than the minimum inner diameter of the battery housing 142. Also, the diameter of the first current collector 144 may be equal to or larger than the diameter of the outermost side of the third portion B2.

Specifically, the minimum inner diameter of the battery housing 142 may correspond to the inner diameter of the battery housing 142 at a position where the beading portion 147 is formed. At this time, the outermost diameters of the first current collector 144 and the third portion B2 are smaller than the inner diameter of the battery housing 142 at the position where the beading portion 147 is formed. Also, the diameter of the first current collector 144 may be equal to or larger than the outermost diameter of the third portion B2. The peripheral region of the edge of the insulator 146 may be interposed between the second portion B3 and the beading portion 147 in a state of being bent downward to fix the coupled body of the electrode assembly 141 and the first current collector 144.

Preferably, the insulator 146 includes a portion covering the second portion B3 and a portion covering the first current collector 144, and a portion connecting the two portions may have a curved shape corresponding to the curved shape of the beading portion 147. The insulator 146 may insulate the inner circumference of the second portion B3 and the beading portion 147 and at the same time insulate the first current collector 144 and the inner circumference of the beading portion 147.

The first current collector 144 may be located higher than the lower end of the beading portion 147 and may be coupled to the first portion B1 and the third portion B2. At this time, the press-fit depth (D1) of the beading portion 147 is less than or equal to the distance (D2) from the inner circumference of the battery housing 142 to the boundary between the second portion B3 and the third portion B2. Accordingly, the first portion B1 and the third portion B2 as well as the first current collector 144 coupled thereto may be located higher than the lower end of the beading portion 147. The lower end of the beading portion 147 means a bending point B between the portion of the battery housing 142 where the electrode assembly 141 is accommodated and the beading portion 147.

Since the first portion B1 and the third portion B2 occupy the inner space of the beading portion 147 in the radial direction, the empty space between the electrode assembly 141 and the cap 143a may be minimized. In addition, the connection plate 143c located in the empty space between the electrode assembly 141 and the cap 143a is omitted. Therefore, the lead 149 of the first current collector 144 may be directly coupled to the lower surface of the cap 143a.

According to the above structure, the empty space in the battery is reduced, and the energy density may be maximized as much as the reduced empty space.

In the cylindrical battery 160, the first current collector 144 and the second current collector 145 may be welded to the ends of the first and second uncoated portions 146a, 146b, respectively, in the same manner as in the above embodiment.

The uncoated portions 146a, 146b are not limited to the illustrated structure. Accordingly, the uncoated portions 146a, 146b may selectively have a conventional uncoated portion structure as well as the electrode uncoated portion structure according to the embodiments (modifications).

Figure 20:
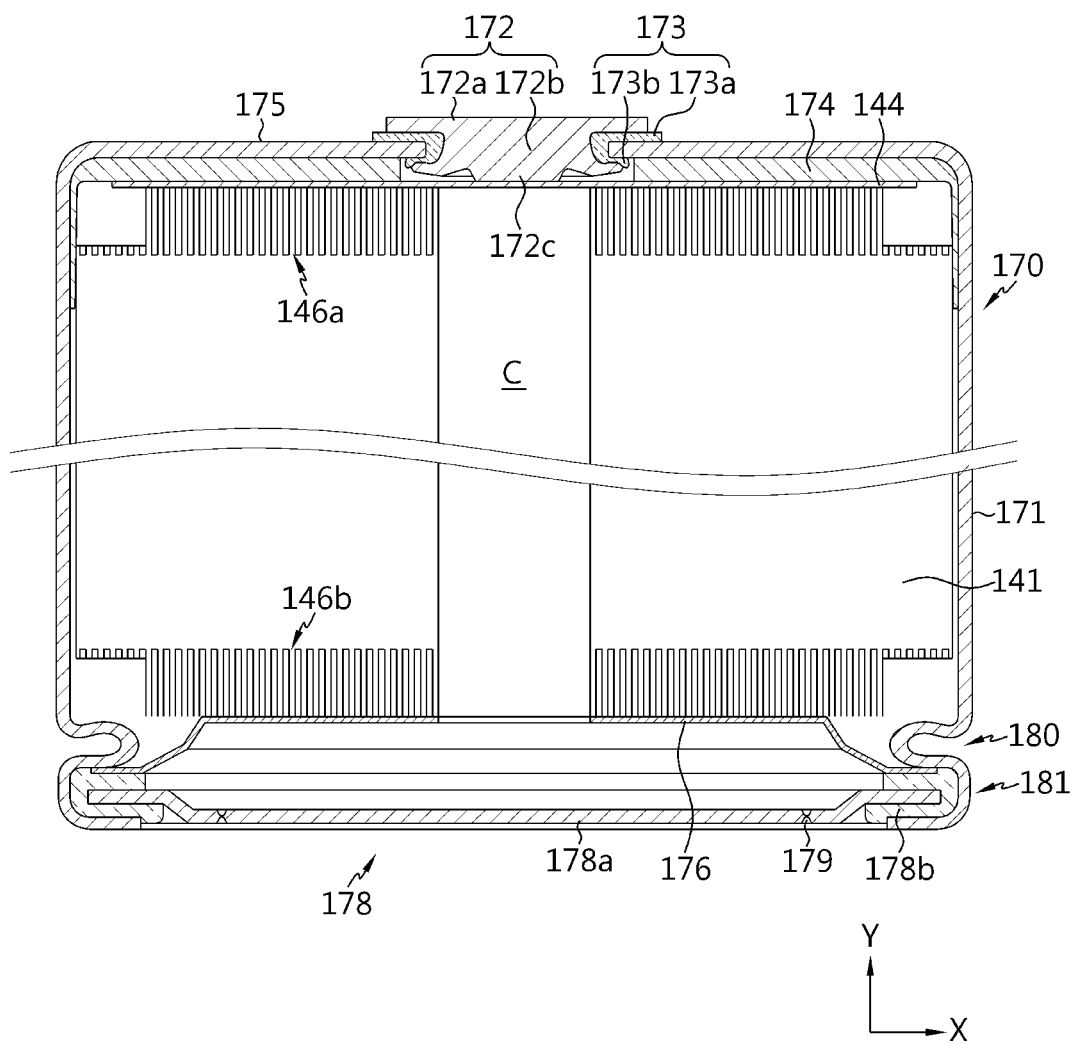
FIG. 20 is a cross-sectional view showing a cylindrical battery according to still another embodiment of the present disclosure, taken along the Y-axis direction.

FIG. 20 is a cross-sectional view showing a cylindrical battery 170 according to an embodiment of the present disclosure, taken along the Y-axis direction.

Referring to FIG. 20, the structure of the electrode assembly of the cylindrical battery 170 is substantially the same as that of the cylindrical battery 140 of in FIG. 17, and the other structure except for the electrode assembly is changed.

Specifically, the cylindrical battery 170 includes a battery housing 171 through which a terminal 172 is installed. The terminal 172 is installed through a perforation hole formed in the closed surface (the upper surface in the drawing) of the battery housing 171. The terminal 172 is riveted to the perforation hole of the battery housing 171 in a state where a second gasket 173 made of an insulating material is interposed therebetween. The terminal 172 is exposed to the outside in a direction opposite to the direction of gravity.

The terminal 172 includes a terminal exposing portion 172a and a terminal insert portion 172b. The terminal exposing portion 172a is exposed to the outside of the closed surface of the battery housing 171. The terminal exposing portion 172a may be located approximately at a central portion of the closed surface of the battery housing 171. The maximum diameter of the terminal exposing portion 172a may be larger than the maximum diameter of the perforation hole formed in the battery housing 171. The terminal insert portion 172b may be electrically connected to the uncoated portion 146a of the first electrode through approximately the central portion of the closed surface of the battery housing 171. The lower edge of the terminal insert portion 172b may be riveted onto the inner surface of the battery housing 171. That is, the lower edge of the terminal insert portion 172b may have a shape curved toward the inner surface of the battery housing 171. A flat portion 172c is included at the inner side of the lower edge of the terminal insert portion 172b. The maximum diameter of the lower portion of the riveted terminal insert portion 172b may be larger than the maximum diameter of the perforation hole of the battery housing 171.

The flat portion 172c of the terminal insert portion 172b may be welded to the center portion of the first current collector 144 connected to the first uncoated portion 146a of the first electrode. The welding may be replaced with other welding methods such as ultrasonic welding.

An insulator 174 made of an insulating material may be interposed between the first current collector 144 and the inner surface of the battery housing 171. The insulator 174 covers the upper portion of the first current collector 144 and the top edge of the electrode assembly 141. Accordingly, it is possible to prevent the second portion B3 of the electrode assembly 141 from contacting the inner surface of the battery housing 171 having a different polarity to cause a short circuit.

The thickness of the insulator 174 corresponds to or is slightly greater than the distance between the upper surface of the first current collector 144 and the inner surface of the closed portion of the battery housing 171. Accordingly, the insulator 174 may contact the upper surface of the first current collector 144 and the inner surface of the closed portion of the battery housing 171.

The terminal insert portion 172b of the terminal 172 may be welded to the first current collector 144 through the perforation hole of the insulator 174. A diameter of the perforation hole formed in the insulator 174 may be larger than a diameter of the riveting portion at the lower end of the terminal insert portion 172b. Preferably, the perforation hole may expose the lower portion of the terminal insert portion 172b and the second gasket 173.

The second gasket 173 is interposed between the battery housing 171 and the terminal 172 to prevent the battery housing 171 and the terminal 172 having opposite polarities from electrically contacting each other. Accordingly, the upper surface of the battery housing 171 having an approximately flat shape may function as the second electrode (for example, negative electrode) of the cylindrical battery 170.

The second gasket 173 includes a gasket exposing portion 173a and a gasket insert portion 173b. The gasket exposing portion 173a is interposed between the terminal exposing portion 172a of the terminal 172 and the battery housing 171. The gasket insert portion 173b is interposed between the terminal insert portion 172b of the terminal 172 and the battery housing 171. The gasket insert portion 173b may be deformed together when the terminal insert portion 172b is riveted, so as to be in close contact with the inner surface of the battery housing 171. The second gasket 173 may be made of, for example, a polymer resin having insulation property.

The gasket exposing portion 173a of the second gasket 173 may have an extended shape to cover the outer circumference of the terminal exposing portion 172a of the terminal 172. When the second gasket 173 covers the outer circumference of the terminal 172, it is possible to prevent a short circuit from occurring while an electrical connection part such as a bus bar is coupled to the upper surface of the battery housing 171 and/or the terminal 172. Although not shown in the drawings, the gasket exposing portion 173a may have an extended shape to cover not only the outer circumference surface of the terminal exposing portion 172a but also a part of the upper surface thereof.

When the second gasket 173 is made of a polymer resin, the second gasket 173 may be coupled to the battery housing 171 and the terminal 172 by thermal fusion. In this case, airtightness at the coupling interface between the second gasket 173 and the terminal 172 and at the coupling interface between the second gasket 173 and the battery housing 171 may be enhanced. Meanwhile, when the gasket exposing portion 173a of the second gasket 173 has a shape extending to the upper surface of the terminal exposing portion 172a, the terminal 172 may be integrally coupled with the second gasket 173 by insert injection molding.

In the upper surface of the battery housing 171, a remaining area 175 other than the area occupied by the terminal 172 and the second gasket 173 corresponds to the second electrode terminal having a polarity opposite to that of the terminal 172.

The second current collector 176 is coupled to the lower portion of the electrode assembly 141. The second current collector 176 is made of a conductive metal material such as aluminum, steel, copper or nickel, and is electrically connected to the second uncoated portion 146b of the second electrode.

Preferably, the second current collector 176 is electrically connected to the battery housing 171. To this end, at least a portion of the edge of the second current collector 176 may be interposed and fixed between the inner surface of the battery housing 171 and a first gasket 178b. In one example, at least a portion of the edge of the second current collector 176 may be fixed to the beading portion 180 by welding in a state of being supported on the lower surface of the beading portion 180 formed at the bottom of the battery housing 171. In one modification, at least a portion of the edge of the second current collector 176 may be directly welded to the inner wall surface of the battery housing 171.

The second current collector 176 may include a plurality of irregularities (not shown) radially formed on a surface facing the second uncoated portion 146b. When the irregularities are formed, the irregularities may be press-fitted into the second uncoated portion 146b by pressing the second current collector 176.

Preferably, the second current collector 176 and the second uncoated portion 146b may be coupled by welding, for example laser welding. In addition, the welded portion of the second current collector 176 and the second uncoated portion 146b may be spaced apart by a predetermined interval toward the core C based on the inner circumference of the beading portion 180.

A sealing body 178 for sealing the lower open end of the battery housing 171 includes a cap 178a having a plate shape and a first gasket 178b. The first gasket 178b electrically separates the cap 178a and the battery housing 171. A crimping portion 181 fixes the edge of the cap 178a and the first gasket 178b together. The cap 178a has a venting portion 179. The configuration of the venting portion 179 is substantially the same as the above embodiment (modification). The lower surface of the cap 178a may be located above the lower end of the crimping portion 181. In this case, a space is formed under the cap 178a to smoothly perform venting. In particular, it is useful when the cylindrical battery 170 is installed so that the crimping portion 181 faces the direction of gravity.

Preferably, the cap 178a is made of a conductive metal material. However, since the first gasket 178b is interposed between the cap 178a and the battery housing 171, the cap 178a does not have electrical polarity. The sealing body 178 seals the open end of the lower portion of the battery housing 171 and mainly functions to discharge gas when the internal pressure of the battery 170 increases over a critical value. A threshold value of the pressure is 15 kgf/cm² to 35 kgf/cm².

Preferably, the terminal 172 electrically connected to the first uncoated portion 146a of the first electrode is used as the first electrode terminal. In addition, in the upper surface of the battery housing 171 electrically connected to the second uncoated portion 146b of the second electrode through the second current collector 176, a part 175 except for the terminal 172 is used as the second electrode terminal having a different polarity from the first electrode terminal. If two electrode terminals are located at the upper portion of the cylindrical battery 170 as above, it is possible to arrange electrical connection components such as bus bars at only one side of the cylindrical battery 170. This may bring about simplification of the battery pack structure and improvement of energy density. In addition, since the part 175 used as the second electrode terminal has an approximately flat shape, a sufficient connection area may be secured for connecting electrical connection components such as bus bars. Accordingly, the cylindrical battery 170 may reduce the resistance at the connection portion of the electrical connection components to a desirable level.

Meanwhile, the structure of the electrode assembly 141 and the structure of the uncoated portion are not limited to those shown, and may be replaced with structures of the above embodiments (modifications).

Figure 21:
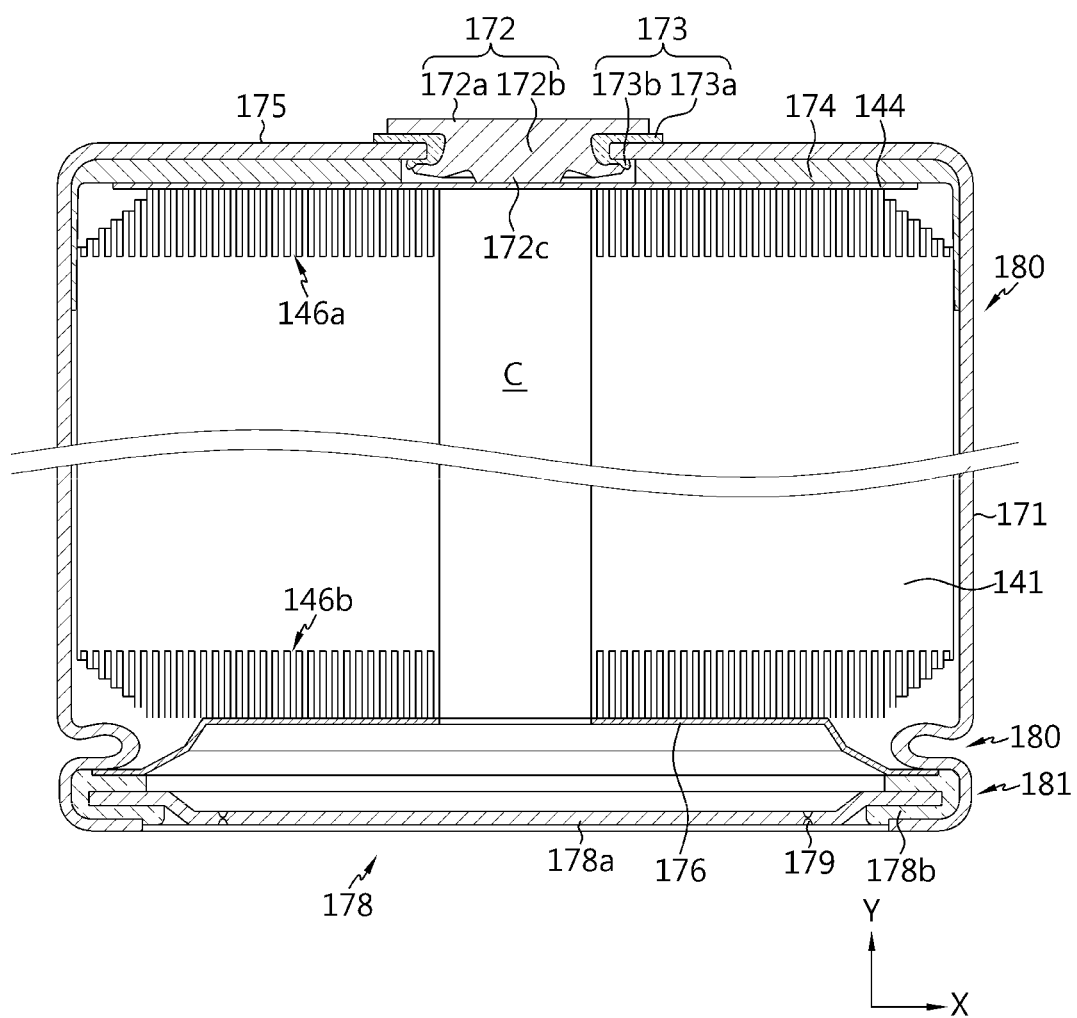
FIG. 21 is a cross-sectional view showing a cylindrical battery according to still another embodiment of the present disclosure, taken along the Y-axis direction.

FIG. 21 is a cross-sectional view showing a cylindrical battery 180 according to still another embodiment of the present disclosure, taken along the Y-axis direction.

Referring to FIG. 21, the electrode assembly 141 of the cylindrical battery 180 has substantially the same structure as that of the cylindrical battery 150 shown in FIG. 18, and the other configuration than the electrode assembly 141 is substantially the same as that of the cylindrical battery 170 shown in FIG. 20.

Accordingly, the configuration of the embodiments (modifications) of the cylindrical batteries 150, 170 may be equally applied to the cylindrical battery 180.

In addition, the structure of the electrode assembly 141 and the structure of the uncoated portion are not limited to those shown, and may be replaced with structures of the above embodiments (modifications).

Figure 22:
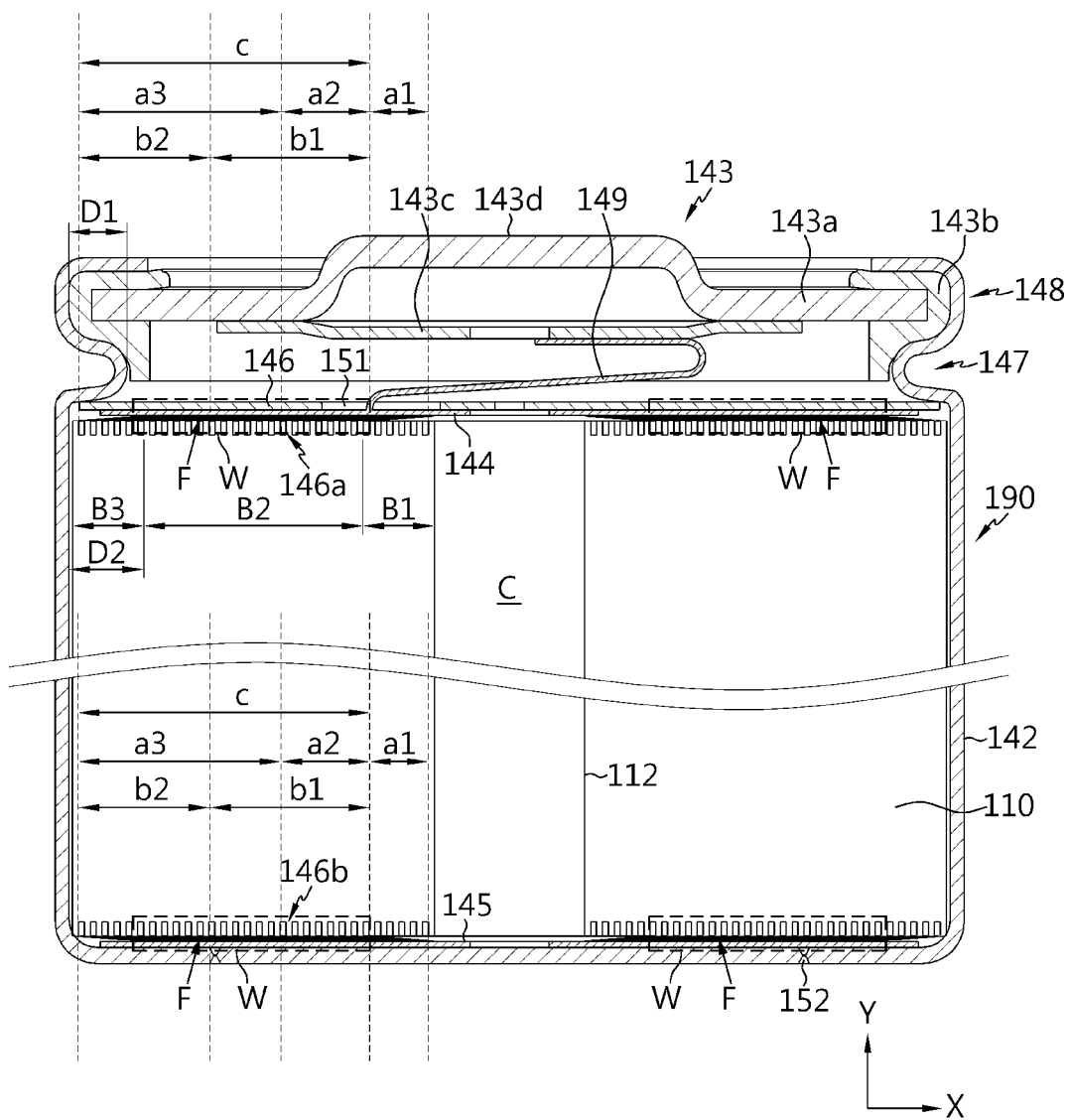
FIG. 22 is a cross-sectional view showing a cylindrical battery according to still another embodiment of the present disclosure, taken along the Y-axis direction.

FIG. 22 is a cross-sectional view showing a cylindrical battery 190 according to still another embodiment of the present disclosure, taken along the Y-axis direction.

Referring to FIG. 22, the cylindrical battery 190 includes the electrode assembly 110 shown in FIG. 14, and other configurations except for the electrode assembly 110 are substantially the same as those of the cylindrical battery 140 shown in FIG. 17. Accordingly, the configuration described with reference to FIGS. 14 and 17 may be substantially equally applied to this embodiment.

Referring to FIGS. 10a and 22, the first and second uncoated portions 146a, 146b of the electrode assembly 110 are bent in the radial direction of the electrode assembly 110, for example from the outer circumference toward the core, to form a bending surface region F.

The first portion B1 has a lower height than the other portion and corresponds to segment skip region a1 with no segment, so it is not bent toward the core.

Preferably, the bending surface region F may include the segment skip region a1, the segment height variable region a2, and the segment height uniform region a3 from the core toward the outer circumference.

As shown in FIGS. 10c, 10d, and 10e, the bending surface region F includes a stack number uniform region b1 having a stack number of 10 or more adjacent to the segment skip region a1.

The bending surface region F may also include a stack number decrease region b2 adjacent to the outer circumference of the electrode assembly 110, where the stack number of segments decreases toward the outer circumference. Preferably, the stack number uniform region b1 may be set as a welding target area.

In the bending surface region F, the preferred numerical ranges of the ratio (a2/c) of the height variable region a2 to the radial region c containing segments, the ratio (b1/c) of the stack number uniform region b1 to the radial region c containing segments, and the ratio of the area of the stack number uniform region b1 to the area of the bending surface region F are already described above, and thus will not be described again.

The first current collector 144 may be laser-welded to the bending surface region F of the first uncoated portion 146a, and the second current collector 145 may be laser-welded to the bending surface region F of the second uncoated portion 146b. The welding method may be replaced by ultrasonic welding, resistance welding, spot welding, and the like.

Preferably, an area of 50% or more of the welding regions W of the first current collector 144 and the second current collector 145 may overlap with the stack number uniform region b1 of the bending surface region F. Optionally, the remaining area of the welding region W may overlap with the stack number decrease region b2 of bending surface region F. In terms of high welding strength, low resistance of the welding interface, and prevention of damage to the separator or the active material layer, it is more preferable that the entire welding region W overlaps the stack number uniform region b1.

Preferably, in the stack number uniform region b1 and, optionally, the stack number decrease region b2 overlapping with the welding region W, the stack number of segments may be 10 to 35.

Optionally, when the segment stack number of the stack number decrease region b2 overlapping with the welding region W is less than 10, the laser output for welding of the stack number decrease region b2 may be lowered than the laser output for welding of the stack number uniform region b1. That is, when the welding region W overlaps with the stack number uniform region b1 and the stack number decrease region b2 at the same time, the laser output may be varied according to the stack number of segments. In this case, the welding strength of the stack number uniform region b1 may be greater than the welding strength of the stack number decrease region b2.

In the bending surface region F formed on the upper portion and the lower portion of the electrode assembly 110, the radial length of the segment skip region a1 and/or the segment height variable region a2 and/or the segment height uniform region a3 may be the same or different.

In the electrode assembly 110, the first portion B1 has a relatively smaller height than other portions. In addition, as shown in FIG. 14, the bending length H of the uncoated portion located at the innermost side is smaller than the sum of the radial length R of the first portion B1 and 10% of the radius of the core 112.

Therefore, even if the first uncoated portion 146a is bent toward the core, 90% or more of the diameter of the core 112 of the electrode assembly 110 may be open to the outside. If the core 112 is not blocked, there is no difficulty in the electrolyte injection process, and the electrolyte injection efficiency is improved. In addition, by inserting a welding jig through the core 112, the welding process may be easily performed between the second current collector 145 and the battery housing 142.

In the case where the uncoated portions 146a, 146b have a segment structure, if the width and/or height and/or separation pitch of the segments is adjusted to satisfy the numerical range of the above embodiment, when the segments are bent, the segments are overlapped in several layers enough to secure sufficient welding strength, and an empty hole (gap) is not formed in the bending surface region F.

Preferably, the first current collector 144 and the second current collector 145 may have outer diameters covering the end of the segment 61, 61' (FIG. 10f) bent at the last winding turn of the height uniform region a3 of the first electrode and the second electrode. In this case, welding is possible in a state while the segments forming the bending surface region F are uniformly pressed by the current collector, and the tightly stacked state of the segments may be well maintained even after welding. The tightly stacked state means a state where there is substantially no gap between the segments as shown in FIG. 10a. The tightly stacked state contributes to lowering the resistance of the cylindrical battery 190 to a level suitable for rapid charging (for example, 4 milliohms) or less.

The structure of the uncoated portions 146a, 146b may be changed to the structure according to the above embodiments (modifications). In addition, a conventional uncoated portion structure may be applied to any one of the uncoated portions 146a, 146b without limitation.

Figure 23:
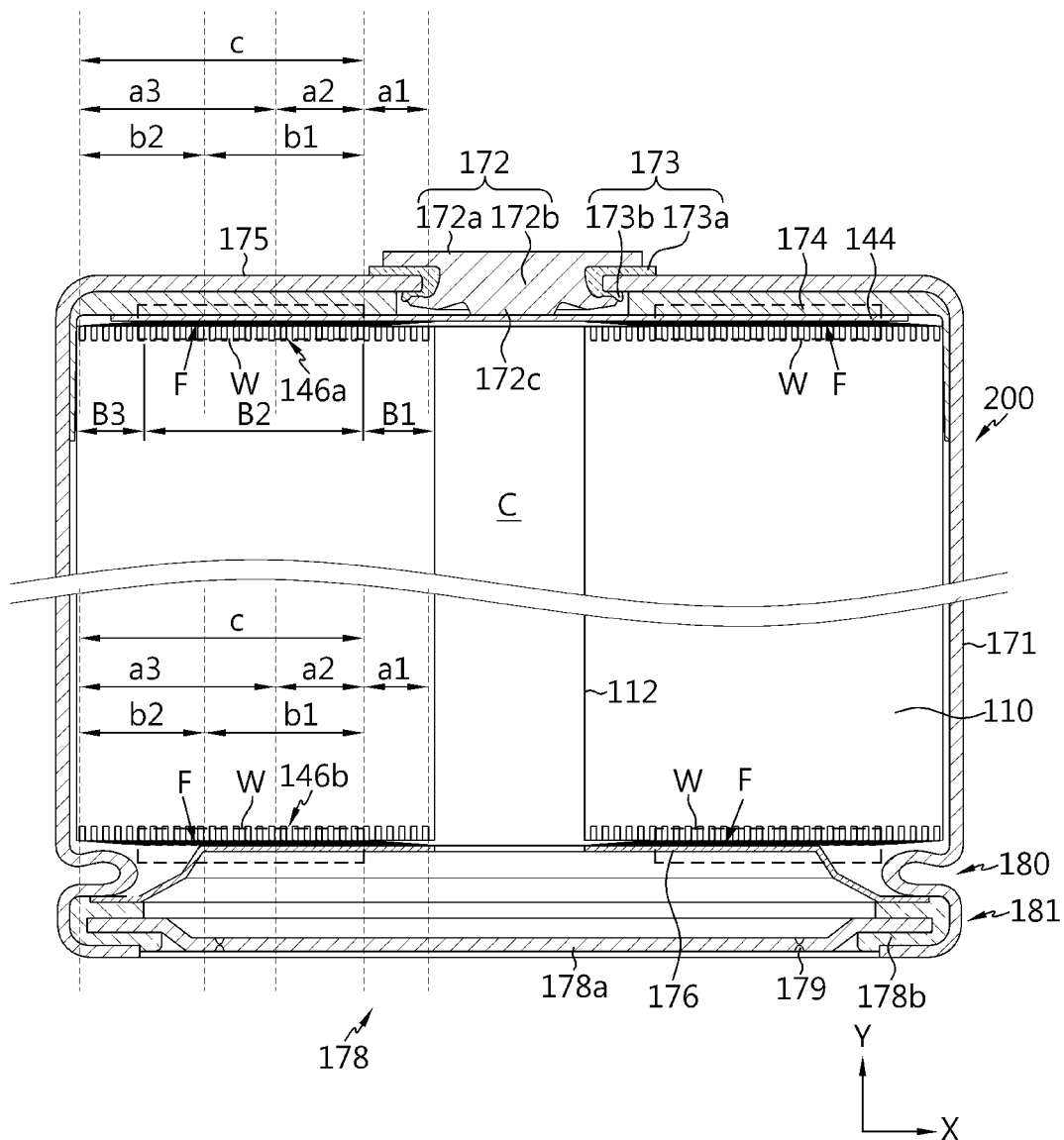
FIG. 23 is a cross-sectional view showing a cylindrical battery according to still another embodiment of the present disclosure, taken along the Y-axis direction.

FIG. 23 is a cross-sectional view showing a cylindrical battery 200 according to still another embodiment of the present disclosure, taken along the Y-axis direction.

Referring to FIG. 23, the cylindrical battery 200 includes the electrode assembly 110 shown in FIG. 14, and other configurations except for the electrode assembly 110 are substantially the same as those of the cylindrical battery 180 shown in FIG. 21. Accordingly, the configuration described with reference to FIGS. 14 and 21 may be substantially equally applied to this embodiment.

As shown in FIGS. 10a and 23, the first and second uncoated portions 146a, 146b of the electrode assembly 110 are bent in the radial direction of the electrode assembly 110, for example from the outer circumference toward the core, to form the bending surface region F.

The first portion B1 has a lower height than the other portion and corresponds to the segment skip region a1 with no segment, so it is not bent toward the core.

Preferably, the bending surface region F may include a segment skip region a1, a segment height variable region a2, and a segment height uniform region a3 from the core toward the outer circumference.

As shown in FIGS. 10c, 10d and 10e, the bending surface region F includes a stack number uniform region b1 having the stack number of 10 or more adjacent to the segment skip region a1.

The bending surface region F may also include a stack number decrease region b2 adjacent to the outer circumference of the electrode assembly 110, where the stack number of segments decreases toward the outer circumference. Preferably, the stack number uniform region b1 may be set as a welding target area.

In the bending surface region F, the preferred numerical ranges of the ratio (a2/c) of the segment height variable region a2 to the radial region c including the segments and the ratio (b1/c) of the segment stack number uniform region b1 to the radial region c including the segments, and the ratio of the area of the stack number uniform region b1 to the area of the bending surface region F are already described above and thus will not be described again.

The first current collector 144 may be laser-welded to the bending surface region F of the first uncoated portion 146a, and the second current collector 176 may be laser-welded to the bending surface region F of the second uncoated portion 146b. The welding method may be replaced by ultrasonic welding, resistance welding, spot welding, and the like. The welding region W between the second current collector 176 and the second uncoated portion 146b may be spaced apart from the inner surface of the beading portion 180 by a predetermined interval.

Preferably, an area of 50% or more of the welding regions W of the first current collector 144 and the second current collector 176 may overlap with the stack number uniform region b1 of the bending surface region F. Optionally, the remaining area of the welding region W may overlap with the stack number decrease region b2 of the bending surface region F. In terms of high welding strength, low resistance of the welding interface, and prevention of damage to the separator or the active material layer, it is more preferable that the entire welding region W overlaps with the stack number uniform region b1.

Preferably, in the stack number uniform region b1 and, optionally, the stack number decrease region b2 overlapping with the welding region W, the stack number of segments may be 10 to 35.

Optionally, when the segment stack number of the stack number decrease region b2 overlapping with the welding region W is less than 10, the laser output for welding of the stack number decrease region b2 may be lowered than the laser output for welding of the stack number uniform region b1. That is, when the welding region W overlaps with the stack number uniform region b1 and the stack number decrease region b2 at the same time, the laser output may be varied according to the stack number of segments. In this case, the welding strength of the stack number uniform region b1 may be greater than the welding strength of the stack number decrease region b2.

In the bending surface region F formed on the upper portion and the lower portion of the electrode assembly 110, the radial length of the segment skip region a1 and/or the segment height variable region a2 and/or the segment height uniform region a3 may be the same or different.

In the electrode assembly 110, the first portion B1 has a relatively smaller height than other portions. In addition, as shown in FIG. 14, the bending length H of the segment located at the innermost side is smaller than the sum of the radial length R of the first portion B1 and 10% of the radius of the core 112.

Therefore, even if the uncoated portion 146a is bent toward the core, 90% or more of the diameter of the core 112 of the electrode assembly 110 may be open to the outside.

If the core 112 is not blocked, there is no difficulty in the electrolyte injection process, and the electrolyte injection efficiency is improved. In addition, by inserting a welding jig through the core 112, the welding process may be easily performed between the first current collector 144 and the terminal 172.

In the case where the uncoated portions 146a, 146b have a segment structure, if the width and/or height and/or separation pitch of the segments is adjusted to satisfy the numerical range of the above embodiment, when the segments are bent, the segments are overlapped in several layers enough to secure sufficient welding strength, and an empty hole (gap) is not formed in the bending surface region F.

Preferably, the area of the first current collector 144 and the second current collector 176 in contact with the first and second uncoated portions 146a, 146 may have outer diameters covering the end of the segment 61, 61' (FIG. 10f) bent at the last winding turn of the height uniform region a3 of the first electrode and the second electrode. In this case, welding is possible in a state while the segments forming the bending surface region F are uniformly pressed by the current collector, and the tightly stacked state of the segments may be well maintained even after welding. The tightly stacked state means a state where there is substantially no gap between the segments as shown in FIG. 10a. The tightly stacked state contributes to lowering the resistance of the cylindrical battery 200 to a level suitable for rapid charging (for example, 4 milliohms) or less.

The structure of the uncoated portions 146a, 146b may be changed to the structure according to the above embodiments (modifications). In addition, a conventional uncoated portion structure may be applied to any one of the uncoated portions 146a, 146b without limitation.

Figure 24:
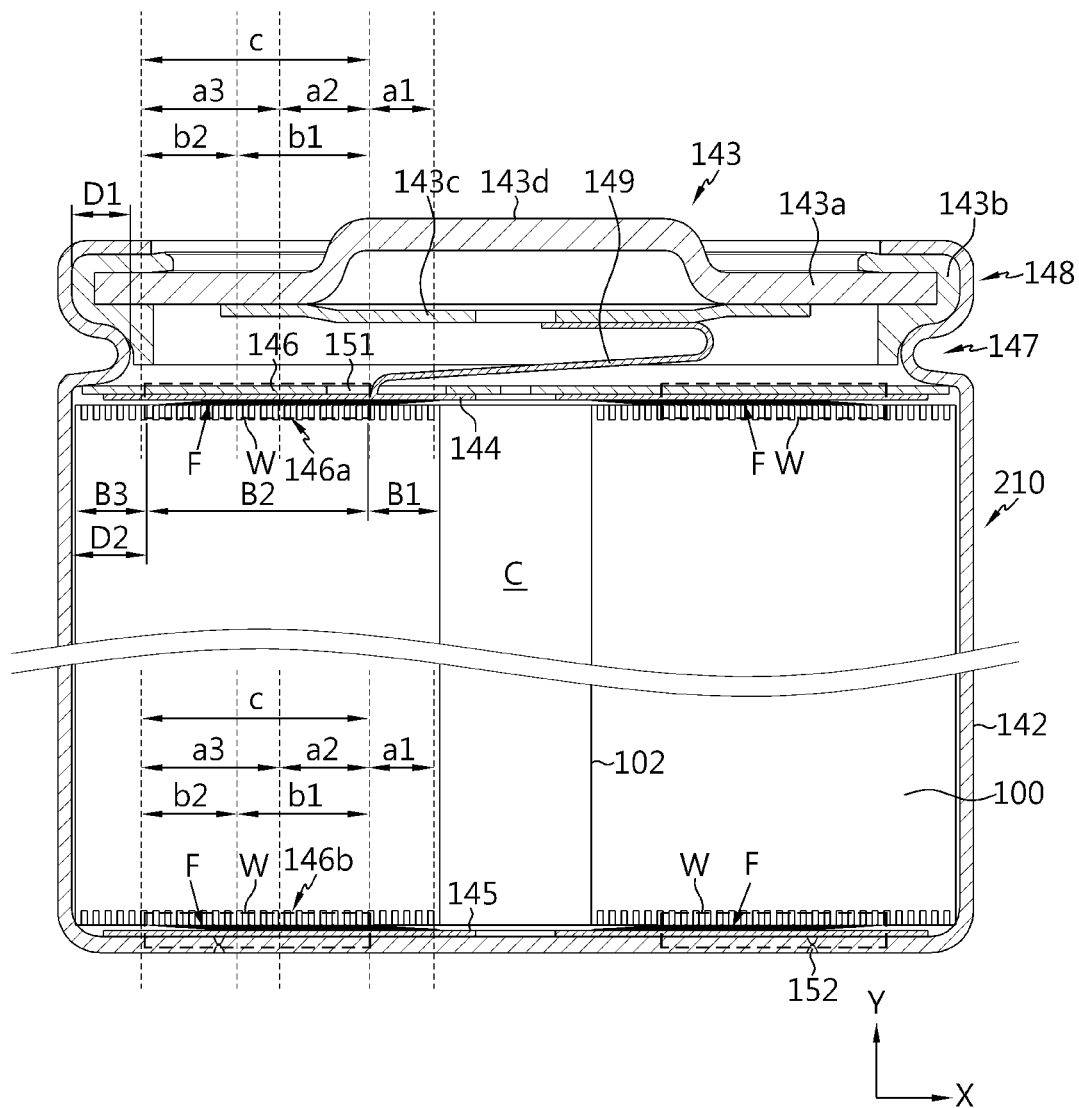
FIG. 24 is a cross-sectional view showing a cylindrical battery according to still another embodiment of the present disclosure, taken along the Y-axis direction.

FIG. 24 is a cross-sectional view showing a cylindrical battery 210 according to an embodiment of the present disclosure, taken along the Y-axis direction.

Referring to FIG. 24, the cylindrical battery 210 includes the electrode assembly 100 shown in FIG. 13, and other components except for the electrode assembly 100 are substantially the same as those of the cylindrical battery 140 shown in FIG. 17. Accordingly, the configuration described with reference to FIGS. 13 and 17 may be substantially equally applied to this embodiment.

Preferably, the first and second uncoated portions 146a, 146b of the electrode assembly 100 are divided into a plurality of segments, and the segments are bent in the radial direction of the electrode assembly 100, for example from the outer circumference toward the core. At this time, since the first portion B1 of the first uncoated portion 146a and the second portion B3 have a lower height than the other portions and do not include segments, they are not substantially bent. This is also identical in the case of the second uncoated portion 146b.

Also in this embodiment, the bending surface region F may include a segment skip region a1, a segment height variable region a2, and a segment height uniform region a3 from the core toward the outer circumference. However, since the second portion B3 is not bent, the radial length of the bending surface region F may be shorter than in the case of the above embodiment.

As shown in FIGS. 10c, 10d and 10e, the bending surface region F includes a stack number uniform region b1 having the stack number of 10 or more adjacent to the segment skip region a1.

The bending surface region F may also include a stack number decrease region b2 adjacent to the second portion B3 of the electrode assembly 100, in which the stack number of segments decreases toward the outer circumference. Preferably, the stack number uniform region b1 may be set as a welding target area.

In the bending surface region F, the preferred numerical range of the ratio (a2/c) of the segment height variable region a2 to the radial region c including the segments, the ratio (b1/c) of the segment stack number uniform region b1 to the radial region c including the segments, and the ratio of the area of the stack number uniform region b1 to the area of the bending surface region F are already described above and thus will not be described again.

The first current collector 144 may be welded to the bending surface region F of the first uncoated portion 146a, and the second current collector 145 may be welded to the bending surface region F of the second uncoated portion 146b.

The overlapping relationship between the stack number uniform region b1 and the stack number decrease region b2 and the welding region W, the outer diameters of the first current collector 144 and the first current collector 145, and the configuration in which the first portion B1 does not block 10% or more of the diameter of the core are substantially the same as described above.

Meanwhile, the second portion B3 does not include segments, and the height of the second portion B3 is lower than that of the third portion B2. Therefore, when the first uncoated portion 146a is bent, the second portion B3 is not substantially bent. In addition, since the second portion B3 is sufficiently spaced from the beading portion 147, the problem of damage to the second portion B3 may be solved while the beading portion 147 is press-fitted.

The structure of the uncoated portions 146a, 146b may be changed to the structure according to the above embodiments (modifications). In addition, a conventional uncoated portion structure may be applied to any one of the uncoated portions 146a, 146b without limitation.

Figure 25:
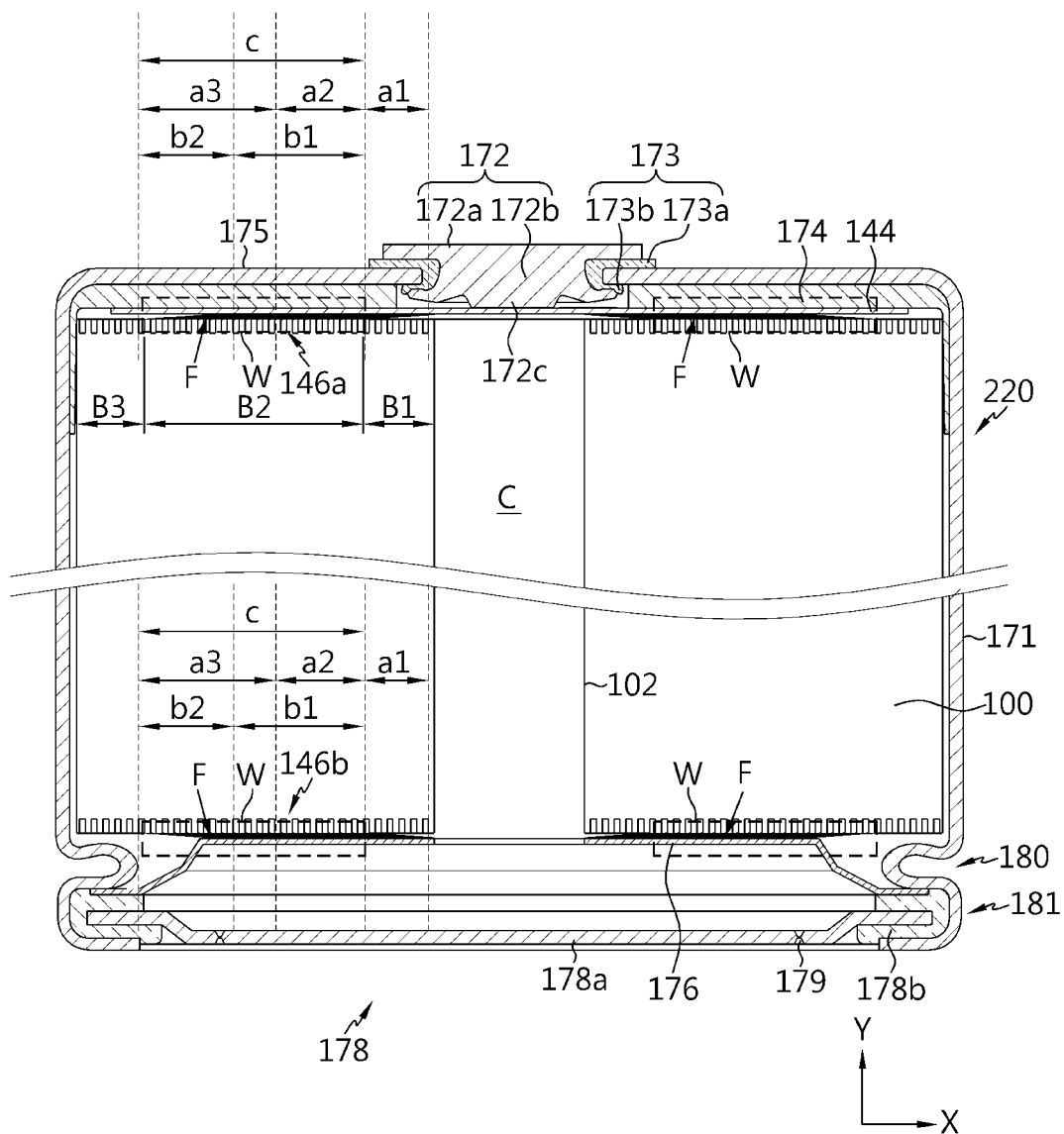
FIG. 25 is a cross-sectional view showing a cylindrical battery according to still another embodiment of the present disclosure, taken along the Y-axis direction.

FIG. 25 is a cross-sectional view showing a cylindrical battery 220 according to an embodiment of the present disclosure, taken along the Y-axis direction.

Referring to FIG. 25, the cylindrical battery 220 includes the electrode assembly 100 shown in FIG. 24, and other components except for the electrode assembly 100 are substantially the same as those of the cylindrical battery 180 shown in FIG. 21. Accordingly, the configuration described with reference to FIGS. 21 and 24 may be substantially equally applied to this embodiment.

Preferably, the first and second uncoated portions 146a, 146b of the electrode assembly 100 are divided into a plurality of segments, and are bent from the outer circumference toward the core. At this time, since the first portion B1 of the first uncoated portion 146a and the second portion B3 have a lower height than the other portions and do not include segments, they are not substantially bent. This is also identical in the case of the second uncoated portion 146b.

Therefore, in this embodiment, similar to the embodiment of FIG. 24, the bending surface region F may include a segment skip region a1, a segment height variable region a2, and a segment height uniform region a3 from the core toward the outer circumference. However, since the second portion B3 is not bent, the radial length of the bending surface region F may be shorter than in the case of the above embodiment.

As shown in FIGS. 10c, 10d and 10e, the bending surface region F includes a stack number uniform region b1 having the stack number of 10 or more adjacent to the segment skip region a1.

The bending surface region F may also include a stack number decrease region b2 adjacent to the second portion B3 of the electrode assembly 110, in which the stack number of segments decreases toward the outer circumference. Preferably, the stack number uniform region b1 may be set as a welding target area.

In the bending surface region F, the preferred numerical range of the ratio (a2/c) of the segment height variable region a2 to the radial region c including the segments, the ratio (b1/c) of the segment stack number uniform region b1 to the radial region c including the segments, and the ratio of the area of the stack number uniform region b1 to the area of the bending surface region F are already described above and thus will not be described again.

The first current collector 144 may be welded to the bending surface region F of the first uncoated portion 146a, and the second current collector 176 may be welded to the bending surface region F of the second uncoated portion 146b.

The overlapping relationship between the stack number uniform region b1 and the stack number decrease region b2 and the welding region W, the outer diameters of the first current collector 144 and the first current collector 176, and the configuration in which the first portion B1 does not block 10% or more of the diameter of the core are substantially the same as described above.

The structure of the uncoated portions 146a, 146b may be changed to the structure according to the above embodiments (modifications). In addition, a conventional uncoated portion structure may be applied to any one of the uncoated portions 146a, 146b without limitation.

Figure 26:
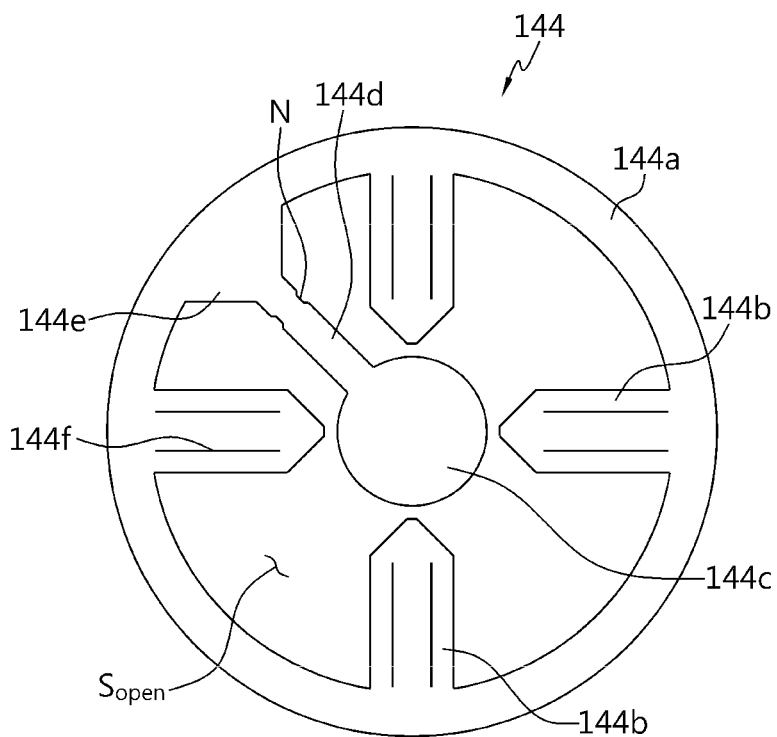
FIG. 26 is a top plan view showing a structure of a first current collector according to an embodiment of the present disclosure.
Figure 27:
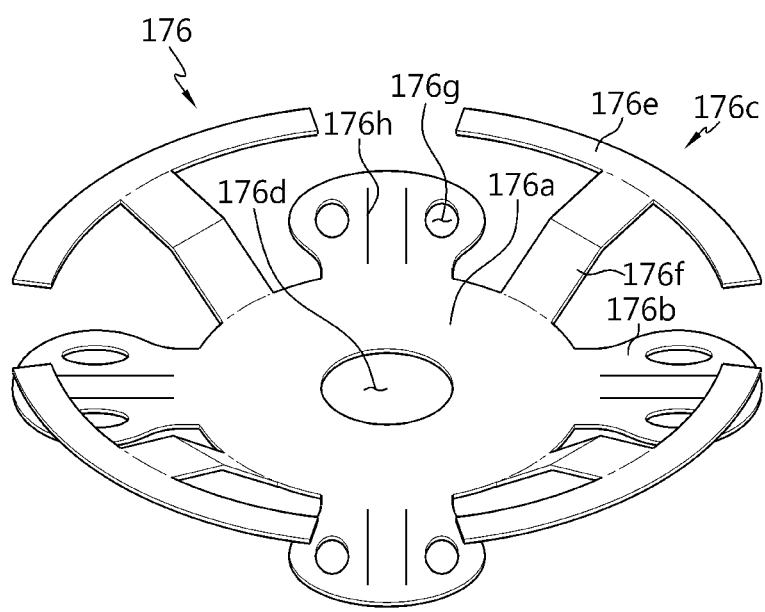
FIG. 27 is a top plan view showing a structure of a second current collector according to an embodiment of the present disclosure.

In the embodiments (modifications), the first current collector 144 and the second current collector 176 included in the cylindrical batteries 170, 180, 200, 220 including the terminal 172 may have an improved structure as shown in FIGS. 26 and 27.

The improved structure of the first current collector 144 and the second current collector 176 may contribute to lowering the resistance of the cylindrical battery, improving vibration resistance, and improving energy density. In particular, the first current collector 144 and the second current collector 176 are more effective when used in a large cylindrical battery whose ratio of diameter to height is greater than 0.4.

FIG. 26 is a top plan view showing the structure of the first current collector 144 according to an embodiment of the present disclosure.

Referring to FIGS. 23 and 26 together, the first current collector 144 may include an edge portion 144a, a first uncoated portion coupling portion 144b, and a terminal coupling portion 144c. The edge portion 144a is disposed on the electrode assembly 110. The edge portion 144a may have a substantially rim shape having an empty space ($S_{open}$) formed therein. In the drawings of the present disclosure, only a case in which the edge portion 144a has a substantially circular rim shape is illustrated, but the present disclosure is not limited thereto. The edge portion 61 may have a substantially rectangular rim shape, a hexagonal rim shape, an octagonal rim shape, or other rim shapes, unlike the illustrated one. The number of the edge portion 144a may be increased to two or more. In this case, another edge portion in the form of a rim may be included inside the edge portion 144a.

The terminal coupling portion 144c may have a diameter equal to or greater than the diameter of the flat portion 172c formed on the bottom surface of the terminal 172 in order to secure a welding region for coupling with the flat portion 172c formed on the bottom surface of the terminal 172.

The first uncoated portion coupling portion 144b extends inward from the edge portion 144a and is coupled to the uncoated portion 146a by welding. The terminal coupling portion 144c is spaced apart from the first uncoated portion coupling portion 144b and is positioned inside the edge portion 144a. The terminal coupling portion 144c may be coupled to the terminal 172 by welding. The terminal coupling portion 144c may be located, for example, approximately at the center of the inner space ($S_{open}$) surrounded by the edge portion 144a. The terminal coupling portion 144c may be provided at a position corresponding to the hole formed in the core C of the electrode assembly 110. The terminal coupling portion 144c may be configured to cover the hole formed in the core C of the electrode assembly 110 so that the hole formed in the core C of the electrode assembly 110 is not exposed out of the terminal coupling portion 144c. To this end, the terminal coupling portion 144c may have a larger diameter or width than the hole formed in the core C of the electrode assembly 110.

The first uncoated portion coupling portion 144b and the terminal coupling portion 144c may not be directly connected, but may be disposed to be spaced apart from each other and indirectly connected by the edge portion 144a. Since the first current collector 144 has a structure in which the first uncoated portion coupling portion 144b and the terminal coupling portion 144c are not directly connected to each other but are connected through the edge portion 144c as above, when shock and/or vibration occurs at the cylindrical battery 200, it is possible to disperse the shock applied to the coupling portion between the first uncoated portion coupling portion 144b and the first uncoated portion 146a and the coupling portion between the terminal coupling portion 144c and the terminal 172. In the drawings of the present disclosure, only a case in which four first uncoated portion coupling portions 144b are provided is illustrated, but the present disclosure is not limited thereto. The number of the first uncoated portion coupling portions 144b may be variously determined in consideration of manufacturing difficulty according to the complexity of the shape, electric resistance, the inner space ($S_{open}$) inside the edge portion 144a considering electrolyte impregnation, and the like.

The first current collector 144 may further include a bridge portion 144d extending inward from the edge portion 144a and connected to the terminal coupling portion 144c. At least a part of the bridge portion 144d may have a smaller sectional area compared to the first uncoated portion coupling portion 144b and the edge portion 144a. For example, at least a part of the bridge portion 144d may be formed to have a smaller width and/or thickness compared to the first uncoated portion coupling portion 144b. In this case, the electric resistance increases in the bridge portion 144d. Therefore, when a current flows through the bridge portion 144d, the relatively large resistance causes a part of the bridge portion 144d to be melted due to overcurrent heating. Accordingly, the overcurrent is irreversibly blocked. The sectional area of the bridge portion 144d may be adjusted to an appropriate level in consideration of the overcurrent blocking function.

The bridge portion 144d may include a taper portion 144e whose width is gradually decreased from the inner surface of the edge portion 144a toward the terminal coupling portion 144c. When the taper portion 144e is provided, the rigidity of the component may be improved at the connection portion between the bridge portion 144d and the edge portion 144a. When the taper portion 144e is provided, in the process of manufacturing the cylindrical battery 200, for example, a transfer device and/or a worker may easily and safely transport the first current collector 144 and/or a coupled body of the first current collector 144 and the electrode assembly 110 by gripping the taper portion 144e. That is, when the taper portion 144e is provided, it is possible to prevent product defects that may occur by gripping a portion where welding is performed with other components such as the first uncoated portion coupling portion 144b and the terminal coupling portion 144c.

The first uncoated portion coupling portion 144b may be provided in plural. The plurality of first uncoated portion coupling portions 144b may be disposed substantially at regular intervals from each other in the extending direction of the edge portion 144a. An extension length of each of the plurality of first uncoated portion coupling portions 144b may be substantially equal to each other. The first uncoated portion coupling portion 144b may be coupled to the bending surface region F of the uncoated portion 146a by laser welding. The welding may be replaced by ultrasonic welding, spot welding, or the like.

A welding pattern 144f formed by welding between the first uncoated portion coupling portion 144b and the bending surface region F may have a structure extending along the radial direction of the electrode assembly 110. The welding pattern 144f may be an array of line patterns or dot patterns.

The welding pattern 144f corresponds to the welding region. Therefore, it is desirable that the welding pattern 144f overlaps with the stack number uniform region b1 of the bending surface region F by 50% or more. The welding pattern 144f that does not overlap with the stack number uniform region b1 may overlap with the stack number decrease region b2. More preferably, the entire welding pattern 144f may overlap with the stack number uniform region b1 of the bending surface region F. In the bending surface region F below the point where the welding pattern 144f is formed, the stack number uniform region b1 and, optionally, the stack number decrease region b2 preferably have the stack number of 10 or more.

The terminal coupling portion 144c may be disposed to be surrounded by the plurality of first uncoated portion coupling portions 144b. The terminal coupling portion 144c may be coupled to the flat portion 172c of the terminal 172 by welding. The bridge portion 144d may be positioned between a pair of first uncoated portion coupling portions 144b adjacent to each other. In this case, the distance from the bridge portion 144d to any one of the pair of first uncoated portion coupling portions 144b along the extending direction of the edge portion 144a may be substantially equal to the distance from the bridge portion 144d to the other one of the pair of first uncoated portion coupling portions 144b along the extending direction of the edge portion 144a. The plurality of first uncoated portion coupling portions 144b may be formed to have substantially the same sectional area. The plurality of first uncoated portion coupling portions 144b may be formed to have substantially the same width and thickness.

Although not shown in the drawings, the bridge portion 144d may be provided in plural. Each of the plurality of bridge portions 144d may be disposed between a pair of first uncoated portion coupling portions 144b adjacent to each other. The plurality of bridge portions 144d may be disposed substantially at regular intervals to each other in the extending direction of the edge portion 144a. A distance from each of the plurality of bridge portions 144d to one of the pair of first uncoated portion coupling portions 144b adjacent to each other along the extending direction of the edge portion 144a may be substantially equal to a distance from each of the plurality of the bridge portion 144d to the other first uncoated portion coupling portion 144b.

In the case where the first uncoated portion coupling portion 144b and/or the bridge portion 144d is provided in plural as described above, if the distance between the first uncoated portion coupling portions 144b and/or the distance between the bridge portions 144d and/or the distance between the first uncoated portion coupling portion 144b and the bridge portion 144d is uniformly formed, a current flowing from the first uncoated portion coupling portion 144b toward the bridge portion 144d or a current flowing from the bridge portion 144d toward the first uncoated portion coupling portion 144b may be smoothly formed.

The bridge portion 144d may include a notching portion N formed to partially reduce a sectional area of the bridge portion 144d. The sectional area of the notching portion N may be adjusted, for example, by partially reducing the width and/or thickness of the bridge portion 144d. When the notching portion N is provided, electric resistance is increased in the region where the notching portion N is formed, thereby enabling rapid current interruption when overcurrent occurs.

The notching portion N is preferably provided in a region corresponding to the stack number uniform region of the electrode assembly 110 in order to prevent foreign substances generated during rupturing from flowing into the electrode assembly 110. This is because, in this region, the number of overlapping layers of the segments of the uncoated portion 146a is maintained to the maximum and thus the overlapped segments may function as a mask.

The notching portion N may be wrapped with an insulating tape. Then, since the heat generated in the notching portion N is not dissipated to the outside, the notching portion N may be ruptured more quickly when an overcurrent flows through the bridge portion 144d.

FIG. 27 is a top plan view showing the structure of the second current collector 176 according to an embodiment of the present disclosure.

Referring to FIGS. 23 and 27 together, the second current collector 176 is disposed below the electrode assembly 110. In addition, the second current collector 176 may be configured to electrically connect the uncoated portion 146b of the electrode assembly 110 and the battery housing 171. The second current collector 176 is made of a metal material with conductivity and is electrically connected to the bending surface region F of the uncoated portion 146b. In addition, the second current collector 176 is electrically connected to the battery housing 171. The edge portion of the second current collector 176 may be interposed and fixed between the inner surface of the battery housing 171 and the first gasket 178b. Specifically, the edge portion of the second current collector 176 may be interposed between the lower surface of the beading portion 180 of the battery housing 171 and the first gasket 178b. However, the present disclosure is not limited thereto, and the edge portion of the second current collector 176 may be welded to the inner wall surface of the battery housing 171 in a region where the beading portion 180 is not formed.

The second current collector 176 may include a support portion 176a disposed below the electrode assembly 110, a second uncoated portion coupling portion 176b extending from the support portion 176a approximately along the radial direction of the electrode assembly 110 and coupled to the bending surface region F of the uncoated portion 146b, and a housing coupling portion 176c extending from the support portion 176a toward the inner surface of the battery housing 171 approximately along an inclined direction based on the radial direction of the electrode assembly 110 and coupled to the inner surface of the battery housing 171. The second uncoated portion coupling portion 176b and the housing coupling portion 176c are indirectly connected through the support portion 176a, and are not directly connected to each other. Therefore, when an external shock is applied to the cylindrical battery 200 of the present disclosure, it is possible to minimize the possibility of damage to the coupling portion of the second current collector 176 and the electrode assembly 110 and the coupling portion of the second current collector 176 and the battery housing 171. However, the second current collector 176 of the present disclosure is not limited to the structure where the second uncoated portion coupling portion 176b and the housing coupling portion 176c are only indirectly connected. For example, the second current collector 176 may have a structure that does not include the support portion 176a for indirectly connecting the second uncoated portion coupling portion 176b and the housing coupling portion 176c and/or a structure in which the uncoated portion 146b and the housing coupling portion 176c are directly connected to each other.

The support portion 176a and the second uncoated portion coupling portion 176b are disposed below the electrode assembly 110. The second uncoated portion coupling portion 176b is coupled to the bending surface region F of the uncoated portion 146b. In addition to the second uncoated portion coupling portion 176b, the support portion 176a may also be coupled to the uncoated portion 146b. The second uncoated portion coupling portion 176b and the bending surface region F of the uncoated portion 146b may be coupled by welding. The welding may be replaced with ultrasonic welding or spot welding. The support portion 176a and the second uncoated portion coupling portion 176b are located higher than the beading portion 180 when the beading portion 180 is formed on the battery housing 171.

The support portion 176a has a current collector hole 176d formed at a location corresponding to the hole formed at the core C of the electrode assembly 110. The core C of the electrode assembly 110 and the current collector hole 176d communicating with each other may function as a passage for inserting a welding rod for welding between the terminal 172 and the terminal coupling portion 144c of the first current collector 144 or for irradiating a laser beam.

The current collector hole 176d may have a radius of $0.5r_c$ or more compared to the radius ($r_c$) of the hole formed in the core C of the electrode assembly 110. If the radius of the current collector hole 176d is $0.5r_c$ to $1.0r_c$, when a vent occurs in the cylindrical battery 200, the phenomenon that the winding structure of the separator or electrodes near the core C of the electrode assembly 110 is pushed out of the core C due to the vent pressure is prevented. When the radius of the current collector hole 176d is larger than $1.0r_c$, the opening of the core C is maximized, so the electrolyte may be easily injected in the electrolyte injection process.

When the second uncoated portion coupling portion 176b is provided in plural, the plurality of second uncoated portion coupling portions 176b may have a shape extending approximately radially from the support portion 176a of the second current collector 176 toward the sidewall of the battery housing 171. The plurality of second uncoated portion coupling portions 176b may be positioned to be spaced apart from each other along the periphery of the support portion 176a.

The housing coupling portion 176c may be provided in plural. In this case, the plurality of housing coupling portions 176c may have a shape extending approximately radially from the center of the second current collector 176 toward the sidewall of the battery housing 171. Accordingly, the electrical connection between the second current collector 176 and the battery housing 171 may be made at a plurality of points. Since the coupling for electrical connection is made at a plurality of points, the coupling area may be maximized, thereby minimizing electric resistance. The plurality of housing coupling portions 176c may be positioned to be spaced apart from each other along the periphery of the support portion 176a. At least one housing coupling portion 176c may be positioned between the second uncoated portion coupling portions 176b adjacent to each other. The plurality of housing coupling portions 176c may be coupled to, for example, the beading portion 180 in the inner surface of the battery housing 171. The housing coupling portions 176c may be coupled, particularly, to the lower surface of the beading portion 180 by laser welding. The welding may be replaced with, for example, ultrasonic welding, spot welding, or the like. By coupling the plurality of housing coupling portions 176c on the beading portion 180 by welding in this way, the current path may be distributed radially so that the resistance level of the cylindrical battery 200 is limited to about 4 milliohms or less. In addition, as the lower surface of the beading portion 180 has a shape extending in a direction approximately parallel to the upper surface of the battery housing 171, namely in a direction approximately perpendicular to the sidewall of the battery housing 171, and the housing coupling portion 176c also has a shape extending in the same direction, namely in the radial direction and the circumferential direction, the housing coupling portion 176c may be stably in contact with the beading portion 180. In addition, as the housing coupling portion 176c is stably in contact with the flat portion of the beading portion 180, the two components may be welded smoothly, thereby improving the coupling force between the two components and minimizing the increase in resistance at the coupling portion.

The housing coupling portion 176c may include a contact portion 176e coupled onto the inner surface of the battery housing 171 and a connection portion 176f for connecting the support portion 176a and the contact portion 176e.

The contact portion 176e is coupled onto the inner surface of the battery housing 171. In the case where the beading portion 180 is formed on the battery housing 171, the contact portion 176e may be coupled onto the beading portion 180 as described above. More specifically, the contact portion 176e may be electrically coupled to the flat portion formed at the lower surface of the beading portion 180 formed on the battery housing 171, and may be interposed between the lower surface of the beading portion 180 and the first gasket 178b. In this case, for stable contact and coupling, the contact portion 176e may have a shape extending on the beading portion 180 by a predetermined length along the circumferential direction of the battery housing 171.

The connection portion 176f may be bent at an obtuse angle. The bending point may be higher than the middle point of the connection portion 176f. When the connection portion 176f is bent, the contact portion 176e may be stably supported on the flat surface of the beading portion 180. The connection portion 176f is divided into a lower portion and an upper portion based on the bending point, and the lower portion may have a greater length than the upper portion. In addition, the lower portion of the bending point may have a greater inclination angle based on the surface of the support portion 176a than the upper portion. When the connection portion 176f is bent, a pressure (force) applied in the vertical direction of the battery housing 171 may be buffered. For example, in the process of sizing the battery housing 171, when a pressure is transmitted to the contact portion 176e so that the contact portion 176e moves vertically toward the support portion 176b, the bending point of the connection portion 176f moves upward, so that the shape of the connection portion 176 is deformed to buffer the stress.

Meanwhile, the maximum distance from the center of the second current collector 176 to the end of the second uncoated portion coupling portion 176b along the radial direction of the electrode assembly 110 is preferably equal to or smaller than the inner diameter of the battery housing 171 in a region where the beading portion 180 is formed, namely the minimum inner diameter of the battery housing 171. This is to prevent the end of the second uncoated portion coupling portion 176b from pressing the edge of electrode assembly 110 during the sizing process of compressing the battery housing 171 along the height direction.

The second uncoated portion coupling portion 176b includes a hole 176g. The hole 176g may be used as a passage through which the electrolyte may move. The welding pattern 176h formed by welding between the second uncoated portion coupling portion 176b and the bending surface region F may have a structure to extend along the radial direction of the electrode assembly 110. The welding pattern 176h may be a line pattern or a dot array pattern.

The welding pattern 176h corresponds to the welding region. Therefore, it is preferable that the welding pattern 176h overlaps by 50% or more with the stack number uniform region b1 of the bending surface region F located in the lower portion of the electrode assembly 110. The welding pattern 176h that does not overlap with the stack number uniform region b1 may overlap with the stack number decrease region b2. More preferably, the entire welding pattern 176h may overlap with the stack number uniform region b1 of the bending surface region F. In the bending surface region F at the upper portion of the point where the welding pattern 176h is formed, the stack number uniform region b1 and, optionally, the stack number decrease region b2 preferably have the stack number of 10 or more.

The outer diameters of the first current collector 144 and the second current collector 176 described above are different from each other. The outer diameter is an outer diameter of the outer edge of the contact area between the bending surface region F and the current collector. The outer diameter is defined as a maximum value of the distance between two points where a straight line passing through the center of the core C of the electrode assembly meets the edge of the contact area. Since the second current collector 176 is located inside the beading portion 180, its outer diameter is smaller than that of the first current collector 144. In addition, the length of the welding pattern 144f of the first current collector 144 is longer than the length of the welding pattern 176h of the second current collector 176. Preferably, the welding pattern 144f and the welding pattern 176h may extend toward the outer circumference from substantially the same point based on the center of the core C.

The cylindrical battery 170, 180, 200, 220 according to an embodiment of the present disclosure have an advantage in that electrical connection can be performed at the upper portion thereof.

Figure 28:
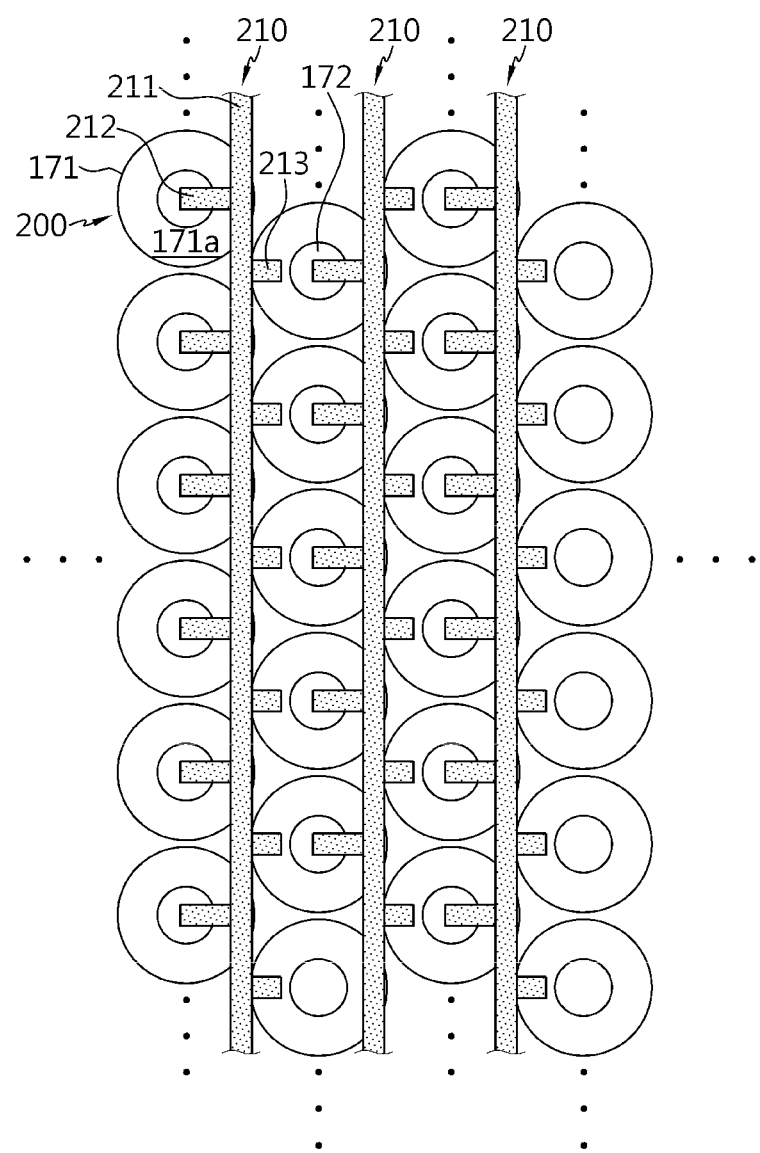
FIG. 28 is a top plan view showing a state in which a plurality of cylindrical batteries are electrically connected.
Figure 29:
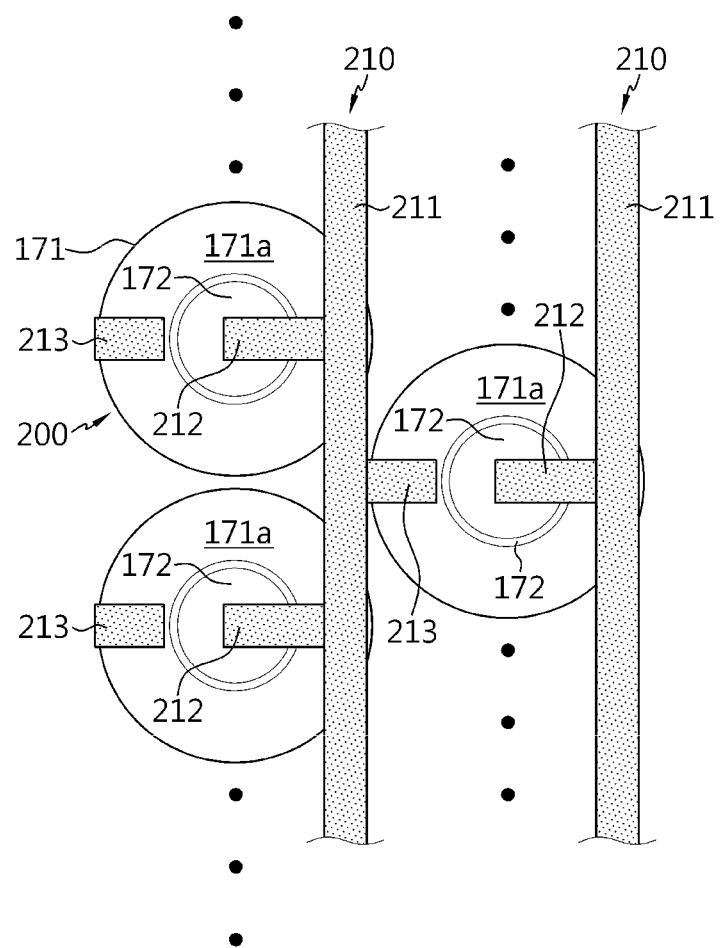
FIG. 29 is a partially enlarged view of FIG. 28.

FIG. 28 is a top plan view illustrating a state in which a plurality of cylindrical batteries 200 are electrically connected, and FIG. 29 is a partially enlarged view of FIG. 28. The cylindrical battery 200 may be replaced with a cylindrical battery 170, 180, 220 having a different structure.

Referring to FIGS. 28 and 29, a plurality of cylindrical batteries 200 may be connected in series and in parallel at an upper portion of the cylindrical batteries 200 using a bus bar 210. The number of cylindrical batteries 200 may be increased or decreased in consideration of the capacity of the battery pack.

In each cylindrical battery 200, the terminal 172 may have a positive polarity, and the flat surface 171a around the terminal 172 of the battery housing 171 may have a negative polarity, or vice versa.

Preferably, the plurality of cylindrical batteries 200 may be arranged in a plurality of columns and rows. Columns are provided in a vertical direction on the drawing, and rows are provided in a left and right direction on the drawing. In addition, in order to maximize space efficiency, the cylindrical batteries 200 may be arranged in a closest packing structure. The closest packing structure is formed when an equilateral triangle is formed by connecting the centers of the terminals 172 exposed out of the battery housing 171 to each other. Preferably, the bus bar 210 connects the cylindrical batteries 200 arranged in the same column in parallel to each other, and connects the cylindrical batteries 200 arranged in two neighboring columns in series with each other.

Preferably, the bus bar 210 may include a body portion 211, a plurality of first bus bar terminals 212 and a plurality of second bus bar terminals 213 for serial and parallel connection.

The body portion 211 may extend along the column of the cylindrical batteries 200 between neighboring terminals 172. Alternatively, the body portion 211 may extend along the column of the cylindrical batteries 200, and the body portion 211 may be regularly bent like a zigzag shape.

The plurality of first bus bar terminals 212 may extend in one side direction of the body portion 211 and may be electrically coupled to the terminal 172 of the cylindrical battery 200 located in one side direction. The electrical connection between the first bus bar terminal 212 and the terminal 172 may be achieved by laser welding, ultrasonic welding, or the like.

The plurality of second bus bar terminals 213 may extend in the other side direction of the body portion 211 and may be electrically coupled to the flat surface 171a around the terminal 172 located in the other side direction. The electrical coupling between the second bus bar terminal 213 and the flat surface 171a may be performed by laser welding, ultrasonic welding, or the like.

Preferably, the body portion 211, the plurality of first bus bar terminals 212 and the plurality of second bus bar terminals 213 may be made of one conductive metal plate. The metal plate may be, for example, an aluminum plate or a copper plate, but the present disclosure is not limited thereto. In a modified example, the body portion 211, the plurality of first bus bar terminals 212 and the second bus bar terminals 213 may be manufactured as separate pieces and then coupled to each other by welding or the like.

The cylindrical battery 200 of the present disclosure as described above has a structure in which resistance is minimized by enlarging the welding region by means of the bending surface region F, multiplexing current paths by means of the second current collector 176, minimizing a current path length, or the like. The AC resistance of the cylindrical battery 200 measured through a resistance meter between the positive electrode and the negative electrode, namely between the terminal 172 and the flat surface 171a around the terminal 172, may be approximately 0.5 milliohms to 4 milliohms, preferably 1 milliohms to 4 milliohms, suitable for fast charging.

In the cylindrical battery 200 according to the present disclosure, since the terminal 172 having a positive polarity and the flat surface 171a having a negative polarity are located in the same direction, it is easy to electrically connect the cylindrical batteries 200 using the bus bar 210.

In addition, since the terminal 172 of the cylindrical battery 200 and the flat surface 171a around the terminal 172 have a large area, the coupling area of the bus bar 210 may be sufficiently secured to sufficiently reduce the resistance of the battery pack including the cylindrical battery 200.

In addition, since electrical wiring may be performed on the upper portion of the cylindrical battery 200, there is an advantage in maximizing the energy density per unit volume of the battery module/pack.

The cylindrical battery according to the above embodiments (modifications) may be used to manufacture a battery pack.

Figure 30:
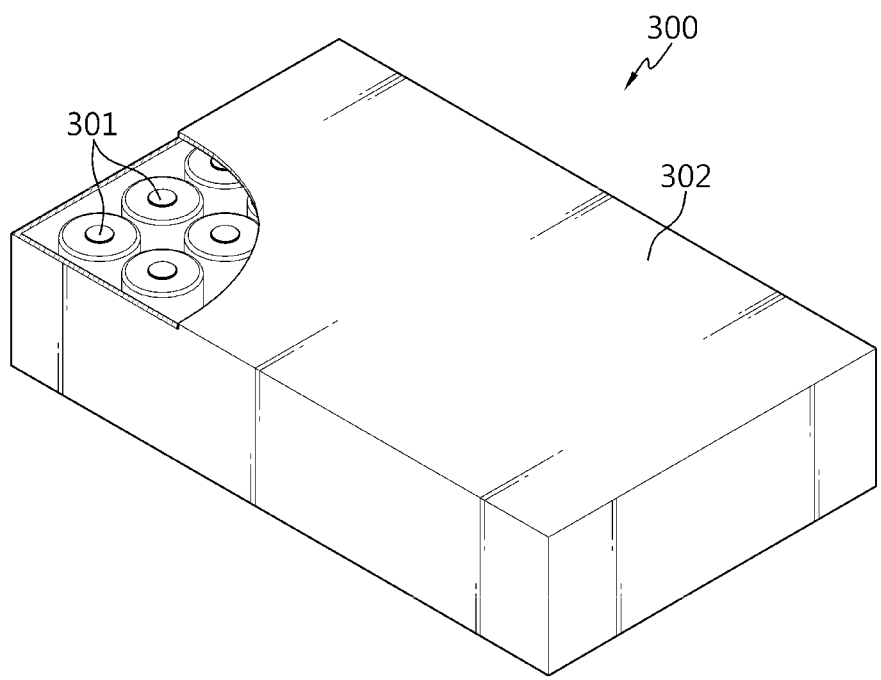
FIG. 30 is a diagram schematically showing a battery pack according to an embodiment of the present disclosure.

FIG. 30 is a diagram schematically showing a battery pack according to an embodiment of the present disclosure.

Referring to FIG. 30, a battery pack 300 according to an embodiment of the present disclosure includes an aggregate in which cylindrical batteries 301 are electrically connected, and a pack housing 302 for accommodating the aggregate. The cylindrical battery 301 may be any one of the batteries according to the above embodiments (modifications). In the drawing, components such as a bus bar, a cooling unit, and an external terminal for electrical connection of the cylindrical batteries 301 are not depicted for convenience of illustration.

The battery pack 300 may be mounted to a vehicle. The vehicle may be, for example, an electric vehicle, a hybrid electric vehicle, or a plug-in hybrid vehicle. The vehicle includes a four-wheeled vehicle or a two-wheeled vehicle.

Figure 31:
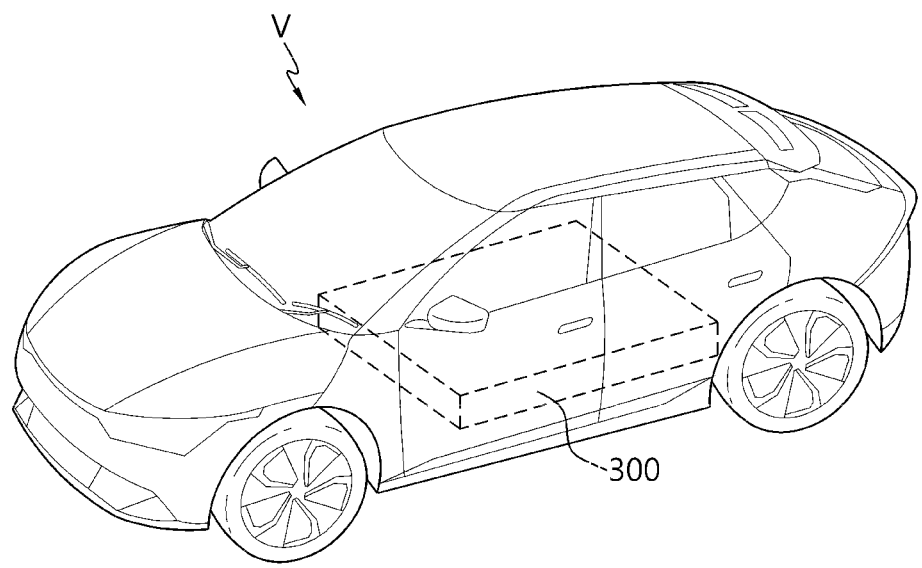
FIG. 31 is a diagram schematically showing a vehicle including the battery pack according to an embodiment of the present disclosure.

FIG. 31 is a diagram schematically showing a vehicle including the battery pack 300 of FIG. 30.

Referring to FIG. 31, a vehicle V according to an embodiment of the present disclosure includes the battery pack 300 according to an embodiment of the present disclosure. The vehicle V operates by receiving power from the battery pack 300 according to an embodiment of the present disclosure.

According to the present disclosure, the internal resistance of the battery may be reduced and the energy density may be increased by using the uncoated portion itself protruding at the upper portion and the lower portion of the electrode assembly as an electrode tab.

According to another aspect of the present disclosure, by improving the structure of the uncoated portion of the electrode assembly so that the electrode assembly and the inner circumference of the battery housing do not interfere in the process of forming the beading portion of the battery housing, it is possible to prevent a short circuit from occurring inside the cylindrical battery due to partial deformation of the electrode assembly.

According to still another aspect of the present disclosure, by improving the structure of the uncoated portion of the electrode assembly, it is possible to prevent the uncoated portion from being torn when the uncoated portion is bent, and it is possible to improve the welding strength of the current collector by sufficiently increasing the number of overlapping layers of the uncoated portion.

According to still another aspect of the present disclosure, segment groups may be radially arranged in a plurality of predefined regions along the radial direction of the electrode assembly by adjusting intervals between the segment groups. In this case, the electrolyte impregnation rate may be improved by separating the bending surface regions of the segments in a circumferential direction and impregnating the electrolyte through the region between the bending surface regions.

According to still another aspect of the present disclosure, by applying a segment structure to the uncoated portion of the electrode and optimizing the dimensions (width, height, separation pitch) of the segments to sufficiently increase the segment stack number of the area used as the welding target area, it is possible to improve the properties of the area where the current collector is welded.

According to still another aspect of the present disclosure, an electrode assembly having improved energy density and reduced resistance may be provided by applying a structure in which a current collector is welded to a broad area of the bending surface region formed by bending the segments.

According to still another aspect of the present disclosure, a cylindrical battery having an improved design so that electrical wiring can be performed at the upper portion thereof may be provided.

According to still another aspect of the present disclosure, by improving the structure of the uncoated portion adjacent to the core of the electrode assembly, the cavity in the core of the electrode assembly is prevented from being blocked when the uncoated portion is bent, so that the electrolyte injection process and the process of welding the battery housing (or, terminal) and the current collector may be easily performed.

According to still another aspect of the present disclosure, it is possible to provide a cylindrical battery having a structure in which the internal resistance is low, an internal short circuit is prevented, and the welding strength between the current collector and the uncoated portion is improved, and a battery pack and a vehicle including the cylindrical battery.

In particular, the present disclosure may provide a cylindrical battery having a ratio of diameter to height of 0.4 or more and a resistance of 4 milliohms or less, and a battery pack and a vehicle including the cylindrical battery.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. An electrode assembly, comprising:
a first electrode,
a second electrode, and
a separator interposed therebetween are wound around a winding axis in a winding direction to define a core and an outer circumference of the electrode assembly,
wherein the first electrode includes a first active material portion coated with an active material layer and a first uncoated portion not coated with an active material layer along the winding direction,
wherein the first uncoated portion includes a segment region divided into a plurality of independently bendable segments by a plurality of cut grooves provided along the winding direction,
wherein the segment region includes a plurality of segment groups arranged with a group separation interval along the winding direction,
wherein one end of the electrode assembly includes a plurality of segment alignments in which the plurality of segment groups are aligned along a radial direction of the electrode assembly, and an electrolyte impregnation portion provided between adjacent segment alignments in a circumferential direction of the electrode assembly,
wherein an end of the first active material portion is exposed between winding turns of the separator,
wherein the segments included in each segment alignment are bent toward the core to form a bending surface region,
wherein an end of the separator is spaced apart from a criterion line extending in the winding direction along a location corresponding to the plurality of cut grooves by a preset distance or less, and wherein the preset distance is 30% of a minimum height of the segments forming the bending surface region.

2. The electrode assembly according to claim 1, wherein widths of the segment groups in the winding direction, arranged in the bending surface region, increase stepwise or gradually from the core toward the outer circumference.

3. The electrode assembly according to claim 1, wherein the number of segments included in each segment group arranged in the bending surface region increases gradually or stepwise from the core to the outer circumference, and
wherein the segments included in a same segment group are identical in terms of at least one selected from a width in the winding direction, a height along the winding axis, a lower internal angle, and a separation pitch in the winding direction.

4. The electrode assembly according to claim 1, wherein the segments included in a segment group located at a first winding turn is smaller than the segments included in a segment group located outward from the first winding turn in terms of at least one selected from a width in the winding direction, a height along the winding axis, a lower internal angle, and a separation pitch in the winding direction.

5. The electrode assembly according to claim 1, wherein the bending surface region has a fan, rectangular, trapezoidal or parallelogram shape.

6. The electrode assembly according to claim 1, wherein, when a line connecting a center of the core and a geometric center of a figure approximately corresponding to the bending surface region is defined as an angle measurement line, an angle between angle measurement lines of adjacent bending surface regions in the circumferential direction is substantially identical.

7. The electrode assembly according to claim 1, wherein at least a part of the segment groups included in each segment alignment are rotated in a clockwise or counterclockwise direction based on the winding axis as the radius of the winding turn increases.

8. The electrode assembly according to claim 1, wherein each segment alignment includes a height variable region in which heights of the segments increase stepwise from a first height ($h_1$) to an N-$1^{th}$ height ($h_{N-1}$), where N is a natural number of 3 or more, from the core of the electrode assembly toward the outer circumference of the electrode assembly, and a height uniform region in which heights of the segments are kept uniform as an $N^{th}$ height ($h_N$, greater than $h_{N-1}$).

9. The electrode assembly according to claim 8, wherein, when a starting radius of a winding turn containing a segment with a height $h_k$ (k is a natural number of 1 to N) is defined as $r_k$, 90% or more of a diameter of the core of the electrode assembly is not covered by the bent portion of the segment located at the $r_k$.

10. The electrode assembly according to claim 1, wherein, based on a cross section along the winding axis, sequentially along the radial direction, each segment alignment includes a segment skip region having no segment, a height variable region where heights of the segments vary, and a height uniform region where heights of the segments are uniform, and the plurality of segments are disposed in the height variable region and the height uniform region.

11. The electrode assembly according to claim 10, wherein, when a number of segments meeting an imaginary line parallel to the winding axis at an arbitrary radius location of the bending surface region based on a center of the core of the electrode assembly is defined as a stack number of the segments at the corresponding radius location, the bending surface region includes a stack number uniform region where the stack number of the segments is uniform from the core toward the outer circumference and a stack number decreasing region located at an outer side of the stack number uniform region in which the stack number of the segments decreases toward the outer circumference.

12. A battery, comprising:
an electrode assembly in which a first electrode, a second electrode, and a separator interposed therebetween are wound around a winding axis in a winding direction to define a core and an outer circumference of the electrode assembly, the first electrode including a first active material portion coated with an active material layer and a first uncoated portion not coated with an active material layer along the winding direction, the first uncoated portion including a segment region divided into a plurality of independently bendable segments by a plurality of cut grooves provided along the winding direction, the segment region including a plurality of segment groups arranged with a group separation interval along the winding direction, one end of the electrode assembly including a plurality of segment alignments in which the plurality of segment groups are aligned along a radial direction of the electrode assembly, an electrolyte impregnation portion being provided between adjacent segment alignments in a circumferential direction of the electrode assembly, an end of the first active material portion being exposed between winding turns of the separator, the segments included in each segment alignment being bent toward the core to form a bending surface region, an end of the separator being spaced apart from a criterion line extending along the winding direction along a location corresponding to the plurality of cut grooves by a preset distance or less, and the preset distance being 30% of a minimum height of the segments forming the bending surface region;

a battery housing configured to accommodate the electrode assembly and electrically connected to one of the first electrode and the second electrode to have a first polarity;

a sealing body configured to seal an open end of the battery housing; and a terminal having a surface exposed to outside the battery housing and electrically connected to another of the first electrode and the second electrode to have a second polarity.

13. The battery according to claim 12, further comprising a current collector electrically connected to an uncoated portion of the second electrode having the first polarity and having an edge at least partially coupled to a sidewall of the battery housing, wherein the sealing body includes a cap configured to seal the open end of the battery housing, and wherein the terminal is a rivet terminal located a closed end of the battery housing opposite the open end, the rivet terminal being insulated in a perforation hole formed in a center of the closed end and electrically connected to the first electrode to have the second polarity.

14. A battery pack, comprising a plurality of batteries according to claim 12.

15. A vehicle, comprising the battery pack according to claim 14.

* * * * *